United States Patent
Chang et al.

(10) Patent No.: US 12,235,474 B2
(45) Date of Patent: Feb. 25, 2025

(54) METHODS AND SYSTEMS FOR AUGMENTED REALITY DISPLAY WITH DYNAMIC FIELD OF VIEW

(71) Applicant: Magic Leap, Inc., Plantation, FL (US)

(72) Inventors: Chieh Chang, Cedar Park, TX (US); Victor Kai Liu, Mountain View, CA (US); Samarth Bhargava, Saratoga, CA (US); Ling Li, Bellevue, WA (US); Sharad D. Bhagat, Austin, TX (US); Christophe Peroz, San Francisco, CA (US); Jason Donald Mareno, Raleigh, NC (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/133,364

(22) Filed: Apr. 11, 2023

(65) Prior Publication Data

US 2023/0244087 A1 Aug. 3, 2023

Related U.S. Application Data

(62) Division of application No. 16/926,352, filed on Jul. 10, 2020, now Pat. No. 11,656,480.

(Continued)

(51) Int. Cl.
*G02B 30/52* (2020.01)
*G02B 27/00* (2006.01)

(52) U.S. Cl.
CPC ......... *G02B 30/52* (2020.01); *G02B 27/0075* (2013.01); *G02B 27/0081* (2013.01)

(58) Field of Classification Search
CPC .............. G02B 27/017; G02B 27/0081; G02B 27/0075; G02B 27/0101; G02B 27/0176;

(Continued)

(56) References Cited

U.S. PATENT DOCUMENTS 6,360,539 B1 3/2002 Hill et al.
8,922,902 B2 12/2014 Blum et al.
(Continued)

FOREIGN PATENT DOCUMENTS

CN 102445756 A 5/2012
CN 108474956 A 8/2018
(Continued)

OTHER PUBLICATIONS

WO-2018119181-A1 (English Translation).*
(Continued)

*Primary Examiner* — Jerry Rahll
*Assistant Examiner* — Mary A El-Shammaa
(74) *Attorney, Agent, or Firm* — KILPATRICK TOWNSEND & STOCKTON LLP

(57) ABSTRACT

A method of operating a dynamic eyepiece in an augmented reality headset includes producing first virtual content associated with a first depth plane, coupling the first virtual content into the dynamic eyepiece, and projecting the first virtual content through one or more waveguide layers of the dynamic eyepiece to an eye of a viewer. The one or more waveguide layers are characterized by a first surface profile. The method also includes modifying the one or more waveguide layers to be characterized by a second surface profile different from the first surface profile, producing second virtual content associated with a second depth plane, coupling the second virtual content into the dynamic eyepiece, and projecting the second virtual content through the one or more waveguide layers of the dynamic eyepiece to the eye of the viewer.

10 Claims, 30 Drawing Sheets

Related U.S. Application Data

(60) Provisional application No. 62/959,076, filed on Jan. 9, 2020, provisional application No. 62/873,720, filed on Jul. 12, 2019.

(58) Field of Classification Search
CPC ........... G02B 27/0149; G02B 30/52; G02B 2027/0127; G02B 2027/0154; G02B 2027/0178; G02C 5/04
See application file for complete search history.

(56) References Cited

U.S. PATENT DOCUMENTS

| | | | |
|---|---|---|---|
| 10,228,565 B1 | 3/2019 | Saarikko | |
| 10,809,537 B1 * | 10/2020 | Lam | G02B 7/04 |
| 10,983,263 B2 | 4/2021 | Kleinman et al. | |
| 11,656,480 B2 | 5/2023 | Chang et al. | |
| 2003/0007236 A1 | 1/2003 | Schachar et al. | |
| 2006/0104596 A1 | 5/2006 | Askins et al. | |
| 2008/0117289 A1 | 5/2008 | Schowengerdt et al. | |
| 2011/0273906 A1 * | 11/2011 | Nichol | G02B 6/0028 445/24 |
| 2012/0127062 A1 | 5/2012 | Bar-Zeev et al. | |
| 2013/0088780 A1 | 4/2013 | Jarvenpaa et al. | |
| 2015/0241697 A1 | 8/2015 | Schowengerdt | |
| 2016/0116720 A1 | 4/2016 | Jungwirth et al. | |
| 2016/0234485 A1 | 8/2016 | Robbins et al. | |
| 2018/0052276 A1 | 2/2018 | Klienman et al. | |
| 2018/0275394 A1 * | 9/2018 | Yeoh | G02B 3/14 |
| 2018/0275410 A1 | 9/2018 | Yeoh et al. | |
| 2018/0348524 A1 | 12/2018 | Blum et al. | |
| 2018/0356638 A1 * | 12/2018 | Yang | G06F 1/163 |
| 2018/0356639 A1 | 12/2018 | Schaefer et al. | |
| 2018/0372926 A1 * | 12/2018 | Karafin | G02B 30/25 |
| 2019/0072767 A1 | 3/2019 | Vallius et al. | |
| 2019/0086667 A1 | 3/2019 | Silver | |
| 2021/0011305 A1 | 1/2021 | Chang et al. | |

FOREIGN PATENT DOCUMENTS

| | | | |
|---|---|---|---|
| CN | 109891298 A | 6/2019 | |
| JP | 2017522587 A | 8/2017 | |
| JP | 2018060212 A | 4/2018 | |
| WO | WO-2012068543 A1 * | 5/2012 | ............. F21K 9/232 |
| WO | WO-2018014010 A1 * | 1/2018 | ......... G02B 17/0864 |
| WO | WO-2018119181 A1 * | 6/2018 | ......... G02B 27/0081 |
| WO | 2019084334 A1 | 5/2019 | |
| WO | 2021011410 A1 | 1/2021 | |

OTHER PUBLICATIONS

U.S. Appl. No. 16/926,352 , "Non-Final Office Action", Jun. 21, 2022, 7 pages.
U.S. Appl. No. 16/926,352 , "Notice of Allowance", Jan. 13, 2023, 8 pages.
Application No. EP20841214.8 , "Extended European Search Report", Aug. 18, 2022, 9 pages.
Application No. PCT/US2020/041699 , "International Preliminary Report on Patentability", Jan. 27, 2022, 9 pages.
Application No. PCT/US2020/041699 , "International Search Report and Written Opinion", Dec. 9, 2020, 12 pages.
Application No. PCT/US2020/041699 , "Invitation to Pay Additional Fees and, Where Applicable, Protest Fee", Sep. 28, 2020, 2 pages.
CN202080050602.1, "Office Action", Feb. 27, 2024, 8 pages. [no translation available].
JP2022-500894, "Office Action", Jun. 11, 2024, 14 pages. [no translation available].
JP2022-500894, "Office Action" and English translation, Nov. 5, 2024, 23 pages.

* cited by examiner

FIG. 6C  FIG. 6D

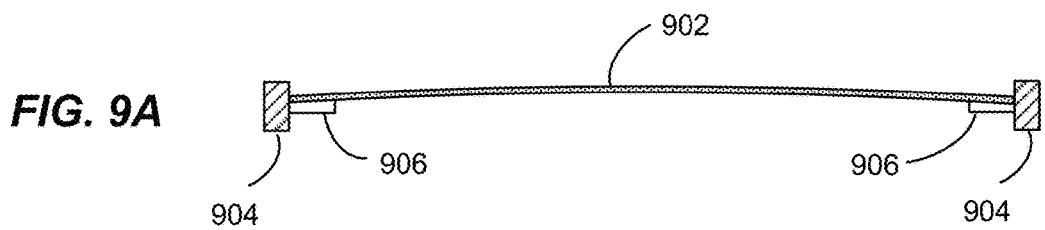
FIG. 9A
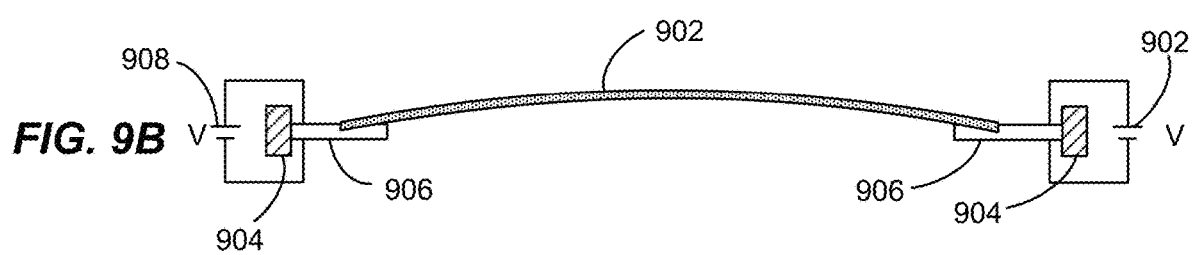
FIG. 9B
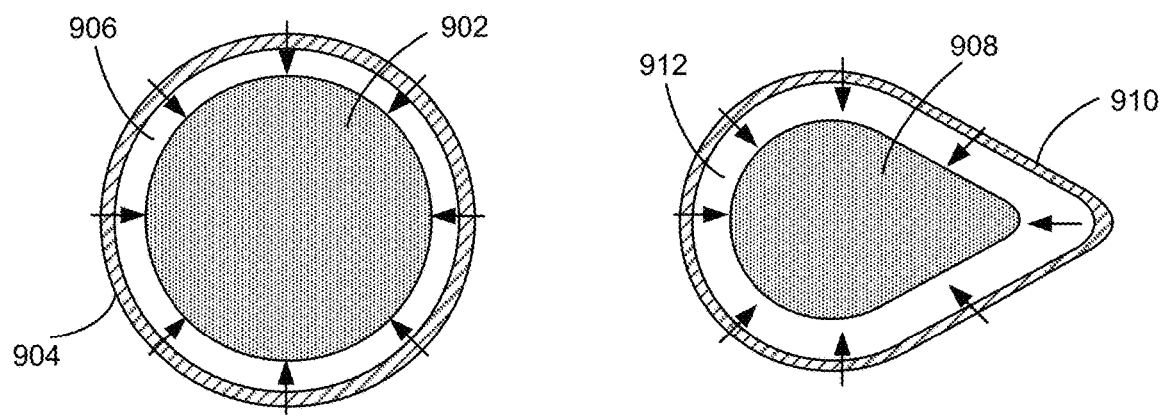
FIG. 9C
FIG. 9D
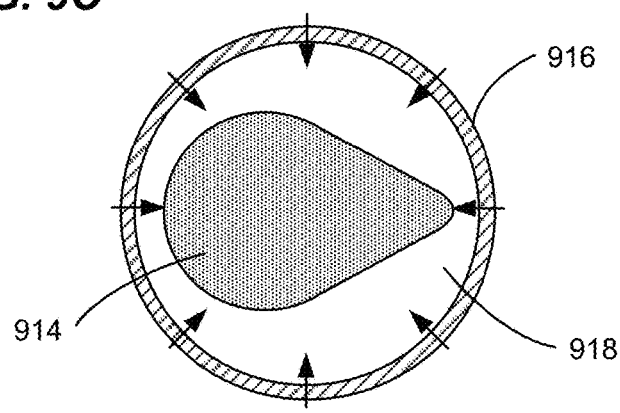
FIG. 9E

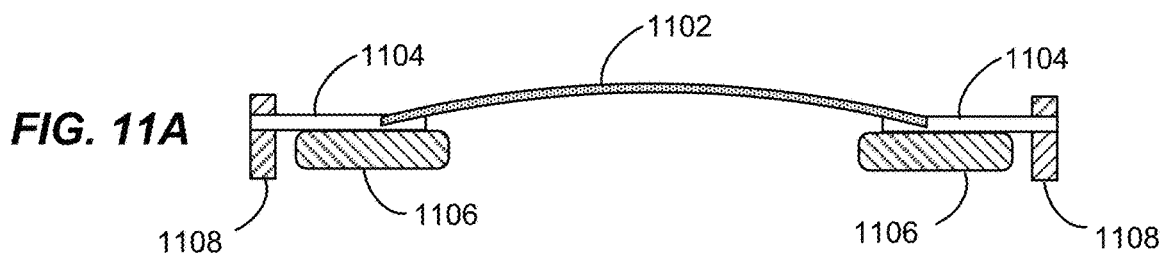
FIG. 11A
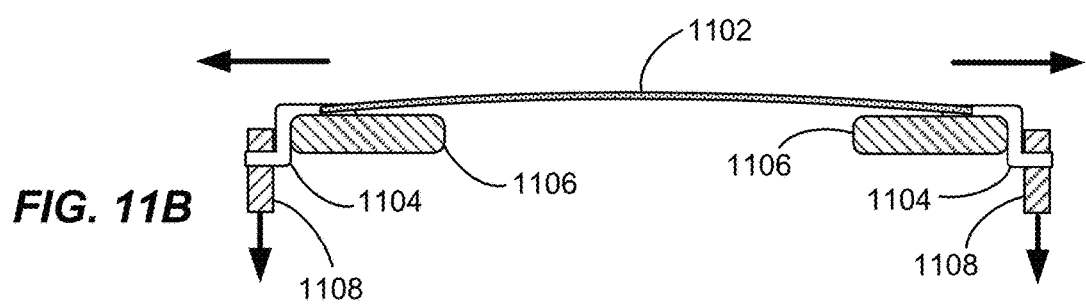
FIG. 11B
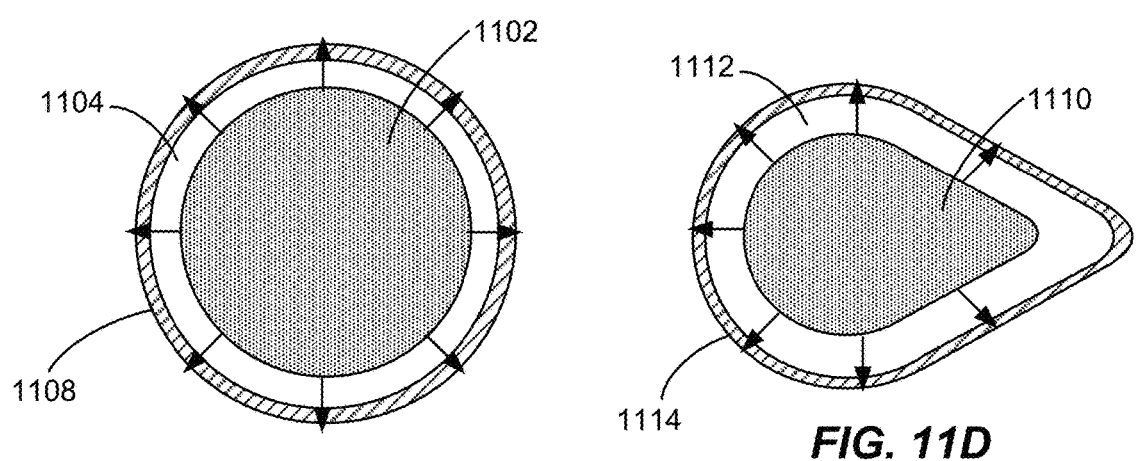
FIG. 11C
FIG. 11D
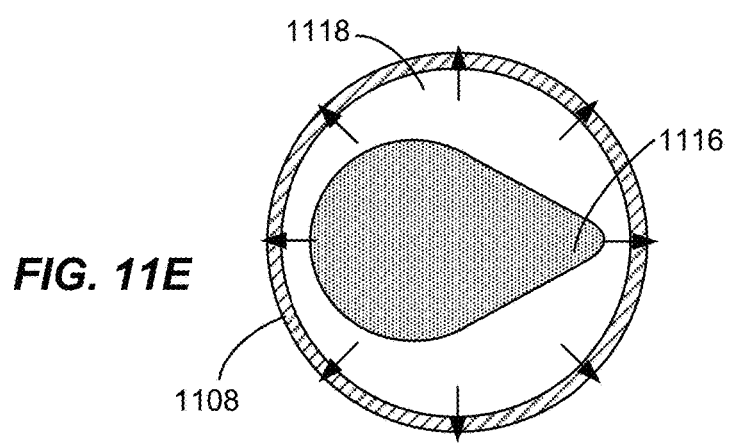
FIG. 11E

METHODS AND SYSTEMS FOR AUGMENTED REALITY DISPLAY WITH DYNAMIC FIELD OF VIEW

CROSS-REFERENCES TO RELATED APPLICATIONS

This application is a divisional of U.S. patent application Ser. No. 16/926,352, filed on Jul. 10, 2020, now U.S. Pat. No. 11,656,480, issued on May 23, 2023, entitled "METHODS AND SYSTEMS FOR AUGMENTED REALITY DISPLAY WITH DYNAMIC FIELD OF VIEW," which claims the benefit of priority to U.S. Provisional Patent Application No. 62/873,720, filed on Jul. 12, 2019, entitled "METHODS AND SYSTEMS FOR AUGMENTED REALITY DISPLAY WITH DYNAMIC FIELD OF VIEW," and U.S. Provisional Patent Application No. 62/959,076, filed on Jan. 9, 2020, entitled "METHODS AND SYSTEMS FOR FABRICATING A HIGH FIDELITY POLYMER WAVEGUIDE FOR AN AUGMENTED REALITY DISPLAY" the entire contents of which are hereby incorporated by reference for all purposes.

BACKGROUND OF THE INVENTION

Modern computing and display technologies have facilitated the development of systems for "virtual reality" or "augmented reality" experiences, wherein digitally reproduced images or portions thereof are presented to a viewer in a manner wherein they seem to be, or may be perceived as real. A virtual reality, or "VR" scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems.

SUMMARY OF THE INVENTION

The present invention relates generally to methods and systems for "virtual reality" or "augmented reality" displays, for example, displays with a dynamic field of view. More particularly, embodiments of the present invention provide methods and systems that relate to flexible waveguide layers for optical power adjustment.

In a particular embodiment, a dynamic eyepiece including a plurality of waveguide layers (e.g., each associated with a primary color) is utilized in conjunction with a projector to display virtual content to a user at a plurality of depth planes, which can vary in depth continuously or digitally. The invention is applicable to a variety of applications in computer vision and three-dimensional (3D) reconstruction.

According to an embodiment of the present invention, a dynamic eyepiece for projecting an image to an eye of a viewer is provided. The dynamic eyepiece includes a waveguide layer having an input surface, an output surface opposing the input surface, and a periphery. The waveguide layer is configured to propagate light therein. The dynamic eyepiece also includes a mechanical structure coupled to at least a portion of the periphery of the waveguide layer. The mechanical structure is operable to apply a first mechanical force to the at least a portion of the periphery of the waveguide layer to impose a first surface profile on the output surface of the waveguide layer and apply a second mechanical force to the at least a portion of the periphery of the waveguide layer to impose a second surface profile different from the first surface profile on the output surface of the waveguide layer.

According to another embodiment of the present invention, a method of operating a dynamic eyepiece in an augmented reality headset is provided. The method includes producing first virtual content associated with a first depth plane, coupling the first virtual content into the dynamic eyepiece, and projecting the first virtual content through one or more waveguide layers of the dynamic eyepiece to an eye of a viewer. The one or more waveguide layers are characterized by a first surface profile. The method also includes modifying the one or more waveguide layers to be characterized by a second surface profile different from the first surface profile, producing second virtual content associated with a second depth plane, coupling the second virtual content into the dynamic eyepiece, and projecting the second virtual content through the one or more waveguide layers of the dynamic eyepiece to the eye of the viewer.

According to a specific embodiment of the present invention, a foveated display is provided. The foveated display includes a first projector and a dynamic eyepiece optically coupled to the first projector. The dynamic eyepiece comprises a waveguide having a variable surface profile. The foveated display also includes a second projector and a fixed depth plane eyepiece optically coupled to the second projector.

In an embodiment, a method of forming an eyepiece for use in an AR headset is provided. The method includes casting a polymer waveguide with a light input surface and a light output surface, disposing the casted polymer waveguide on a first mold with a uniformly spherical portion and a locally flat portion, and disposing a second mold thereon. The second mold includes an opening configured over the polymer waveguide that is defined by a first section that circumscribes at least half of a circular base of the spherical portion of the first mold and the light output surface and a second section of the opening that circumscribes at least half of the flat portion and the light input surface. A thermal process is applied that causes the polymer waveguide to deform to a shape defined by the first and second molds.

In some embodiments, a method of forming an eyepiece for use in an augmented reality headset can include: casting a polymer waveguide that is configured to propagate light therein, the polymer waveguide forming a single layer of the eyepiece and including: a substantially uniform surface topology; a light input surface at a first region of the polymer waveguide; and a light output surface at a second region of the polymer waveguide. In some aspects, the light input surface and the light output surface are separated by at least a distance D. The method can further include disposing the casted polymer waveguide on a first mold that includes a uniformly spherical portion having a circular base and a flat portion. In some embodiments, the polymer waveguide is configured on the first mold such that the first region is in vertical alignment with the flat portion and the second region is in vertical alignment with the uniformly spherical portion of the first mold. The method can further include disposing a second mold on the polymer waveguide, where the second mold is vertically aligned with the polymer waveguide and the first mold, and where the second mold includes an opening configured over the polymer waveguide that is defined by: a first section of the opening that circumscribes at least half of the circular base of the uniformly spherical portion of the first mold and the light output surface; and a second section of the opening that circumscribes at least half of the flat portion and the light input surface. In certain implementations, the method can further include applying a thermal cycling process to heat the first and second molds to a threshold temperature that causes the polymer waveguide to deform to a shape defined by the first and second molds such that the polymer waveguide is flat at the first region, the polymer waveguide is uniformly spherical at the second region, and a curved-to-flat transition between the first and second regions is shorter than the distance D.

In certain embodiments, the substantially uniform surface topology can be a flat surface topology or a universally spherical surface topology. In some cases, the polymer waveguide is tear drop shaped. The thermal cycling process may be a post-anneal process and the threshold temperature may be 120° C. The light input surface can be an in-coupling grating (ICG), and the light output surface can be a combined pupil expander (CPE). The flat portion may be a portion where the polymer waveguide has a warp of less than 20 μm, a bow of less than 20 μm, and a total thickness variation of less than 1 μm.

In some embodiments, the method can further include applying a uniform surface coating of an anti-stick compound to the polymer waveguide post-casting that operates to prevent the polymer waveguide from sticking to the first and second molds during the thermal cycling process. Alternatively or additionally, the method may include applying raw material particulates to the surface of the polymer waveguide and surface grinding or etching the polymer waveguide to achieve a surface roughness of 10 nm to 10 μm RMS that operates to prevent the polymer waveguide from sticking to the first and second molds during the thermal cycling process. Alternatively or additionally, the method can include inserting one or more textiles between the polymer waveguide and the first and/or second molds, the one or more textiles configured to prevent the polymer waveguide from sticking to the first and second molds during the thermal cycling process. In certain embodiments, the polymer waveguide can be comprised of either 1.72 polymer or 1.75 polymer and may be a single layer of a multi-layer eye piece.

In further embodiments, the method can yet further include applying a rigid bonding material around at least a portion of the second section and circumscribing the light input surface, the rigid bonding material bonding the second section to one or more structures adjacent to the polymer waveguide including one or more of an adjacent polymer waveguide of multi-layer eyepiece stack or a projector, where the rigid bonding material prevents or reduces movement of the light input surface as the polymer waveguide is dynamically deflected.

In certain embodiments, a method can include disposing a polymer waveguide on a first mold that has a uniformly spherical portion having a circular base and a flat portion, wherein the polymer waveguide includes a light input surface at a first region and a light output surface at a second region, and wherein the light input surface and the light output surface are separated by a distance D, and disposing a second mold on the polymer waveguide, wherein the second mold is vertically aligned with the polymer waveguide and the first mold, wherein the second mold includes an opening configured over the polymer waveguide that is defined by: a first section of the opening that circumscribes at least half of the circular base of the uniformly spherical portion of the first mold and the light output surface; and a second section of the opening that circumscribes at least half of the flat portion and the light input surface. The method can further include applying a thermal cycling process to heat the first and second molds to a threshold temperature that causes the polymer waveguide to deform to a shape defined by the first and second molds such that: the polymer waveguide is flat at the first region, the polymer waveguide is uniformly spherical at the second region, and a curved-to-flat transition between the first and second regions is shorter than the distance D. In some cases, the polymer waveguide may initially have a substantially flat surface topology, or a substantially spherical surface topology. The light input surface can be an ICG and the light output surface can be a CPE. In certain aspects, the method can further include applying a uniform surface coating of an anti-stick compound to the polymer waveguide post-casting that operates to prevent the polymer waveguide from sticking to the first and second molds during the thermal cycling process.

Numerous benefits are achieved by way of the present invention over conventional techniques. For example, embodiments of the present invention provide methods and systems for bi-modal or continuous variation in the surface profile of one or more waveguide layers in an eyepiece, thereby enabling multiple radii of curvature to be achieved. Moreover, embodiments of the present invention provide methods and systems that provide variable depth plane imaging systems that are characterized by lower weight and higher efficiency than conventional systems.

Furthermore, previous fabrication techniques for manufacturing polymer waveguides in the configurations described herein are often subject to poor yields or weak/damaged transitional areas between curved regions (e.g., a combined pupil expander) and flat regions (e.g., an incoupling grating) where the curved-to-flat waveguide transitions are fabricated too short, or curved-to-flat transitions may be fabricated too long, where both scenarios can introduce deleterious effects in waveguide performance characteristics (e.g., image distortion). Various embodiments of the invention provide more reliable, high-yield methods of fabrication that can provide the benefit of a shorter curved-to-flat transition with consistent and high-performance waveguide performance characteristics, as further described with respect to the various embodiments presented below. These and other embodiments of the invention along with many of its advantages and features are described in more detail in conjunction with the text below and attached figures.

BRIEF DESCRIPTION OF THE DRAWINGS

FIG. 6C illustrates a plan view of the system for dynamically adjusting the surface profile of a waveguide layer illustrated in FIGS. 6A and 6B.

FIG. 6D illustrates a plan view of an alternative system for dynamically adjusting the surface profile of a waveguide layer illustrated in FIGS. 6A and 6B.

FIG. 9A illustrates a cross-sectional view of a first configuration of an electroactive polymer (EAP) system for dynamically adjusting a surface profile of a waveguide layer according to some embodiments.

FIG. 9B illustrates a cross-sectional view of a second configuration of the EAP system for dynamically adjusting a surface profile of a waveguide layer illustrated in FIG. 9A.

FIG. 9C illustrates a plan view of components of the EAP system for dynamically adjusting the surface profile of a waveguide layer illustrated in FIGS. 9A and 9B.

FIG. 9D illustrates a plan view of components of an EAP system for dynamically adjusting the surface profile of an alternative waveguide layer according to some embodiments.

FIG. 9E illustrates a plan view of components of an alternative EAP system for dynamically adjusting the surface profile of an alternative waveguide layer according to some embodiments.

FIG. 11A illustrates a cross-sectional view of a first configuration of an alternative mechanical system for dynamically adjusting a surface profile of a waveguide layer according to some embodiments.

FIG. 11B illustrates a cross-sectional view of a second configuration of the alternative mechanical system for dynamically adjusting a surface profile of a waveguide layer illustrated in FIG. 11A.

FIG. 11C illustrates a plan view of components of the alternative mechanical system for dynamically adjusting the surface profile of a waveguide layer illustrated in FIGS. 11A and 11B.

FIG. 11D illustrates a plan view of components of another alternative mechanical system for dynamically adjusting the surface profile of an alternative waveguide layer according to some embodiments.

FIG. 11E illustrates a plan view of components of yet another alternative mechanical system for dynamically adjusting the surface profile of an alternative waveguide layer according to some embodiments.

DETAILED DESCRIPTION OF SPECIFIC EMBODIMENTS

Figure 1:
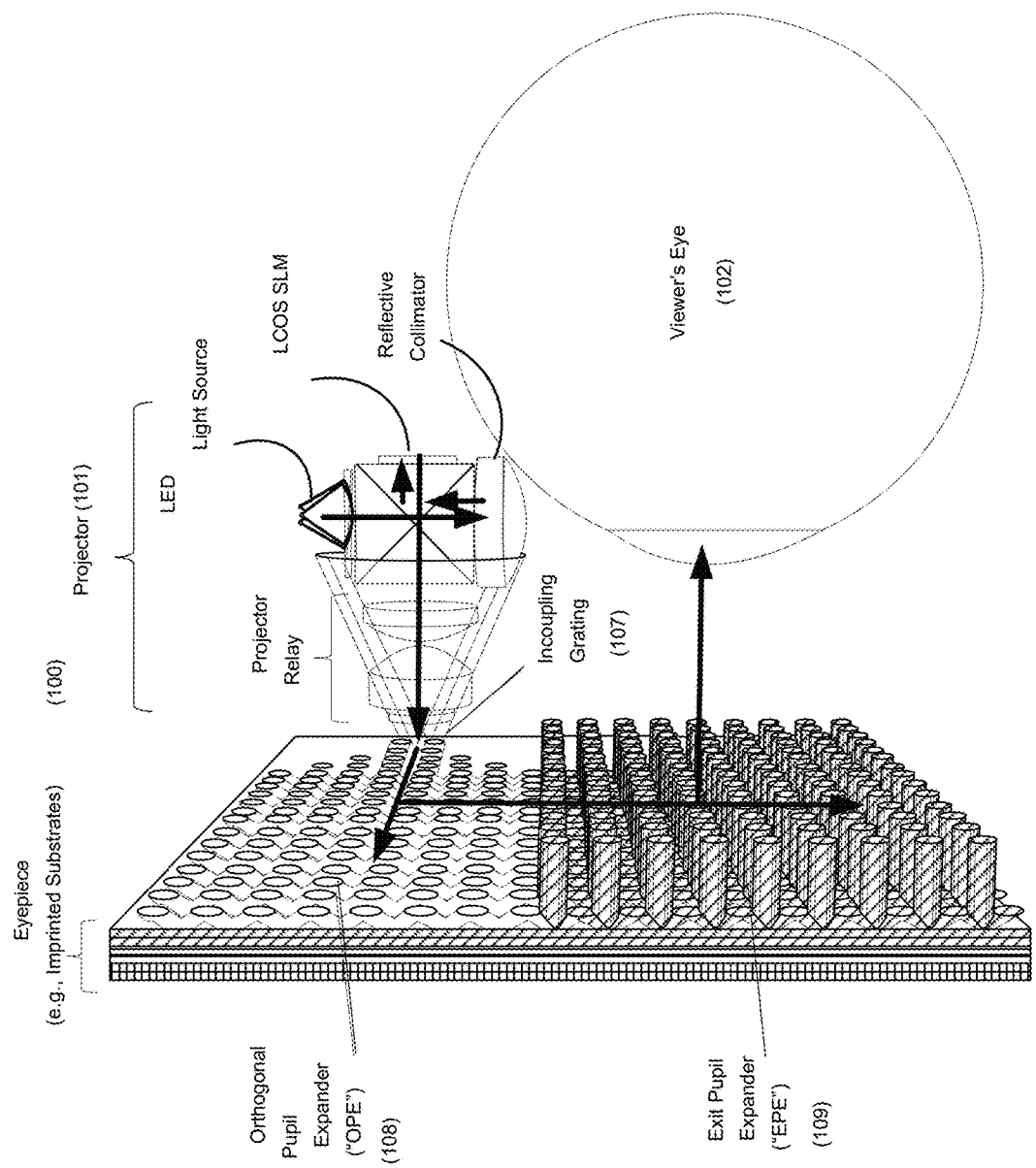
FIG. 1 illustrates schematically the light paths in a viewing optics assembly (VOA) that may be used to present a digital or virtual image to a viewer according to an embodiment of the present invention.

The present disclosure relates generally to methods and systems for "virtual reality" (VR) or "augmented reality" (AR) displays with dynamic field of view. More particularly, embodiments relate to flexible waveguide layers for optical power adjustment. A waveguide can propagate light towards an eye of a user to simulate a light source at a distance from the user. Altering the curvature of a flexible waveguide can allow for bi-modal or continuous simulation of various light sources at varying depths from the eye of the user. Thus, a flexible waveguide can be used to propagate light towards the eye of a user to simulate images or objects in three-dimensional space in VR or AR systems.

As described herein, embodiments of the present invention provide various architectures to dynamically change the curvature of waveguide layers, also referred to as polymer waveguides (implemented as either a single layer or a multi-layer stack), with at least portions thereof having substantially spherical surfaces, thereby providing projected images at various continuous or discrete depth planes (e.g., from a distance of 0.2 m to infinity) projected from a polymer eyepiece without any optical power. In particular embodiments, different types of actuators can be utilized as appropriate to the particular implementation to induce uniform stresses and load forces on the waveguide layer(s), resulting in modification of the radius of curvature with high fidelity to a spherical surface.

In the embodiments described herein, eyepieces characterized by tunable optical power are achieved by curving the exit pupil expander (EPE) area of the eyepiece, with the radius of curvature proportional to the focal distance of the virtual image. Utilizing polymer-based eyepieces, which have Young's modulus values much less than glass-based eyepieces, some embodiments induce a spherical curved surface (e.g., a radius of curvature of 0.3 m over an area up to Ø50 mm in a flat polymer substrate (e.g., up to 0.5 mm thick) using a reasonable and manageable force/loading (e.g., <25 N). As described herein, when the force/loading is released, the polymer substrate is able to restore its shape (e.g., to its original shape, which can be a flat shape, to a curved shape, to a combination thereof) by relaxing the stored strain energy. This mechanism is utilized to dynamically modulate the curvature (in either a continuous or discrete manner) of the waveguide layer (e.g., one or more polymer waveguide layers) between a first curvature state and a second curvature state. For instance, from a flat state to a curved state, a curved state to a flat state, a curved state to another curved state with a smaller or larger radius of curvature, or the like. In one particular example, a flat state (or a large radius of curvature, for example, 2.0 m) may be dynamically modulated to a curved state (for example, a radius of curvature of 0.1 m) or vice versa. Continuous variation in radius of curvature is thereby provided for radii of curvature ranging from 0.1 m to infinity.

In some of the embodiments described herein, the modulation of curvature is only performed in one direction, i.e., the radius of curvature either increases or decreases. However, the present invention is not limited to this condition. For example, as described more fully herein, some embodiments utilize a waveguide layer that is manufactured to have an intermediate curvature, for example a radius of curvature of 650 mm. In this example, a mechanical force, for example, a spring, can be used to bias the waveguide layer in one direction, then actuation against the mechanical force can be utilized to achieve the full range of radii of curvatures. As will be evident to one of skill in the art, these embodiments will reduce or minimize optical error, which typically accumulates as the waveguide layer is modified away from the nominal state.

Embodiments provide for bi-modal or continuous operation of one or more layers of a waveguide. Bi-modal operation of a dynamic waveguide system can be interpreted as meaning that a waveguide can be transitioned to one of two discrete states, a resting state exhibiting the natural radius of curvature of the waveguide when no external force is applied, and a forced state where the radius of curvature of the waveguide is altered through radial compression or expansion by external mechanical force. Switching to one state can cause a light source to appear at a certain distance from an eye of a user. Switching to the other state can cause a light source to appear at a different distance from the eye of a user. In some examples, bi-modal operation can be implemented to cause two light sources to appear simultaneously to a user, where the distance of each light source is defined by the radius of curvature of the waveguide in the two states. By refreshing, or toggling, the waveguide between the two bi-modal states at a rate faster than a human eye can perceive (e.g., faster than a refresh rate of 60 Hz), embodiments can allow a user to perceive multiple light sources at different distances in real time.

Embodiments capable of continuous operation of a waveguide can render light sources at more than two depths. Instead of an "all or nothing" bi-modal operation where a waveguide can exhibit one of two radius of curvature values corresponding to two discrete and predefined distances to an eye of a user, continuous operation of a waveguide can exhibit two or more radius of curvature values. Continuous operation of a dynamic waveguide system can implement states in between the natural resting state of the waveguide and the fully compressed or stretched state of the waveguide, allowing light sources to be rendered at more than two distances. For example, multiple light sources can be projected to an eye of a user where those light sources can appear to be simultaneously projected. A first light source can appear at 0.2 meters from the eye of a user, a second light source can appear at 0.5 meters, and a third light source can appear at 1 meter. Each distance can correspond to a different radius of curvature value that is obtained by dynamically adjusting the waveguide between multiple states. In a similar way that bi-modal operation of a dynamic waveguide system can appear to render two light sources to a user in real time, continuous operation of a dynamic waveguide system can render two or more light sources to a user in real time by toggling between each waveguide state at a rate faster than the human eye can perceive.

FIG. 1 illustrates schematically the light paths in a viewing optics assembly (VOA) that may be used to present a digital or virtual image to a viewer, according to an embodiment of the present invention. The VOA includes a projector 101 and an eyepiece 100 that may be worn around a viewer's eye. The eyepiece 100 may include one or more eyepiece layers. In one embodiment, the eyepiece 100 includes three eyepiece layers, one eyepiece layer for each of the three primary colors, red, green, and blue. In another embodiment, the eyepiece 100 may include six eyepiece layers, i.e., one set of eyepiece layers for each of the three primary colors configured for forming a virtual image at one depth plane, and another set of eyepiece layers for each of the three primary colors configured for forming a virtual image at another depth plane. In other embodiments, the eyepiece 100 may include three or more eyepiece layers for each of the three primary colors for three or more different depth planes. Each eyepiece layer comprises a planar waveguide and may include an incoupling grating 107, an orthogonal pupil expander (OPE) region 108, and an exit pupil expander (EPE) region 109.

Still referring to FIG. 1, the projector 101 projects image light onto the incoupling grating 107 in an eyepiece layer 100. The incoupling grating 107 couples the image light from the projector 101 into the planar waveguide propagating in a direction toward the OPE region 108. The waveguide propagates the image light in the horizontal direction by total internal reflection (TIR). The OPE region 108 of the eyepiece layer 100 also includes a diffractive element that couples and redirects a portion of the image light propagating in the waveguide toward the EPE region 109. The EPE region 109 includes a diffractive element that couples and directs a portion of the image light propagating in the waveguide in a direction approximately perpendicular to the plane of the eyepiece layer 100 toward a viewer's eye 102. In this fashion, an image projected by projector 101 may be viewed by the viewer's eye 102.

The diffractive element in the EPE region 109 of the eyepiece layer 100 typically comprises a grating, e.g., a periodic structure, formed on a surface of the planar waveguide in the eyepiece. When a beam of light passes through a periodic structure, it will be diffracted into multiple orders. The period of the repeated structure determines the angular separation between the orders. A small period creates large angular separation, while a large period results in closely spaced output beams. The relative power directed into each of the diffracted orders is dictated by the shape and nature of the surface profile within a single grating period.

Figure 2:
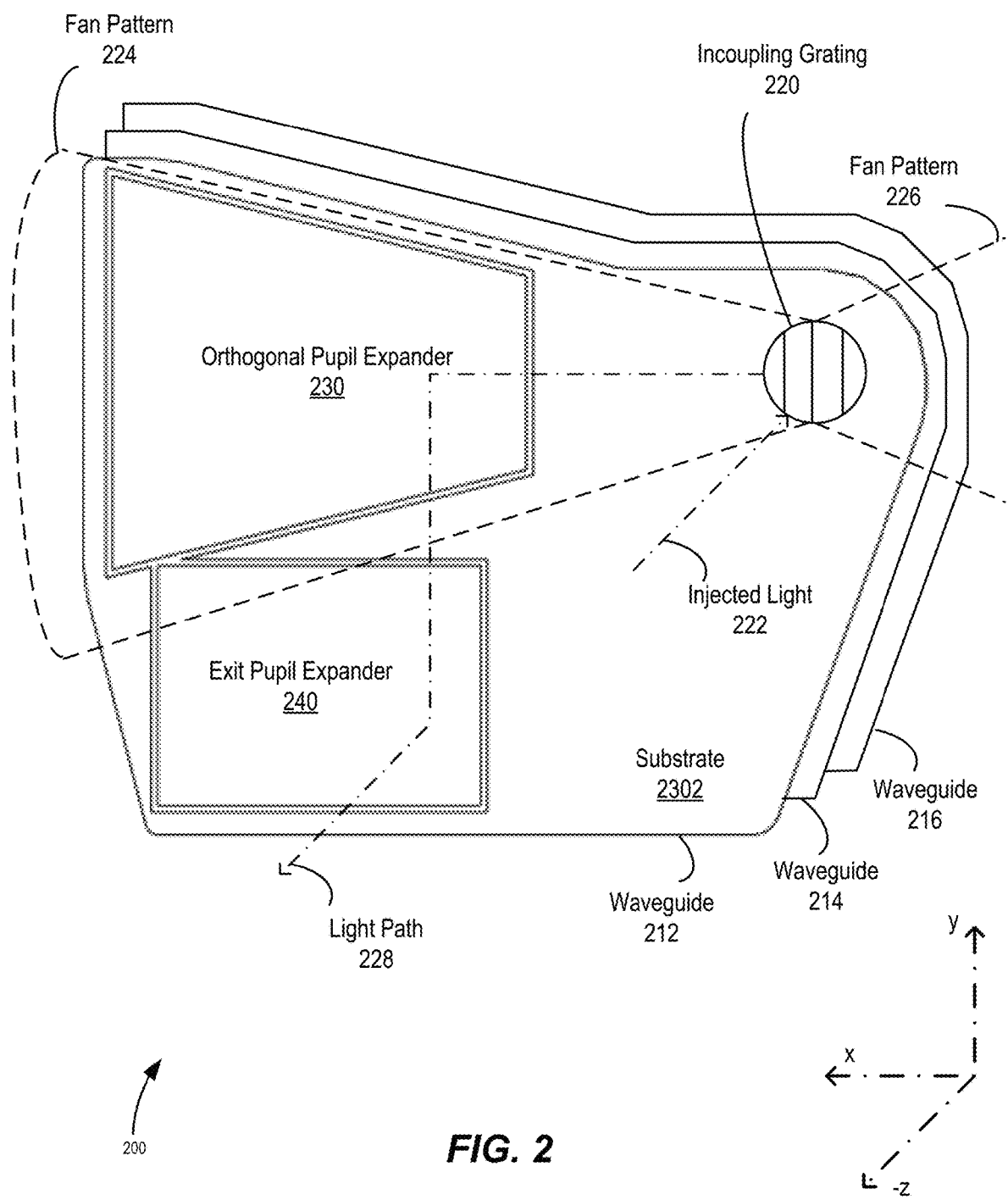
FIG. 2 illustrates an example of a path of a single beamlet of light incoupled into a waveguide of an eyepiece according to an embodiment of the present invention.

FIG. 2 illustrates an example of a path of a single beamlet of light incoupled into a waveguide 212 of an eyepiece 200 according to an embodiment of the present invention. The waveguide 212 can include an ICG 220, an OPE 230, and an EPE 240, each disposed on or within a substrate 202 comprised of a material capable of guiding optical waves by total internal reflection (typically a dielectric material having a high permittivity). In some embodiments, the eyepiece 200 can include three waveguides 212, 214, and 216, each waveguide corresponding to a particular wavelength of light. Additional or fewer waveguides are possible. Each of waveguides 214 and 216 can include an ICG, an OPE, and an EPE, similar to the waveguide 212. In some embodiments, injected light 222 can enter the eyepiece 200 at the ICG 220 in a z-direction orthogonal to the depiction of FIG. 2. The injected light 222 can enter the ICG 220 where the grating within the ICG 220 may diffract certain wavelengths of light within the incoupled light 222, and other wavelengths of the incoupled light 222 continue through to subsequent waveguide layers of the eyepiece 210. In some embodiments, the ICG 220 is a plurality of separate gratings specific to a particular wavelength.

The incoupled light 222 can be diffracted by the ICG 220 in certain directions within the waveguide, spanning a range such as depicted by fan pattern 224 toward the OPE 230 in a generally +x-direction, but also in a range spanning a fan pattern 226 away from the OPE 230 in a generally −x-direction. Other light paths spanning other fan patterns are of course possible and depend on the projection optics, and the particular grating and diffraction pattern configured by the ICG 220. That is, light does not diffract into the waveguide as a diverging beam, but in some embodiments the progressive distributed sampling of portions of image light may create a progressively expanding distribution pattern of beamlets across an eyepiece. The incoupled light 222 that is diffracted within the depicted fan pattern 224 can generally follow a light path 228 to enter the OPE 230 and traverse in an +x-direction, with attendant distributed sampling through the OPE 230 as it strikes the diffractive gratings making up the OPE 230, with portions periodically directed down to the EPE 240 and traversing in a −y-direction before outcoupling in a −z-direction towards the eye of a user.

As FIG. 2 depicts, much light in the wavelength corresponding to the waveguide 212 may be lost either due to directional loss such as light diffracted to the fan pattern 226 or due to capture loss due to an inadequately positioned or sized OPE 230 to capture all light within the fan pattern 224. More details about an eyepiece are described in U.S. patent application Ser. No. 15/683,624, the content of which is incorporated by reference for all purposes.

Figure 3A:
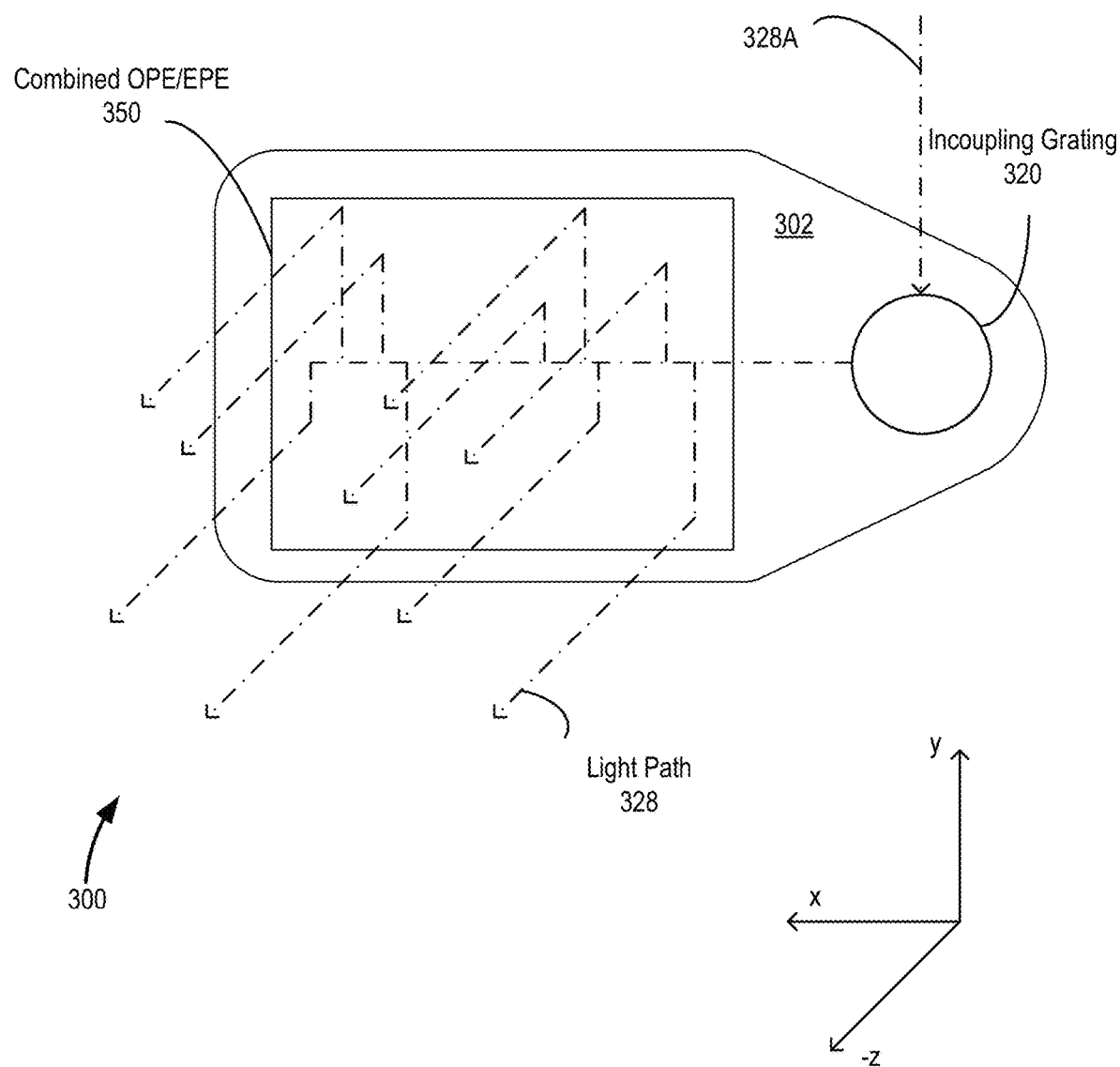
FIG. 3A illustrates an example of a waveguide having a combined orthogonal pupil expander region (OPE) and exit pupil expander (EPE) region in a single-sided configuration according to an embodiment of the present invention.

FIG. 3A illustrates an example of a waveguide 300 having a combined OPE/EPE region 350, also referred to as a combined pupil expander (CPE), in a single-sided configuration according to another embodiment of the present invention. The combined OPE/EPE region 350 includes gratings corresponding to both an OPE and an EPE that spatially overlap in the x-direction and the y-direction. In some embodiments, the gratings corresponding to both the OPE and the EPE are located on the same side of a substrate 302 such that either the OPE gratings are superimposed onto the EPE gratings or the EPE gratings are superimposed onto the OPE gratings (or both). In other embodiments, the OPE gratings are located on the opposite side of the substrate 302 from the EPE gratings such that the gratings spatially overlap in the x-direction and the y-direction but are separated from each other in the z-direction (i.e., in different planes). Thus, the combined OPE/EPE region 350 can be implemented in either a single-sided configuration or in a two-sided configuration.

Figure 3B:
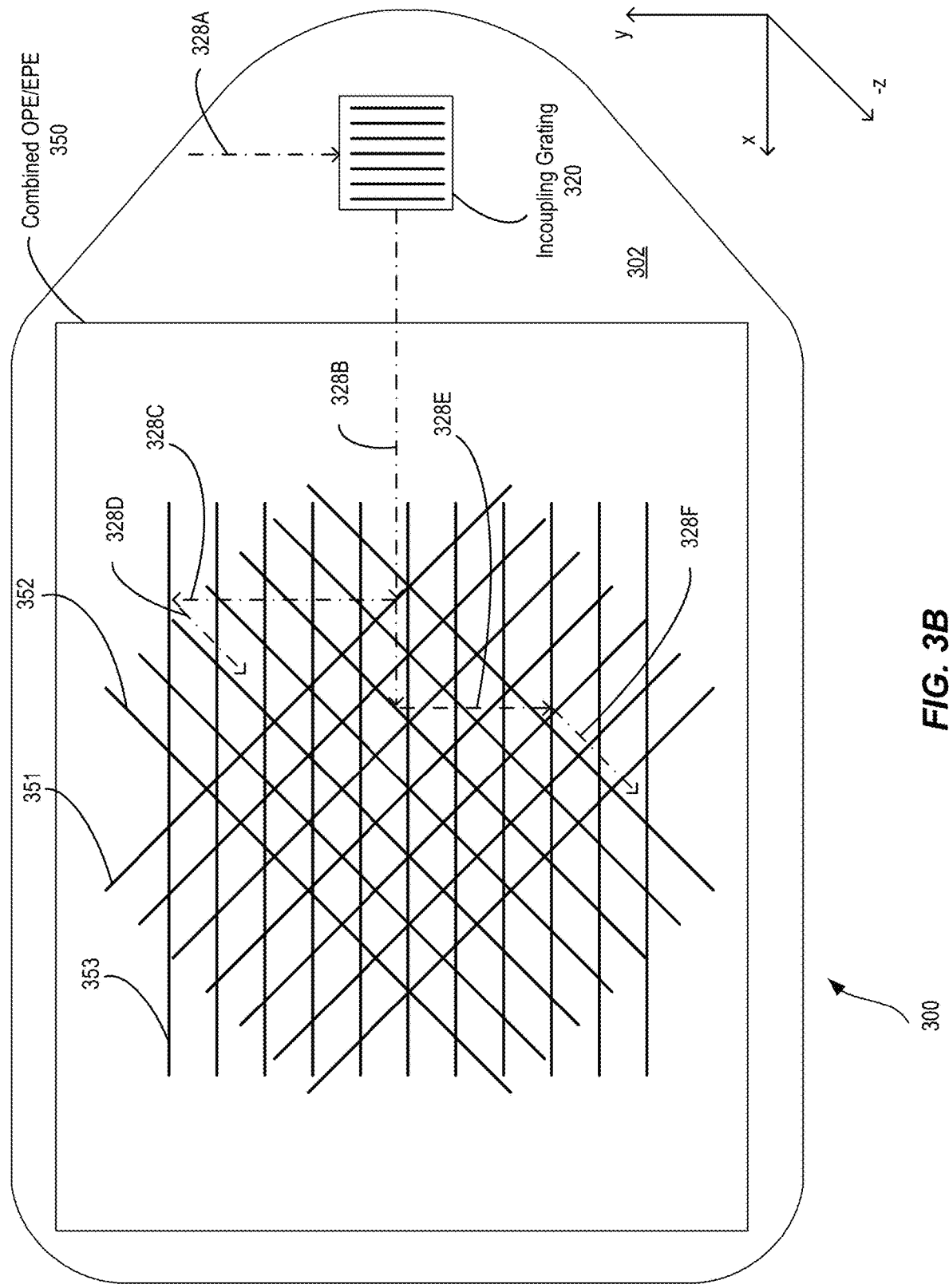
FIG. 3B illustrates an example of a light path within a waveguide according to an embodiment of the present invention

FIG. 3B illustrates an example of the light path 328 within the waveguide 300 according to an embodiment of the present invention. The light path 328 includes an incident light (denoted as 328A) that is coupled into the substrate 302 at the ICG 320. The incoupled light (denoted as 328B) propagates toward the gratings 351, 352, and 353 by total internal reflection. When these rays encounter the first OPE grating 351, light is diffracted in the ty-direction (denoted as 328C) and is subsequently diffracted in the −z-direction (denoted as 328D) by the EPE grating 353 out of the waveguide 300 toward the user's eye. Similarly, the incoupled light (denoted as 328B) may alternatively encounter the second OPE grating 352 and be diffracted in the −y-direction (denoted as 328E). Light that is diffracted in the −y-direction (denoted as 328E) may be diffracted by the EPE grating 353 out of the waveguide 300 toward the user's eye. Whether light is diffracted in the +y-direction (by the first OPE grating 351) or in the −y-direction (by the second OPE grating 352) is probabilistic and is governed by the grating structures. In general, performance of the combined OPE/EPE region 350 is improved when the incoupled light (denoted as 328B) has a 50% chance of diffracting in either the +y-direction or the −y-direction. In some instances, this is achieved when the first OPE grating 351 and the second OPE grating 352 are perpendicular to each other.

Although waveguide 300 is illustrated as having only a single ICG 320, in some embodiments it may be preferable for waveguide 300 to include a second ICG on the opposite side of the combined OPE/EPE region 350 as the ICG 320. The second ICG may be identical in form and function as the ICG 320 and may be a mirrored version of the ICG 320. For example, whereas the ICG 320 is configured to diffract an incoupled light related to a projected image into the substrate 302, the second ICG 320 may be configured to diffract an incoupled light related to a mirrored version of the projected image (e.g., flipped in the x-direction). In contrast to the light path 328 associated with the ICG 320, the light path associated with the second ICG may include an incident light that is coupled into the substrate 302 at the second ICG. The incoupled light propagates toward the gratings 351, 352, and 353 by total internal reflection. When these rays encounter the first OPE grating 351, light is diffracted in the −y-direction and is subsequently diffracted in the −z-direction by the EPE grating 353 out of the waveguide 300 toward the user's eye. Similarly, the incoupled light may alternatively encounter the second OPE grating 352 and be diffracted in the +y-direction. Light that is diffracted in the +y-direction may be diffracted by the EPE grating 353 out of the waveguide 300 toward the user's eye.

More details about other waveguide topologies are described in U.S. patent application Ser. No. 15/683,624, previously incorporated by reference.

Figure 4:
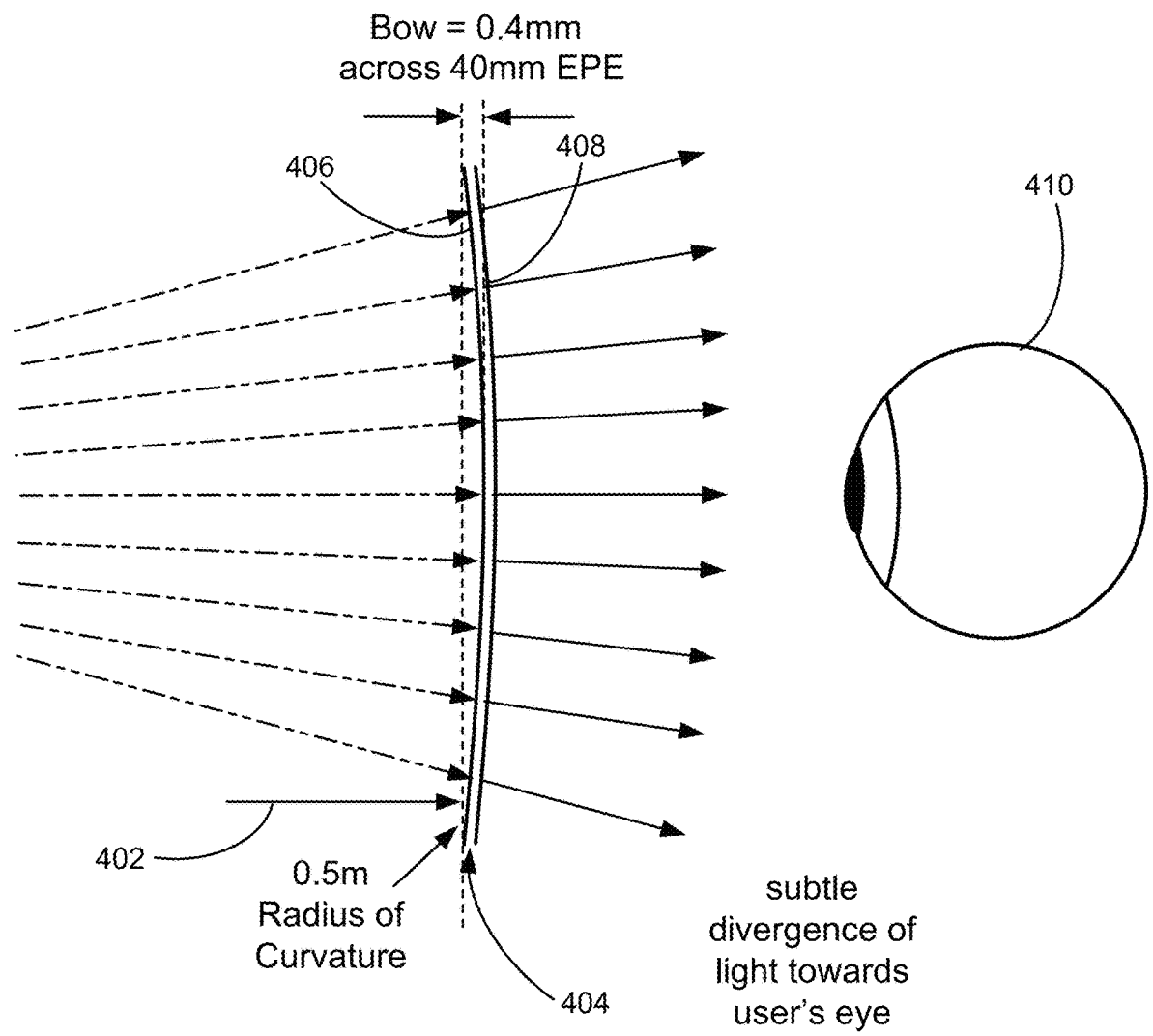
FIG. 4 is a simplified cross-sectional view of a waveguide layer of an eyepiece and light projected from the waveguide layer when the waveguide layer is characterized by a predetermined curvature.

FIG. 4 is a simplified cross-sectional view of a waveguide layer of an eyepiece and light projected from the waveguide layer when the waveguide layer is characterized by a predetermined curvature according to some embodiments. Input light beam 402 from a light source, such as a projector, (not shown) can enter waveguide layer 404 through an input surface 406 (for example, by diffraction from an incoupling element (not shown) and exit through an output surface 408 towards an eye 410 of a user. As illustrated in FIG. FIG. 4, a surface profile has been imposed on waveguide layer 404. In some embodiments, the surface profile forms a curve, which can be defined by a radius of curvature for a spherical curvature. In other embodiments, the surface profile is aspheric, but can be approximated by a spherical surface shape. Because of the structure of waveguide layer 404, input surface 406 can be parallel to output surface 408 throughout the length of waveguide layer 404.

As light propagates through waveguide layer 404 by TIR as discussed above, output light is diffracted out of waveguide layer 404 as illustrated by output rays 403. For low levels of curvature, input surface 406 and output surface 408 are parallel to each other at positions across the waveguide layer. Accordingly, as light propagates through the waveguide layer by TIR, the parallel nature of the waveguide surfaces preserves the reflection angles during TIR so that the angle between the output ray and the output surface is preserved across the waveguide layer. Since the surface normals vary slowly across the curved waveguide layer output surface, the output rays also vary slowly, producing the divergence illustrated in FIG. 4.

The divergence of output rays 403 resulting from the curvature of output surface 408 can have the effect of rendering input light beam 402 so that it appears that light originates from a point source positioned at a particular distance behind waveguide layer 404. Accordingly, the surface profile or curvature imposed on waveguide layer 404 produces a divergence of light toward the user's or viewer's eye 410, effectively rendering the light as originating from a depth plane positioned behind the waveguide layer.

The distance from the waveguide layer at which the input light beam appears to originate can be associated with the radius of curvature of waveguide layer 404. A waveguide with a higher radius of curvature can render a light source as originating at a greater distance from waveguide layer than a waveguide with a lower radius of curvature. For example, as shown in FIG. 4, waveguide layer 404 has a radius of curvature of 0.5 m, which can be achieved by a bowing of waveguide layer 404 by 0.4 mm across an EPE having a lateral dimension (e.g., length or width) of 40 mm. Given this curvature of waveguide layer 404, input light beam 402 appears to originate at a distance of 0.5 m from waveguide layer 404. As another example, another waveguide layer can be operated to have a radius of curvature of 0.2 m, rendering a light source that appears to a user to be originating at a distance of 0.2 meters from the waveguide layer. Accordingly, utilizing a small amount of curvature, i.e., fractions of a millimeter of bow across a waveguide layer tens of millimeters in length/depth, which is compatible with waveguide layer materials, depth plane functionality can be implemented for two-dimensional expansion waveguides, also referred to as two-dimensional waveguides. The curvatures utilized according to embodiments of the present invention are commonly used in a variety of commercial products, including sunglasses, which can have several millimeters (e.g., 1-5 mm) of bow, vehicle windshields, and the like. Accordingly, the small amount of curvature utilized in various embodiments of the present invention will not degrade the optical performance of the eyepiece, introducing, for example, less than 0.1 arcminute of blur at center field of view and less than 2 arcminutes of blur across the field of view of an eyepiece with 0.5 m radius of curvature.

FIG. 4 only illustrates a one-dimensional cross-sectional view of waveguide layer 404, which is an element of an eyepiece. However, it will be appreciated that the surface profile imposed on the waveguide layer can also be imposed in the direction orthogonal to the plane of the figure, resulting in a two-dimensional curvature of the waveguide layer. Embodiments of the present invention thus provide depth plane functionality to the structure of the eyepiece, particularly, the waveguide layers of the eyepiece. As described herein the depth plane functionality can be bi-modal or continuous depending on the particular implementation.

Figure 5:
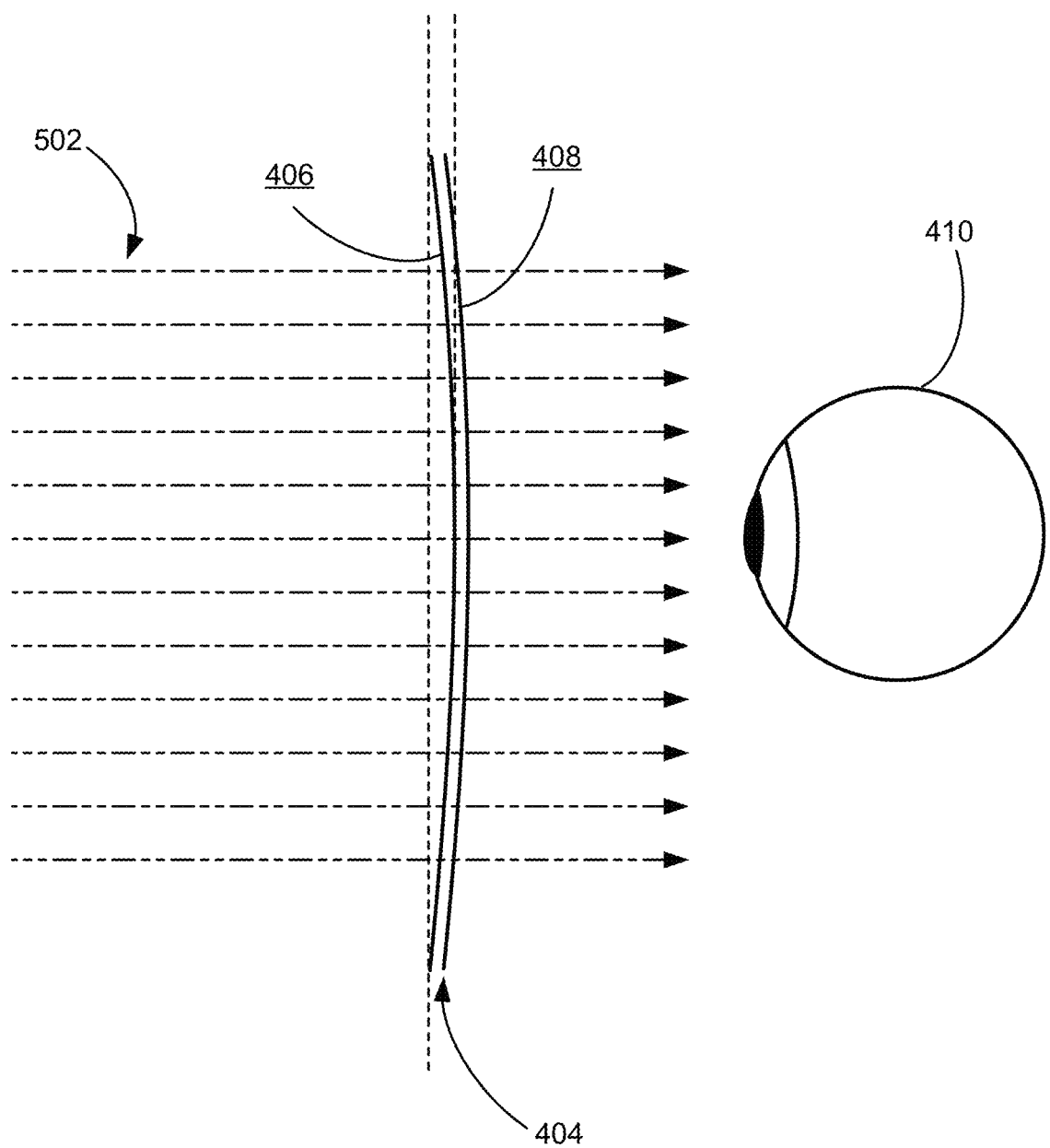
FIG. 5 is a simplified cross-sectional view of a waveguide layer of an eyepiece and light passing through the waveguide layer when the waveguide layer is characterized by a predetermined curvature.

FIG. 5 is a simplified cross-sectional view of a waveguide layer of an eyepiece and light passing through the waveguide layer when the waveguide layer is characterized by a predetermined curvature according to some embodiments. As described in FIG. 4, light projected from the waveguide layer 404 can cause a light source to appear to an eye of a user in a three-dimensional space. Real-world light 502, or light not projected through waveguide layer 404 for the purposes of VR or AR, can pass through input surface 406 and output surface 408 of waveguide layer 404 and towards eye 410 of a user. A waveguide with low thickness variation (e.g., less than 1.0 μm) has negligible optical power and can allow real world light 502 to pass through the curved surface of waveguide layer 404 with little or no disturbance. In some embodiments, no correction of real-world light is required, and there is reduced or no off-axis degradation of real-world light caused by the surface profile of waveguide layer 404. Thus, the imposition of a surface profile or curvature on the waveguide layer allows for the projection of virtual content from positions at a distance from the eyepiece while maintaining the integrity of real-world light, thereby allowing both real-world light to be viewed by a user and virtual content to be rendered for the user in real-time in three-dimensional space.

In some embodiments, the radius of curvature of the waveguide layer, which can be a polymer waveguide layer, can be dynamically varied between 0.1 m and infinity, which can dynamically vary the depth planes (i.e., the distance at which a projected light source appears to be rendered) of the eyepiece as well between 0.1 m and infinity. Thus, embodiments of the present invention enable variation of depth planes between 0.1 m and infinity, which includes all depth planes typically utilized in augmented or mixed reality applications. The surface profile of the waveguide layers, e.g., flexible polymer waveguide layers, can be adjusted using various methodologies and mechanisms as described in more detail throughout the present specification.

In some of the embodiments described below, dynamic eyepieces are provided in which the depth plane of the eyepiece can be varied to display virtual content at different depth planes, for example, temporal variation as a function of time. Accordingly, subsequent frames of virtual content can be displayed, appearing to originate from different depth planes. However, static implementations are also included within the scope of the present invention. In these static implementations, a fixed and predetermined surface profile or curvature is imposed on the waveguide layers of the eyepiece, thereby presenting the virtual content at a fixed depth plane. In contrast with systems utilizing external lenses, diffractive lenses, or other optical elements, embodiments utilizing a static implementation can implement a depth plane through curvature of the waveguide layers, reducing system complexity and improving optical quality. Moreover, some embodiments can implement a set of eyepieces, each eyepiece including a stack of curved waveguide layers to provide two static depth planes. As an example, a first stack of three curved waveguide layers could utilize a bow of 0.2 mm across the width/length of the waveguide stack to implement a three-color scene at a depth plane positioned at 1 m and a second stack of three curved waveguide layers could utilize a bow of 0.4 mm across the width/length of the waveguide stack to implement a second three-color scene at a depth plane positioned at 0.5 m.

Figure 6A:
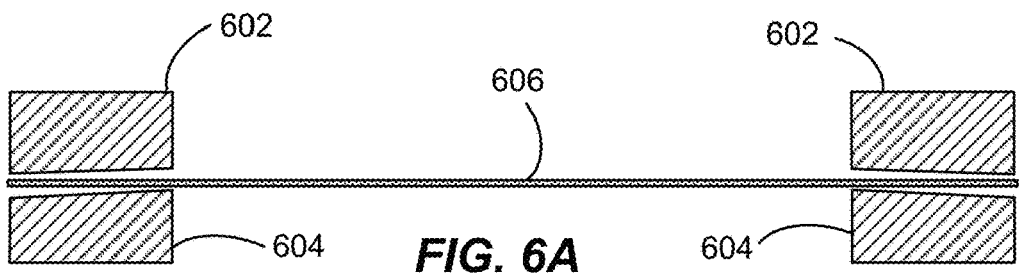
FIG. 6A illustrates a cross-sectional view of a first configuration of a system for dynamically adjusting a surface profile of a waveguide layer according to some embodiments.

FIG. 6A illustrates a cross-sectional view of a first configuration of a system for dynamically adjusting a surface profile of a waveguide layer according to some embodiments. In some embodiments, a waveguide layer can be positioned between two angled, rigid surfaces acting as clamps on the waveguide layer when actuated, resulting in an adjustment to the surface profile or curvature of the waveguide layer. In FIG. 6A, waveguide layer 606, which can be a planar or relatively planar polymer waveguide layer, is positioned between two ring-shaped clamping mechanisms, i.e., top clamping mechanism 602 and bottom clamping mechanism 604. In FIG. 6A, the two ring-shaped clamping mechanisms are positioned in an unactuated configuration, thereby allowing waveguide layer 606 to take on a first surface profile, for example, a planar surface profile or a surface profile with a small inherent curvature. A periphery of the waveguide layer 606 can be positioned or otherwise aligned between a bottom surface of top clamping mechanism 602 and a top surface of bottom clamping mechanism 604. The bottom surface of the top clamping mechanism 602 and the top surface of the bottom clamping mechanism 604 can be angled complementary to each other. Additional description of the clamping mechanism is provided in relation to FIGS. 6C and 6D.

Figure 6B:
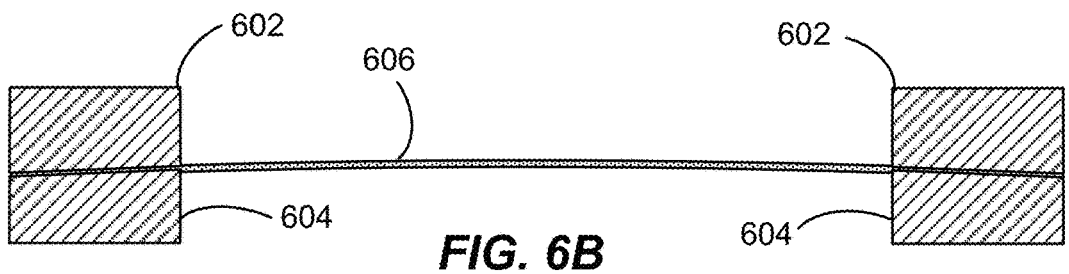
FIG. 6B illustrates a cross-sectional view of a second configuration of the system for dynamically adjusting a surface profile of a waveguide layer illustrated in FIG. 6A.

FIG. 6B illustrates a cross-sectional view of a second configuration of the system for dynamically adjusting the surface profile of a waveguide layer illustrated in FIG. 6A. As illustrated in FIG. 6B, top clamping mechanism 602 and bottom clamping mechanism 604 can be actuated to apply mechanical force against the periphery of waveguide layer 606. As shown in FIG. 6B, actuation of the two ring-shaped clamping mechanisms apply a mechanical force to the periphery of waveguide layer 606, which bends in response to the mechanical force at an angle equal to the angle defined by the complementary shape of top clamping mechanism 602 and bottom clamping mechanism 604. Thus, adjusting waveguide layer 606, for example, from a planar surface profile to a curved surface profile, by applying mechanical force at the periphery of the waveguide layer can adjust the radius of curvature of the waveguide layer. The angle defined by top clamping mechanism 602 and bottom clamping mechanism 604 can be predefined by the structure of top clamping mechanism 602 and bottom clamping mechanism 604, such that different structures able to impose different surface profiles, resulting in the production of different depth planes, can be fabricated for various applications. Deactuation of the two ring-shaped clamping mechanisms removes the mechanical force at the periphery of the waveguide layer, which returns to the original surface profile, for example, planar, as illustrated in FIG. 6A.

According to embodiments of the present invention, application of the bending moment at the periphery of the waveguide layer results in modulation of the surface profile or curvature of the waveguide layer uniformly across the width/length of the waveguide layer and the aperture area of the associated eyepiece.

FIG. 6C illustrates a plan view of the system for dynamically adjusting the surface profile of a waveguide layer illustrated in FIGS. 6A and 6B. As illustrated in FIG. 6C, the periphery of waveguide layer 606 is in contact with annularly-shaped top clamping mechanism 602 and complementarily-shaped bottom clamping mechanism 604 (not shown).

Utilizing a variable surface profile structure as illustrated in FIGS. 6A and 6B provides a dynamic eyepiece in which the depth plane of the eyepiece can be varied to display virtual content at different depth planes. Accordingly, using a single eyepiece, for example, containing three waveguide layers, each associated with a primary color, time division multiplexing techniques can be utilized to display virtual content appearing to originate from different depth planes. Although the embodiment illustrated in FIGS. 6A and 6B provides for two different depth planes, other implementations enable a continuous variation in surface profile, thereby providing for dynamic eyepieces with continuous depth plane variation. In addition, virtual content can be shifted to a different depth plane as a function of user motion, when a user blinks, or the like. Since the current depth plane associated with the eyepiece can be correlated with the virtual content to be displayed, the depth plane can be adjusted as a function of the virtual content. One of ordinary skill in the art would recognize many variations, modifications, and alternatives.

Referring once again to FIG. 6C, mechanical force can be applied uniformly to the periphery of waveguide layer 606 through actuation of top-clamping mechanism 602 and bottom clamping mechanism 604 (not shown). In this embodiment, the annularly shape of the two ring-shaped clamping mechanisms conforms to the shape of waveguide layer 606. In other embodiments, the clamping mechanisms can be shaped to conform to waveguide layers having shapes other than a circular shape.

FIG. 6D illustrates a plan view of an alternative system for dynamically adjusting the surface profile of a waveguide layer illustrated in FIGS. 6A and 6B. As illustrated in FIG. 6D, an eyepiece can include a waveguide layer 610 that is characterized by a teardrop shape in plan view. Although a teardrop shape is illustrated in FIG. 6D, embodiments of the present invention are not limited to this particular shape and other shapes are included within the scope of the present invention.

A fixed portion 612 of the waveguide layer can be affixed to or otherwise hold in place portions of waveguide layer 610 adjacent the fixed portion. As an example, ICG 613 can be positioned near the middle of fixed portion 612. In order to prevent modification of the surface profile of the waveguide layer in the vicinity of ICG 613, fixed portion 612 is utilized to maintain the surface profile of this portion of the waveguide layer in a fixed surface profile. In other embodiments, the fixed portion can loosely hold waveguide layer 610 in place, for instance, by utilizing one or more shims between waveguide layers, to allow portions of waveguide layer 610 adjacent fixed portion 612 to bend or remain in an original condition without obstruction by fixed portion 612 as discussed in additional detail in relation to FIG. 16.

A top C-shaped clamping mechanism 608 can then be coupled to fixed portion 612 to fully surround waveguide layer 610 along the periphery of the waveguide layer. Top C-shaped clamping mechanism 608 can adjust the surface profile of a majority of waveguide layer 610 by clamping waveguide layer 610 against a complementary bottom C-shaped clamping mechanism (not shown in this plan view) as described in previous examples. Utilization of a C-shaped clamping mechanism as illustrated in FIG. 6D enables a sufficient portion of the periphery of the waveguide layer to be oriented at a predetermined angle such that the viewing area of the eyepiece is characterized by a surface profile or curvature that is uniform across the width/length of the viewing area while maintaining portions of the waveguide layer at a fixed surface profile independent of the actuation of the clamping system. In embodiments utilizing multiple waveguide layers, C-shaped clamping mechanism 608 can incorporate shims or other flexible mating surfaces as described in more detail in relation to FIG. 16 to enable adjacent waveguide layers to slide and/or rotate independently from each other.

In some examples, portions of the clamping mechanism can be segregated, such that varying mechanical forces can be applied to different portions along the periphery of a waveguide layer. For example, an annularly-shaped clamping mechanism can be bifurcated, separated into quadrants, or any number of sections having same or different clamping angles. The various sections of a clamping mechanism can be activated simultaneously, alternatively, or in combination, such that some portions of the periphery of a waveguide can be clamped and some portions can remain unclamped. This can allow for movement or positioning of virtual content across a range at different depth planes from the perspective of the user.

Figure 6E:
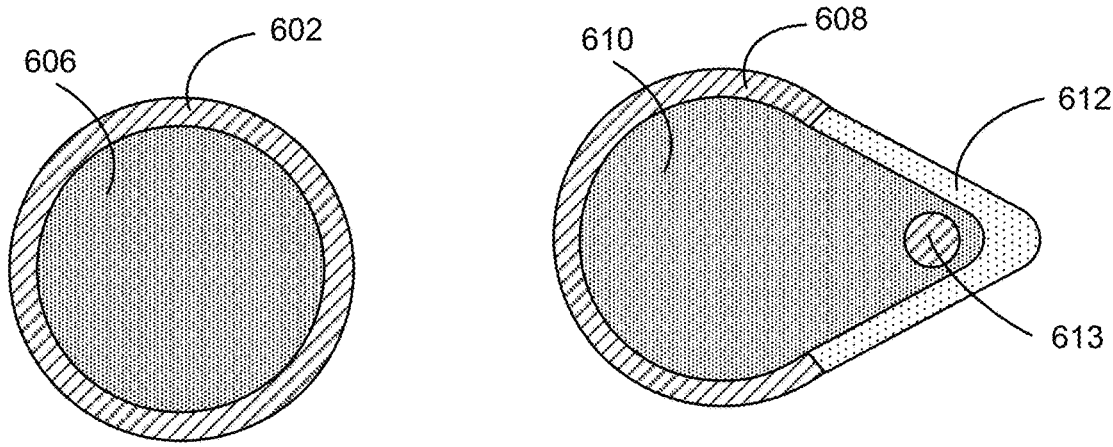
FIG. 6E illustrates a cross-sectional view of a third configuration of a system for dynamically adjusting a surface profile of a waveguide layer according to some embodiments.
Figure 6E:
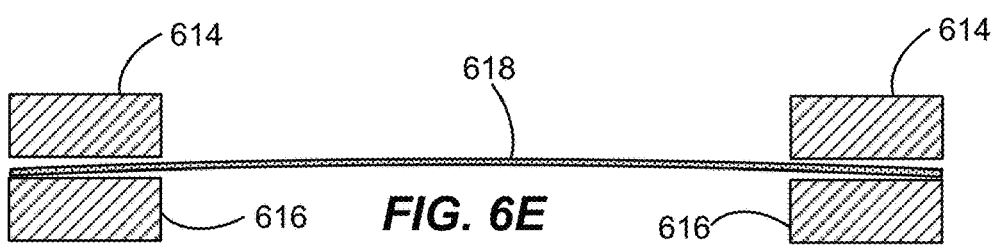
Figure 6F:
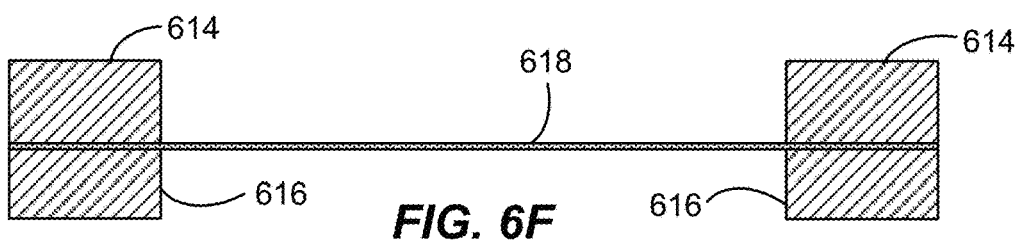
FIG. 6F illustrates a cross-sectional view of a fourth configuration of the system for dynamically adjusting a surface profile of a waveguide layer illustrated in FIG. 6E.

In some embodiments, a waveguide can be pre-curved and then clamped to bend to a less curved or planar state. FIG. 6E illustrates a cross-sectional view of a third configuration of a system for dynamically adjusting a surface profile of a waveguide layer according to some embodiments. FIG. 6F illustrates a cross-sectional view of a fourth configuration of the system for dynamically adjusting a surface profile of a waveguide layer illustrated in FIG. 6E. As shown in FIGS. 6E and 6F, waveguide layer 618 can be curved with a predetermined surface profile, for example, a predetermined radius of curvature. The waveguide layer can then be positioned between two ring-shaped clamping mechanisms, top clamping mechanism 614 and bottom clamping mechanism 616, in a manner similar to the embodiment described in relation to FIGS. 6A-6B. In FIG. 6E, the two ring-shaped clamping mechanisms are positioned in an unactuated configuration, thereby allowing waveguide layer 618 to take on a first surface profile, for example, a curved surface profile associated with display of a first depth plane. A periphery of waveguide layer 618 can be positioned or otherwise aligned between a bottom surface of top clamping mechanism 614 and a top surface of bottom clamping mechanism 616. The periphery of waveguide layer 618 can be in contact with annularly-shaped top clamping mechanism 614 or complementarily-shaped bottom clamping mechanism 616. The bottom surface of the top clamping mechanism 614 and the top surface of the bottom clamping mechanism 616 can be angled complementary to each other. These complementary surfaces of the clamping mechanisms can be flat, or planar, to bend waveguide layer 618 from a predetermined curvature into a planar state or a state with a reduced curvature. In some examples, the complementary surfaces can be angled to bend waveguide layer 618 at a smaller angle than the predetermined surface profile of waveguide layer 618 to produce a reduced radius of curvature. As shown in FIG. 6F, actuation of the two ring-shaped clamping mechanisms apply a mechanical force to the periphery of waveguide layer 618, which bends in response to the mechanical force at an angle equal to the angle defined by the complementary shape of top clamping mechanism 614 and bottom clamping mechanism 616. Thus, adjusting waveguide layer 618, for example, from a curved surface profile to a planar surface profile, by applying mechanical force at the periphery of the waveguide layer can adjust the radius of curvature of the waveguide layer. The angle defined by top clamping mechanism 614 and bottom clamping mechanism 616 can be predefined by the structure of top clamping mechanism 614 and bottom clamping mechanism 616, such that different structures able to impose different surface profiles, resulting in the production of different depth planes, can be fabricated for various applications. Deactuation of the two ring-shaped clamping mechanisms removes the mechanical force at the periphery of the waveguide layer, which returns to the original surface profile, for example, curved, illustrated in FIG. 6E.

The embodiments described in relation to FIGS. 6A-6F can provide operation in a bi-modal manner, meaning that the clamping mechanism can cause a waveguide layer to switch between two discrete states and thereby render projected virtual content at two different and discrete depths from the eye of a user. For example, as illustrated in FIGS. 6A and 6B, waveguide layer 606 can operate in a planar, or "plano," mode and can then be bent to operate in a curved mode. The waveguide layer can be continuously transitioned between these two states. As another example of bi-modal operation, as described in relation to FIGS. 6E and 6F, waveguide layer 616 can operate in a curved mode and can then be bent to operate in a planar, or "plano," mode, and vice versa. In other examples, a waveguide can have a predefined radius of curvature and be bent to have a different radius of curvature, either lower or higher, depending on the predefined angle of the clamping mechanism.

Figure 7A:
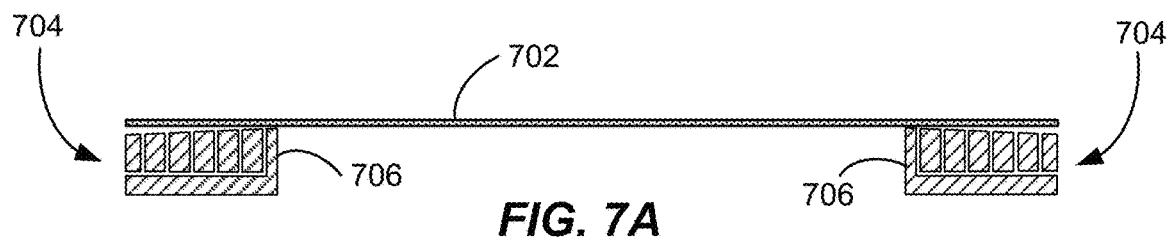
FIG. 7A illustrates a cross-sectional view of a first configuration of a system for dynamically adjusting a surface profile of a waveguide layer according to some embodiments.

FIG. 7A illustrates a cross-sectional view of a first configuration of a system for dynamically adjusting a surface profile of a waveguide layer according to some embodiments. As illustrated in FIG. 7A, a vacuum chuck system is utilized to dynamically adjust the surface profile or curvature of a waveguide layer. The discussion provided in relation to FIGS. 6A-6F is applicable to the embodiments illustrated in FIGS. 7A-7D as appropriate, for example, with the clamping mechanism illustrated in FIG. 6A replaced with a vacuum chuck system as illustrated in FIG. 7A. In the embodiments illustrated in FIGS. 7A-7D, a waveguide layer is positioned or otherwise situated on top of a vacuum chuck mechanism.

Referring to FIG. 7A, a planar or relatively planar waveguide layer 702, which can be a flexible, polymer waveguide, can be positioned against vacuum chuck mechanism 704, which can have an annular or ring-based shape as discussed in relation to FIGS. 6C and 6D. A periphery of waveguide layer 702 is positioned or otherwise aligned with vacuum chuck mechanism 704. The vacuum chuck mechanism 704 can include a fixed portion 706 that can also house components used to apply a vacuum force within vacuum chuck mechanism 704.

The top surface of fixed portion 706 is tilted at a predetermined angle, similar to the top surface of bottom clamping mechanism 604 illustrated in FIG. 6A. Prior to actuation, the outer periphery of waveguide layer 702 is positioned above the outer periphery of the top surface of fixed portion 706, illustrated by the vertical gap between these portions in FIG. 7A. The inner periphery of waveguide layer 702 is in contact with the top surface of fixed portion 706. Thus, in this first configuration, a planar waveguide layer can be supported by vacuum chuck mechanism 704 and maintain a planar surface profile.

Figure 7B:
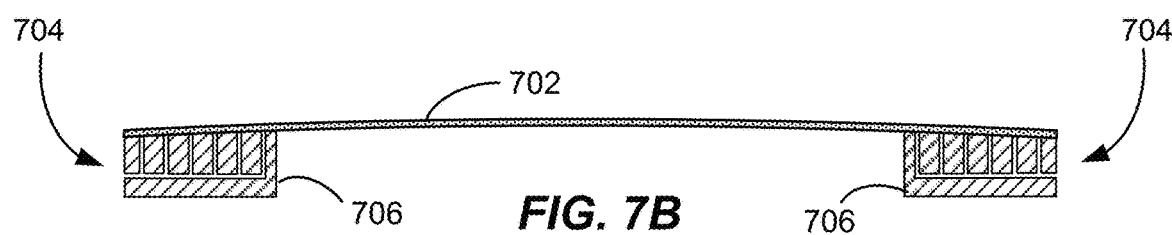
FIG. 7B illustrates a cross-sectional view of a second configuration of the system for dynamically adjusting a surface profile of a waveguide layer illustrated in FIG. 7A.

FIG. 7B illustrates a cross-sectional view of a second configuration of the system for dynamically adjusting a surface profile of a waveguide layer illustrated in FIG. 7A. In FIG. 7B, a vacuum force has been applied to the periphery of waveguide layer 702 in response to actuation of vacuum chuck mechanism 704. In response to the vacuum force, the outer periphery of waveguide layer 702 is brought into contact with the outer periphery of the top surface of fixed portion 706 so that the entire periphery of waveguide layer 702 makes contact with fixed portion 706. Thus, when vacuum chuck mechanism 704 is actuated, generation of vacuum force at fixed portion 706 applies a mechanical force to the periphery of waveguide layer 702, which bends in response to the mechanical force at an angle equal to the angle defined by the shape of the top surface of fixed portion 706. Thus, adjusting waveguide layer 702, for example, from a planar surface profile to a curved surface profile, by applying mechanical force at the periphery of the waveguide layer can adjust the radius of curvature of the waveguide layer. The angle defined by the top surface of fixed portion 706 can be predefined by the structure of vacuum chuck mechanism 704 such that different structures able to impose different surface profiles, resulting in the production of different depth planes, can be fabricated for various applications. Deactuation of vacuum chuck mechanism 704 removes the mechanical force at the periphery of the waveguide layer, which returns to the original surface profile, for example, planar, as illustrated in FIG. 7A.

Vacuum chuck mechanism 704 illustrated in FIGS. 7A and 7B can bend a planar waveguide layer such that it is characterized by a surface profile defined by the angle of the structure of vacuum chuck mechanism 704. In other embodiments, a waveguide layer can have an initial predefined curvature and can be transitioned into a planar state.

Figure 7C:
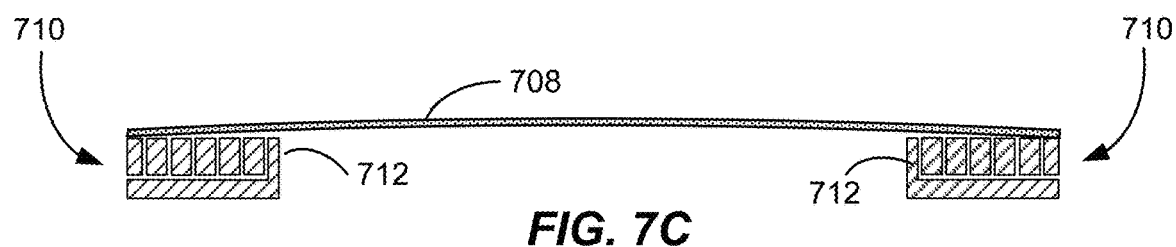
FIG. 7C illustrates a cross-sectional view of a third configuration of a system for dynamically adjusting a surface profile of a waveguide layer according to some embodiments.
Figure 7D:
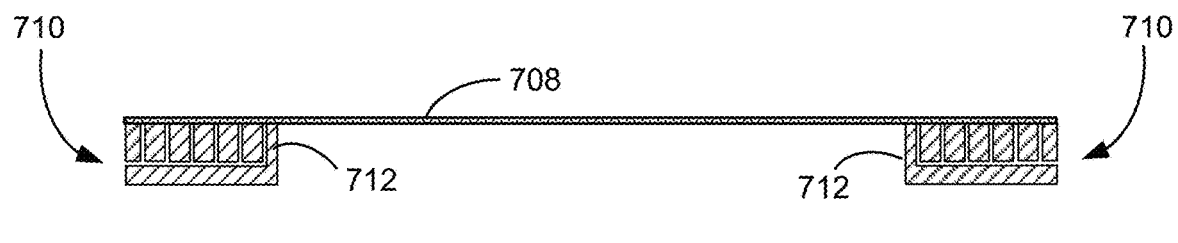
FIG. 7D illustrates a cross-sectional view of a fourth configuration of the system for dynamically adjusting a surface profile of a waveguide layer illustrated in FIG. 7C.

FIG. 7C illustrates a cross-sectional view of a third configuration of a system for dynamically adjusting a surface profile of a waveguide layer according to some embodiments. FIG. 7D illustrates a cross-sectional view of a fourth configuration of the system for dynamically adjusting a surface profile of a waveguide layer illustrated in FIG. 7C. As illustrated in FIG. 7C, waveguide layer 708 can have an original, or resting, state with a predefined curvature. Vacuum chuck mechanism 710 can have a flat surface upon which a portion of the periphery of waveguide layer 708 can be positioned on or otherwise situated. Due to the predefined curvature of waveguide layer 708, the inner periphery of waveguide layer 708 is positioned above the inner periphery of the top surface of fixed portion 712, illustrated by the vertical gap between these portions in FIG. 7C. The outer periphery of waveguide layer 708 is in contact with the top surface of fixed portion 712. Thus, in this third configuration, a curved waveguide layer can be supported by vacuum chuck mechanism 710 and maintain a curved surface profile.

As illustrated in FIG. 7D, when vacuum chuck mechanism 710 is actuated, the vacuum force pulls the curved periphery of waveguide layer 708 against the flat surface of fixed portions 712 of vacuum chuck mechanism 710, causing the waveguide layer to bend uniformly into a planar or substantially planar shape. According to embodiments of the present invention, application of the bending moment at the periphery of the waveguide layer results in modulation of the surface profile or curvature of the waveguide layer uniformly across the width/length of the waveguide layer and the aperture area of the associated eyepiece.

Vacuum chuck mechanism 704 can be annularly shaped to conform to the entire periphery of waveguide layer 702, similar to the clamping mechanism illustrated in FIG. 6C. In other embodiments, vacuum chuck mechanism 704 can be C-shaped around a teardrop-shaped waveguide, similar to the C-shaped clamping mechanism illustrated in FIG. 6D. Moreover, in alternative embodiments, portions of the vacuum chuck mechanism can be segmented or segregated, such that varying mechanical forces can be applied to different portions along the periphery of a waveguide layer. For example, an annularly-shaped vacuum chuck mechanism can be bifurcated, separated into quadrants, or any number of sections having same or different angles upon which the periphery of the waveguide is bent. The various sections of a vacuum chuck mechanism can be activated simultaneously, alternatively, or in combination, such that some portions of the periphery of a waveguide layer can be vacuum chucked and some portions can remain unchucked. This can allow for movement or positioning of virtual content across a range at different depth planes from the perspective of the user.

The embodiments described by FIGS. 7A-7D can provide operation in a bi-modal manner, meaning that the vacuum chuck mechanism can cause a waveguide layer to switch between two discrete states and thereby render projected virtual content at two different and discrete depths from the eye of a user. For example, as illustrated in FIGS. 7A and 7B, waveguide layer 702 can operate in a planar, or "plano," mode and can then be bent to operate in a curved mode. The waveguide can be continuously transitioned between these two states. As another example of bi-modal operation, as described in FIGS. 7C and 7D, waveguide layer 708 can operate in a curved mode, can then be bent to operate in a planar, or "plano," mode, and vice versa. In other examples, a waveguide can have a predefined radius of curvature and be bent to have a different radius of curvature, either lower or higher, depending on the predefined angle of the vacuum chuck mechanism.

Figure 8A:
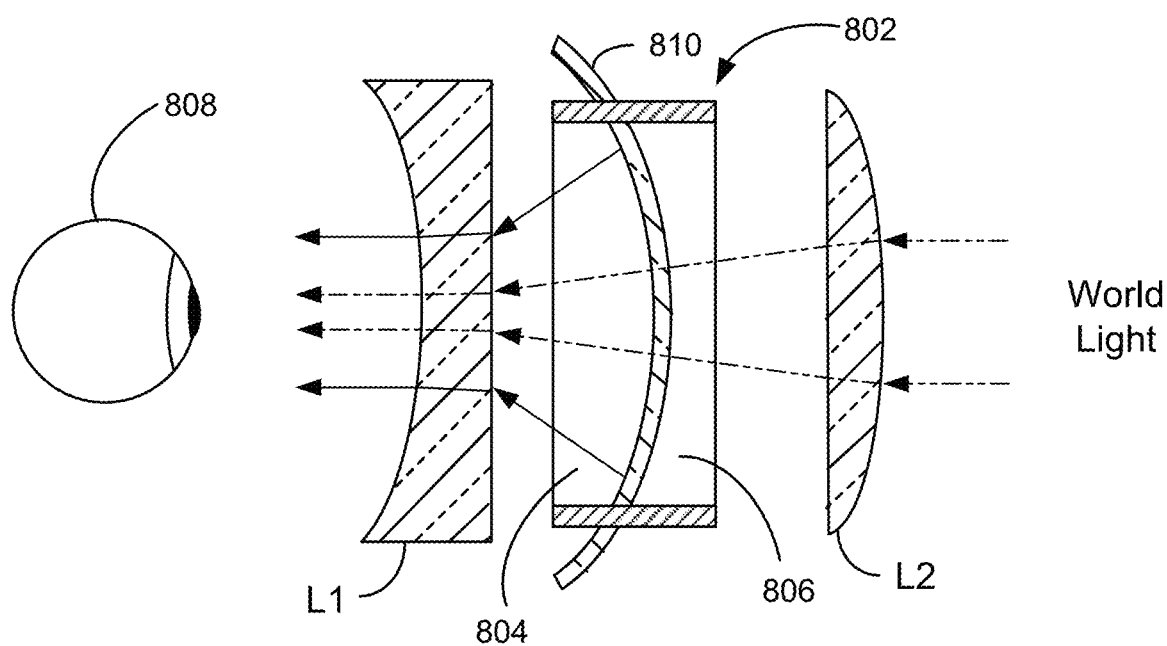
FIG. 8A illustrates a cross-sectional view of a first configuration of a pneumatic bladder system for dynamically adjusting a surface profile of a waveguide layer according to some embodiments.

FIG. 8A illustrates a cross-sectional view of a first configuration of a pneumatic bladder system for dynamically adjusting a surface profile of a waveguide layer according to some embodiments. As illustrated in FIG. 8A, a pneumatic system includes a pneumatic chamber 802 and lenses L1, L2. Pneumatic chamber 802 includes left chamber portion 804, right chamber portion 806, and waveguide layer 810, which is illustrated as a pre-curved polymer waveguide layer. Waveguide layer 810 is sealed in an airtight enclosure of pneumatic chamber 802. Left chamber portion 804 and right chamber portion 806 are sealed off from each other, therefore different pressures can be exerted within each chamber portion. Waveguide layer 810 is substantially rigid, but can be inverted to a substantially equal and opposite curvature. Increasing or decreasing the pressure within left chamber portion 804 or right chamber portion 806, depending on the level of pressure previously existing within each chamber portion, causes waveguide layer 810 to invert as described below in relation to FIG. 8B, inverting the curvature of waveguide layer 810. Pressure within left chamber portion 804 and right chamber portion 806 can be adjusted using one or more pneumatic devices (e.g., a positive pressure/negative pressure, e.g., vacuum device) (not shown).

Figure 8B:
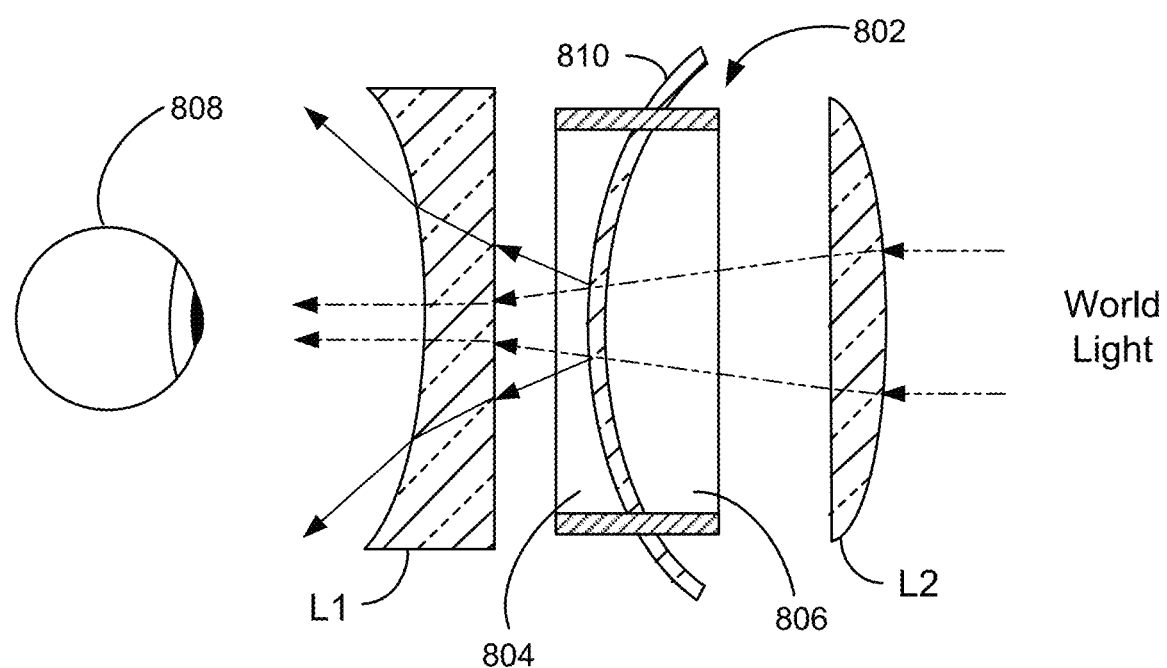
FIG. 8B illustrates a cross-sectional view of a second configuration of the pneumatic bladder system for dynamically adjusting a surface profile of the waveguide layer illustrated in FIG. 8A.

FIG. 8B illustrates a cross-sectional view of a second configuration of the pneumatic bladder system for dynamically adjusting a surface profile of the waveguide layer illustrated in FIG. 8A. To toggle waveguide layer 810 from a first configuration as illustrated in FIG. 8A to a second configuration as illustrated in FIG. 8B, a pressure change can be induced in either left chamber portion 804 and/or right chamber portion 806. For example, pressure in right chamber portion 806 can be increased to cause waveguide layer 810 to invert its curvature to that illustrated in FIG. 8B. Alternatively, pressure in left chamber portion 804 can be decreased to cause waveguide layer 810 to invert its curvature to that illustrated in FIG. 8B. As another example, pressure values in left chamber portion 804 and right chamber portion 806 can be simultaneously and inversely altered to toggle the states illustrated by FIGS. 8A and 8B. The embodiments illustrated in FIGS. 8A and 8B are energy efficient as a result of power only being utilized during a state change of waveguide layer 810.

In exemplary embodiments, lenses L1, L2 have complementary lens functions that are used to achieve two depth planes without affecting real-world light as perceived by eye 808 of a user. For example, considering waveguide layer 810 in the first configuration illustrated in FIG. 8A and lens L1 positioned between eye 808 and waveguide layer 810, waveguide layer 810 has an optical power of +0.75 D and L1 has an optical power of −0.75 D, which results in virtual content appearing to originate at infinity (i.e., the far plane). Referring to FIG. 8A, world light is focused as it passes through lens L2, which has an optical power of +0.75 D, passes through the curved surface of waveguide layer 810 with little or no disturbance as discussed in relation to FIG. 5, and is defocused as it passes through lens L1, which has an optical power of −0.75 D. Accordingly, the combination of lens L2, waveguide layer 810, and lens L1 enable world light to be viewed by the user with no optical power.

Referring to FIG. 8B, when waveguide layer 810 is inverted to the second configuration illustrated in FIG. 8B, waveguide layer 810 has an optical power of −0.75 D. In this second configuration, virtual content is projected from waveguide layer 810 and is defocused as it passes through L1, which has an optical power of −0.75 D. Therefore, the combination of waveguide layer in the second configuration and L1 result in an optical power of −1.5 D (i.e., the near plane). Accordingly, virtual content is presented at infinity in the first configuration and at 0.67 m in the second configuration. As discussed above, world light is presented to the user with no optical power applied to the world light since world light in the second configuration, like the first configuration, passes through the curved surface of waveguide layer 810 with little or no disturbance as discussed in relation to FIG. 5.

The embodiments described in relation to FIGS. 8A and 8B can provide operation in a bi-modal or bi-stable manner, meaning that changing pressure values within pneumatic chamber 802 can cause the waveguide layer to switch between two discrete states and thereby render projected virtual content at two different and discrete depths from the perspective of the user. For example, as illustrated in FIGS. 8A and 8B, waveguide layer 810 can operate in a curved mode and then be inverted to operate in an inverted curved mode. As discussed in relation to FIG. 6C, the shape of the waveguide layer can be circular, although this is not required by embodiments of the present invention.

In some embodiments, a waveguide layer can be positioned on, situated against, or otherwise affixed to a layer formed using an electroactive polymer (EAP). The EAP can be bonded to the waveguide layer by an adhesive, or molded as an element of the waveguide layer during the casting process. Some examples of EAPs include, but are not limited to, dielectric elastomers and ionic polymers, such as Nafion, Flemion, polyvinyl alcohol (PVA) gel, acrylamide and vinyl derivative copolymer, copoly(Aam/vdMG) gel, ProDOT-(CH3), polyacrylamide gel, polypyrrole (PPy), and polyaniline (PANI). EAPs can have an original unexpanded state having a certain width. Subsequently, the EAP can expand when a voltage is applied to the EAP. Varying the applied voltage can allow an EAP to expand to different lengths. A higher applied voltage can result in the EAP expanding to a greater distance than the expansion distance associated with a lower applied voltage. As described more fully below, applying varying voltages to an EAP affixed to a waveguide layer can cause the waveguide to bend to a predetermined curvature or surface profile based on the applied voltage.

FIG. 9A illustrates a cross-sectional view of a first configuration of an electroactive polymer (EAP) system for dynamically adjusting a surface profile of a waveguide layer according to some embodiments. As illustrated in FIG. 9A, a periphery of waveguide layer 902 is positioned against, bonded to, or otherwise affixed to one side of an EAP film 906, which may be a pre-stretched EAP film. The opposite side of EAP film 906 is affixed to a fixed frame structure 904. In the embodiment illustrated in FIG. 9A, waveguide layer 902 can have a curved or nearly planar surface profile, thereby being characterized by a large radius of curvature (e.g., 2.0 meters), which is typically suitable to provide acceptable accommodation. Generally, some curvature is desirable in this configuration in order to achieve a predictable bending of the waveguide layer as described more fully below.

FIG. 9B illustrates a cross-sectional view of a second configuration of the EAP system for dynamically adjusting a surface profile of a waveguide layer illustrated in FIG. 9A. In the second configuration illustrated in FIG. 9B, a voltage source 908 is electrically coupled to EAP film 906. A voltage can be applied to EAP film 906 by voltage source 908. Applying a voltage across EAP film 906 causes EAP film 906 to expand linearly in volume inward towards the center of the waveguide layer 902. Accordingly, expanding EAP film 906 inward causes waveguide layer 902, which is bonded to EAP film 906 to be compressed uniformly and radially in all directions, increasing the curvature of waveguide layer 902 and resulting in a decreased radius of curvature (e.g., 0.3 m in this example). When the applied voltage from voltage source 908 is removed, EAP film 906 contracts back to its original state, thereby causing waveguide layer 902 to return to its original uncompressed state as a result of the natural tensile strength of waveguide layer 902.

In some exemplary embodiments, the applied voltage provided by voltage source 908 can be reduced or altered from a maximum applied voltage. Varying the voltage applied to EAP film 906 can cause waveguide layer 902 to be compressed into multiple configurations corresponding to varying radius of curvature values, such that each voltage level applied to EAP film 906 corresponds to a different resulting radius of curvature value being exhibited by waveguide layer 902. Varying the voltage applied to EAP film 906 can thus enable continuous modulation of curvature of waveguide layer 902. As a result, waveguide layer 902, through structural manipulation of EAP film 906, can be continuously altered to project virtual content to a user at multiple depth planes. For example, the natural state of waveguide layer 902 can have a radius of curvature value appropriate to project virtual content originating at a distance of 2 m from the eyepiece. A small voltage value can then be applied to EAP film 906 using voltage source 908 to cause waveguide layer 902 to compress slightly. This slight compression, which reduces the radius of curvature of waveguide layer 902 can correspond to virtual content projected to originate at a distance closer to the user than 2 m (e.g., 1 m). A higher voltage can then be applied to EAP film 906 using voltage source 908 to cause waveguide layer 902 to compress by an additional amount. Further compressing waveguide layer 902 further reduces the radius of curvature value, which can be used to render virtual content originating at a distance closer to the user than 1 m (e.g., 0.5 m). Applying no voltage, the small voltage, and the higher voltage to the EAP film consecutively, for example, at a refresh rate of 90 Hz, enables display of virtual content at three depth planes corresponding to the three radii of curvature achieved using the extension of the EAP film and the resulting compression of the waveguide layer.

Generally, the EAP film extends in length linearly with applied voltage. Similarly, the decrease in curvature of the waveguide layer can be a linear function of applied voltage. For many of the operating conditions described herein, this linear behavior is applicable. However, this is not required by the present invention. In some embodiments, the compression of the waveguide layer will initially result in a linear decrease in radius of curvature with applied voltage, but then become non-linear as the waveguide layer compresses further. Thus, embodiments of the present invention can map the radius of curvature to the applied voltage, accounting for any non-linearity in the response of the waveguide layer. One of ordinary skill in the art would recognize many variations, modifications, and alternatives.

In an alternative embodiment, the waveguide layer is fabricated with a radius of curvature of 1 m. When attached to the EAP film, the waveguide layer is stretched to partially flatten the waveguide layer so that the radius of curvature is 2 m. During operation, the first meter of variation in radius of curvature is provided by the restoring force built into the system. To decrease the radius of curvature to values less than 1 m, the applied voltage is utilized to extend the length of the EAP film.

FIG. 9C illustrates a plan view of components of the EAP system for dynamically adjusting the surface profile of a waveguide layer illustrated in FIGS. 9A and 9B. As illustrated in FIG. 9C, waveguide layer 902 is attached at peripheral locations to EAP film 906, which surrounds waveguide layer 902 and is attached to fixed frame structure 904. Although the periphery of waveguide layer 902 is circularly shaped and bonded to annularly-shaped EAP film 906, which is bonded to fixed frame structure 904 in FIG. 9C, embodiments of the present invention are not limited to this implementation. Although not illustrated in FIG. 9C, EAP film 906 is electrically coupled to a voltage source. The voltage source can apply one or more voltage values to EAP film 906 to expand EAP film 906 inward from fixed frame structure 904 and thereby compress waveguide layer 902 inward towards the center of the system, continuously changing the radius of curvature of waveguide layer 902 as illustrated in FIG. 9C.

FIG. 9D illustrates a plan view of components of an EAP system for dynamically adjusting the surface profile of an alternative waveguide layer according to some embodiments. In the embodiment illustrated in FIG. 9D, the waveguide layer is implemented as a teardrop-shaped waveguide layer 908 bonded to a corresponding teardrop-shaped EAP film 912 that is affixed to a tear-drop shaped fixed frame structure 910. In a manner similar to that discussed in relation to FIG. 9C, actuation of the EAP film results in compression of the waveguide layer and modification of the surface profile of the waveguide layer.

FIG. 9E illustrates a plan view of components of an alternative EAP system for dynamically adjusting the surface profile of an alternative waveguide layer according to some embodiments. FIG. 9E illustrates teardrop-shaped waveguide 914 with a periphery bonded to circularly shaped EAP film 918 that is affixed to circularly-shaped fixed frame structure 916. Voltage can be applied to EAP film 918 in FIG. 9E in a similar manner to that described with respect to FIG. 9C to expand the EAP film linearly and compress the waveguide layer inward. The varying width of the EAP film as a function of radial position enables differing expansion lengths and resulting forces, thereby enabling different compression values to be applied to the waveguide layer as a function of radial position. Thus, more uniform spherical curvature can be provided by embodiments of the present invention through selection of the EAP film width. As will be evident to one of skill in the art, the various shapes utilized for the EPA film and/or the fixed frame structure can affect how the EAP films expand to exert different forces across varying portions of the waveguide layer.

In some examples, portions of the EAP film can be segregated, such that varying mechanical forces can be applied to different portions along the periphery of a waveguide layer. For example, an annularly-shaped or teardrop-shaped EAP film can be bifurcated, separated into quadrants, or any number of sections. Each section can be connected to one or more voltage sources to apply varying levels of voltage to different sections of the EAP film in a given instance. The various sections of an EAP film can be actuated simultaneously, alternatively, or in combination, such that portions of the EAP film can expand inward towards the waveguide more or less than other portions of the EAP film. This can reduce focusing error and account for EAP systems with varying component shapes in relation to the shape of the waveguide. Varying the resistivity of portions of the EAP film can produce a similar effect of varying the compressive force applied to the periphery of the waveguide when a single voltage value is applied to the EAP film.

Figure 10A:
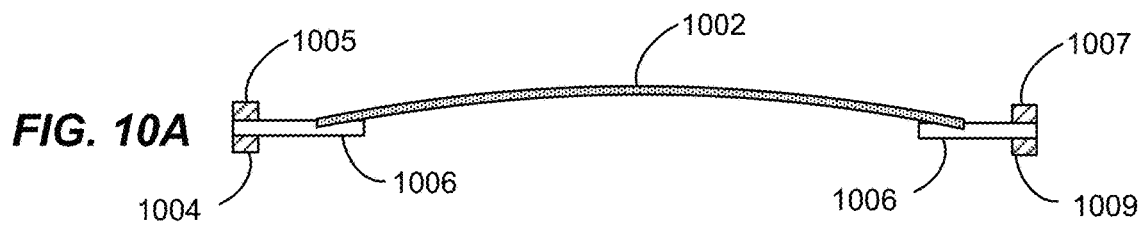
FIG. 10A illustrates a cross-sectional view of a first configuration of a mechanical system for dynamically adjusting a surface profile of a waveguide layer according to some embodiments.
Figure 10B:
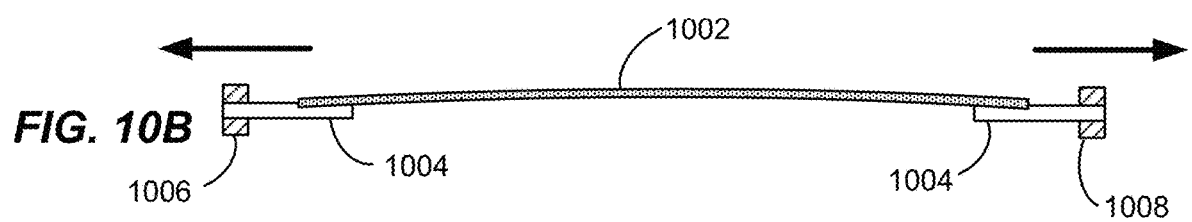
FIG. 10B illustrates a cross-sectional view of a second configuration of the mechanical system for dynamically adjusting a surface profile of a waveguide layer illustrated in FIG. 10A.

FIG. 10A illustrates a cross-sectional view of a first configuration of a mechanical system for dynamically adjusting a surface profile of a waveguide layer according to some embodiments. As illustrated in FIGS. 10A-10B, radial stretching is used to dynamically adjust the surface profile, e.g., the radius of curvature of the waveguide layer. Referring to FIG. 10A, a periphery of waveguide layer 1002 can be positioned against, bonded to, or otherwise affixed to viscoelastic polymer layer 1006. Viscoelastic polymer layer 1006 can absorb energy and relax stress, and can be repeatedly stretched and relaxed for continuous operation. Examples of such viscoelastic polymer films include, but are not limited to, acrylic foam, PDMS, PVC, polyolefin, and polyethylene. Viscoelastic polymer layer 1006 can be bonded to waveguide layer 1002, which may be a polymer waveguide layer, by adhesive or molded as an element of waveguide layer 1002 directly during the casting process. Viscoelastic polymer layer 1006 can be affixed to support posts 1004/1009 and 1005/1007, which are mechanically coupled to slotted disks as described more fully below in relation to FIG. 10C.

Waveguide layer 1002 can be fabricated in such a manner to be characterized by an initial curvature in the surface profile, for example, having a predetermined radius of curvature, for instance 0.3 m.

FIG. 10B illustrates a cross-sectional view of a second configuration of the mechanical system for dynamically adjusting a surface profile of a waveguide layer illustrated in FIG. 10A. In FIG. 10B, a mechanical force has been applied to support posts 1004/1009 and 1005/1007 to pull viscoelastic polymer layer 1006 radially outward, which causes waveguide layer 1002 to stretch radially outward, reducing the radius of curvature of waveguide layer 1002, for example, to 2 m. Utilizing the embodiment illustrated in FIGS. 10A-10C, waveguide layer 1002 can be stretched continuously up to a planar or substantially planar surface profile and thereby achieve multiple configurations having a range of radius of curvature values. In some implementations, the periphery of waveguide layer 1002 can be formed with a flat surface profile to facilitate bonding to support posts 1004/1009 and 1005/1007.

Figure 10C:
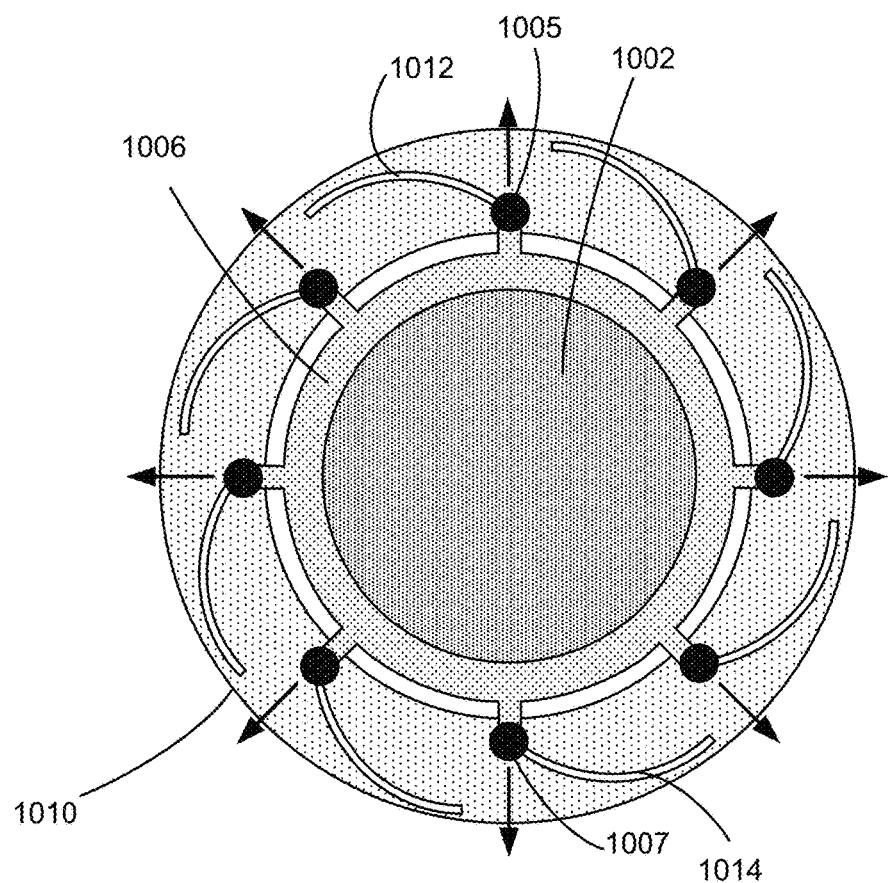
FIG. 10C illustrates a plan view of components of the mechanical system for dynamically adjusting the surface profile of a waveguide layer illustrated in FIGS. 10A and 10B.

FIG. 10C illustrates a plan view of components of the mechanical system for dynamically adjusting the surface profile of a waveguide layer illustrated in FIGS. 10A and 10B. As illustrated in FIG. 10C, radial stretching of the viscoelastic polymer layer is implemented using a pair of disks including top disk 1010 and a corresponding bottom disk (not shown). These disks have slots through which support posts 1004/1009 and 1005/1007 pass respectively. Top disk 1010 and the bottom disk (not shown) can rotate against each other around the center of waveguide layer 1002. For example, top disk 1010 can rotate clockwise and the bottom disk can simultaneously rotate counter-clockwise to shift the support posts from the first configuration illustrated in FIG. 10A to the second, fully stretched configuration illustrated in FIG. 10B. For example, support post 1005 can move along slot 1012 and support post 1007 can move along slot 1014 as top disk 1010 and the bottom disk rotate against each other. This mechanism is sometimes referred to as a Longworth chuck. Mechanical force applied to the support posts by the rotating disks can cause the support posts to move along the slots, which can increase the distance between the support posts and the center of waveguide layer 1002. The increase in distance of the support posts from the center of the system can stretch viscoelastic polymer layer 1006 radially outward, and in turn, increase the radius of curvature of waveguide layer 1002.

The mechanical (i.e., radial stretcher) system illustrated in FIGS. 10A-10C can include any number of support posts and corresponding slots depending on the application. For example, if the support posts are connected directly to the waveguide layer, more support posts may be utilized (e.g., greater than or equal to 8) to achieve uniform radial stretching, which can result in a spherical curvature of the waveguide layer because the waveguide layer may be less flexible than the viscoelastic polymer layer. If the mechanical (i.e., radial stretcher) system is connected to the polymer waveguide through another layer of viscoelastic "memory" polymer, the number of the support posts can be reduced as the viscoelastic film would re-distribute the stress. Regardless, in some embodiments, increasing the number of support posts can produce a more uniform stress distribution on the polymer waveguide.

In some implementations, the stretching force applied by the rotational movement of top disk 1010 and the bottom disk along with corresponding support posts can be applied at different force values to produce multiple waveguide configurations in continuous operation. Thus, top disk 1010 and the bottom disk can be rotated to any configuration between the first configuration illustrated in FIG. 10A (i.e., waveguide layer 1002 is in a resting state) and the second configuration illustrated in FIG. 10B (i.e., the waveguide is stretched to a maximum value as the support posts reach the ends of the slots, positioning the support posts at a maximum distance furthest from the center of the system). Varying the position of the support posts along the slots, resulting in different stretching distances for the viscoelastic polymer layer can cause the waveguide layer to be stretched into multiple states corresponding to varying surface profile or radius of curvature values. As a result, the surface profile of waveguide layer 1002 can be continuously altered to project virtual content to a user at multiple depth planes. Releasing the force utilized to rotate top disk 1010 and the bottom disk can allow viscoelastic polymer layer 1006 to contract back to its original configuration via its tensile strength, which can cause waveguide layer 1002 to revert to the first configuration illustrated in FIG. 10A. In examples where the waveguide layer is directly connected to the support posts without the use of a viscoelastic polymer layer, after releasing the stretching force caused by the rotating disk mechanism, the tensile force of the waveguide layer can cause the waveguide layer to contract to its original state and pull the support posts back into the first non-stretched configuration. When all the support posts move inwards gradually, both viscoelastic polymer layer 1006 and waveguide layer 1002 can be gradually restored to their original configurations.

In some examples, the slots in the top and bottom disks can be different lengths and shapes, such that the slots towards one side of the radial stretcher system are progressively longer than slots towards the opposite side. Varying slot sizes can be used in application where the waveguide and/or the viscoelastic polymer layer are noncircular in design, enabling certain portions of the waveguide and viscoelastic polymer layer to be stretched more than other portions, thereby achieving a uniform stress distribution. It should be noted that alternative embodiments can be implemented in which the first configuration is characterized by a larger radius of curvature and the second configuration is characterized by a smaller radius of curvature, with the mechanical system compressing the waveguide layer during the continuous transition from the first to the second configuration. One of ordinary skill in the art would recognize many variations, modifications, and alternatives.

FIG. 11A illustrates a cross-sectional view of a first configuration of an alternative mechanical system for dynamically adjusting a surface profile of a waveguide layer according to some embodiments. As will be evident to one of skill in the art, the system utilizing stretching of a viscoelastic polymer film illustrated in FIGS. 11A-11E shares common elements with the system illustrated in FIGS. 10A-10C and the description provided in relation to FIGS. 10A-10C is applicable to FIGS. 11A-11E as appropriate. As illustrated in FIG. 11A, a periphery of waveguide layer 1102 can be positioned against, bonded to, or otherwise affixed to viscoelastic polymer layer 1104. Viscoelastic polymer layer 1104 can be attached to actuator 1108, which can be shaped as an annular or ring-shaped element.

FIG. 11B illustrates a cross-sectional view of a second configuration of the alternative mechanical system for dynamically adjusting a surface profile of a waveguide layer illustrated in FIG. 11A. A fixed frame 1106, which can also have an annular or ring shape, having a smaller diameter than actuator 1108 can be located under waveguide layer 1102. Waveguide layer 1102 can be fabricated in such a manner to be characterized by an initial curvature in the surface profile, for example, having a predetermined radius of curvature, for instance 0.3 m. Referring to FIG. 11B, as actuator 1108 moves co-axially with respect to fixed frame 1106, viscoelastic polymer layer 1104 stretches, for example, uniformly, around and past the edge of fixed frame 1106, thereby causing waveguide layer 1102 to stretch radially outward into a planar, substantially planar, or less curved configuration. Thus, by pulling down on actuator 1108, continuous variation of the surface profile of waveguide layer 1102 can be achieved. To decrease the radius of curvature, upward motion of actuator 1108 enables the tensile strength of viscoelastic polymer layer 1104 and waveguide layer 1102 to be restored to the first configuration illustrated in FIG. 11A. Examples of types of actuators that can be used in these and similar embodiments can include, but are not limited to, voice coil actuators, piezoelectric actuators, air cylinders, and the like. Embodiments of the present invention thus enable a compact design in which vertical motion of an actuator results in horizontal stretching of the waveguide layer.

FIG. 11C illustrates a plan view of components of the alternative mechanical system for dynamically adjusting the surface profile of a waveguide layer illustrated in FIGS. 11A and 11B. As illustrated in FIG. 11C, waveguide layer 1102 is attached at peripheral locations to annularly shaped viscoelastic polymer layer 1104, which surrounds waveguide layer 1102 and is attached to actuator 1108. Although the periphery of waveguide layer 1102 is circularly shaped and bonded to annularly-shaped viscoelastic polymer layer 1104, which is bonded to actuator 1108 in FIG. 11C, embodiments of the present invention are not limited to this implementation. As described above, actuator 1108 can move in the direction perpendicular to fixed frame 1106 to stretch viscoelastic polymer layer 1104 and waveguide layer 1102 laterally, thereby continuously changing the radius of curvature of waveguide layer 102 as illustrated.

FIG. 11D illustrates a plan view of components of another alternative mechanical system for dynamically adjusting the surface profile of an alternative waveguide layer according to some embodiments. In the embodiment illustrated in FIG. 11D, the waveguide layer is implemented as a teardrop-shaped waveguide layer 1110 bonded to a corresponding teardrop-shaped viscoelastic polymer layer 1112 that is affixed to a tear-drop shaped actuator 1114. In a manner similar to that discussed in relation to FIG. 11C, actuation of the actuator results in compression of the waveguide layer and modification of the surface profile of the waveguide layer.

FIG. 11E illustrates a plan view of components of yet another alternative mechanical system for dynamically adjusting the surface profile of an alternative waveguide layer according to some embodiments. FIG. 11E illustrates teardrop-shaped waveguide 1116 with a periphery bonded to circularly-shaped viscoelastic polymer layer 1118 that is affixed to circularly-shaped actuator 1108. Actuation of actuator 1108 as illustrated in FIG. 11B expands the viscoelastic polymer layer linearly and stretches the waveguide layer outward. The varying width of the viscoelastic polymer layer as a function of radial position enables differing expansion lengths and resulting forces, thereby enabling different extension values to be applied to the waveguide layer as a function of radial position. Thus, more uniform spherical curvature can be provided by embodiments of the present invention through selection of the viscoelastic polymer layer width. As will be evident to one of skill in the art, the various shapes utilized for the viscoelastic polymer layer and/or the fixed frame/actuator structure can affect how the viscoelastic polymer layer expands to exert different forces across varying portions of the waveguide layer.

In some examples, portions of the viscoelastic polymer layer can be segregated, such that varying mechanical forces can be applied to different portions along the periphery of a waveguide layer. For example, an annularly-shaped or teardrop-shaped viscoelastic polymer layer can be bifurcated, separated into quadrants, or any number of sections. Each section can be connected to one or more actuators to apply varying levels of tension to different sections of the viscoelastic polymer layer in a given instance. The various sections of a viscoelastic polymer can be actuated simultaneously, alternatively, or in combination, such that portions of the viscoelastic polymer layer can expand outward away from the waveguide layer more or less than other portions of the viscoelastic polymer layer. This can reduce focusing error and account for viscoelastic polymer layer systems with varying component shapes in relation to the shape of the waveguide layer.

The waveguide layer can be stretched continuously up to a planar or substantially planar position to achieve multiple states having various radius of curvature values. In some implementations, the stretching force applied by the movement of actuator 1108 can be applied at different force values to produce multiple waveguide configurations in continuous operation. Thus, actuator 1108 can be positioned at any position between the first configuration illustrated in FIG. 11A (i.e., waveguide layer 1102 is in a resting state) and the second configuration illustrated in FIG. 11B (i.e., the waveguide is stretched to a maximum value as the actuator reaches its final position. Varying the position of the actuator along its range of motion, resulting in different stretching distances for the viscoelastic polymer layer, can cause the waveguide layer to be stretched into multiple states corresponding to varying surface profile or radius of curvature values. As a result, the surface profile of waveguide layer 1102 can be continuously altered to project virtual content to a user at multiple depth planes. Releasing the force utilized to pull actuator 1108 down can allow viscoelastic polymer layer 1104 to contract back to its original configuration via its tensile strength, which can cause waveguide layer 1102 to revert to the first configuration illustrated in FIG. 11A.

Figure 12A:
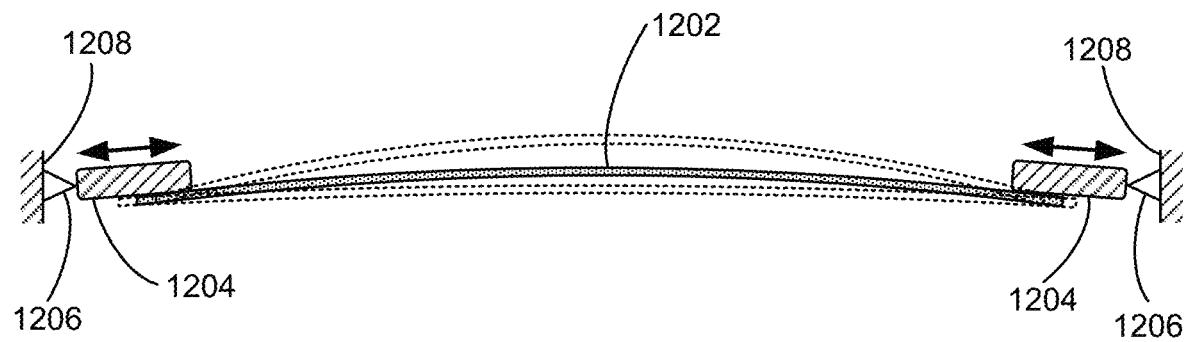
FIG. 12A illustrates a cross-sectional view of a lateral actuation system for dynamically adjusting a surface profile of a waveguide layer according to some embodiments.

FIG. 12A illustrates a cross-sectional view of a lateral actuation system for dynamically adjusting a surface profile of a waveguide layer according to some embodiments. As illustrated in FIG. 12A, a periphery of waveguide layer 1202 is positioned against, bonded to, or otherwise affixed to an inner portion of a ring actuator 1204. In the embodiment illustrated in FIG. 12A, waveguide layer 1202 can have a curved or nearly planar surface profile, thereby being characterized by a large radius of curvature (e.g., 2.0 meters), which is typically suitable to provide acceptable accommodation. Generally, some curvature is desirable in this configuration in order to achieve a predictable bending of the waveguide layer as described more fully below.

The outer portion of ring actuator 1024 is affixed to fixed frame structure 1208. Ring actuator 1204 can be expanded or contracted radially and repeatedly for continuous modulation of the surface profile of waveguide layer 1202. Examples of the ring actuators include, but are not limited to, piezoelectric actuators, electrothermal actuators, magnetostrictive actuators, and the like. Voltage sources utilized to drive the ring actuator are not shown for purposes of clarity. The waveguide layer and the ring actuator can be fabricated separately and then bonded together or fabricated as a single unit depending on the particular fabrication processes utilized.

Referring to FIG. 12A, the outer portion of ring actuator 1204 is affixed or pinned to fixed frame structure 1208 via a rotational mechanism 1206 (e.g., a hinge) acting as a support collar. Thus, ring actuator 1204 can rotate about rotational mechanism 1206 perpendicular to the radial lateral expansion and contraction of ring actuator 1204. Ring actuator 1204 can expand laterally, where the boundary conditions of the ring actuator can cause waveguide layer 1202 to flatten into a planar or substantially planar configuration. Conversely, ring actuator 1204 can contract laterally, where the boundary conditions of the ring actuator can cause waveguide layer 1202 to curve more substantially than when the ring actuator is less contracted. As illustrated in FIG. 12A, the dashed lines represent possible configurations of waveguide layer 1202 when ring actuator 1204 is in various states of expansion or contraction.

Figure 12B:
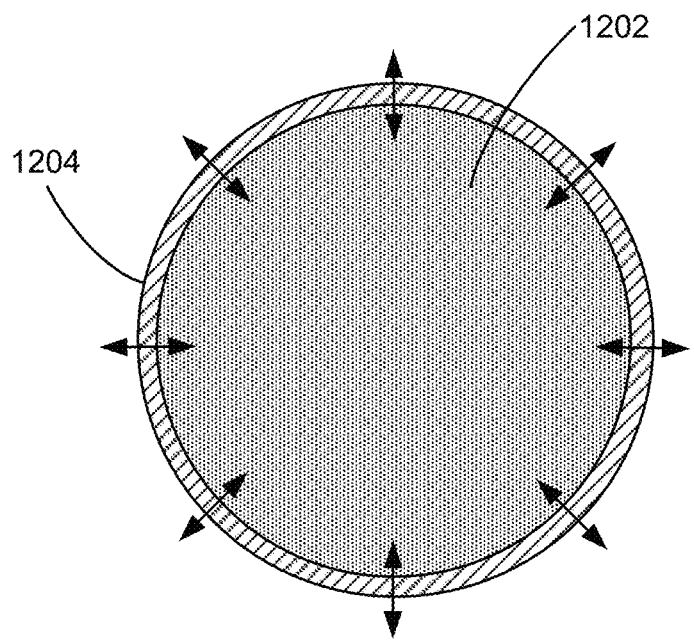
FIG. 12B illustrates a plan view of components of the lateral actuation system for dynamically adjusting the surface profile of a waveguide layer illustrated in FIG. 12A.

FIG. 12B illustrates a plan view of components of the lateral actuation system for dynamically adjusting the surface profile of a waveguide layer illustrated in FIG. 12A. In the embodiments illustrated in FIG. 12B, a circular waveguide layer 1202 is positioned against and joined to ring actuator 1204, which is annularly-shaped. Ring actuator 1204 can expand towards the center of waveguide layer 1202 to cause waveguide layer 1202 to decrease the radius of curvature and can contract outward from the center of waveguide layer 1202 to cause waveguide layer 1202 to flatten, increasing the radius of curvature. Thus, waveguide layer 1202 can be flattened continuously to a planar or substantially planar position or induced to curve at various radius of curvature values by lateral or radial movement of ring actuator 1204, thereby achieving multiple waveguide configurations in continuous operation. Varying the contraction/extension of the ring actuator along its range of motion can cause the waveguide layer to be stretched into multiple states corresponding to varying surface profile or radius of curvature values. As a result, the surface profile of waveguide layer 1202 can be continuously altered to project virtual content to a user at multiple depth planes.

Ring actuator 1204 can be a continuous ring or loop that fully surrounds the entire periphery of waveguide layer 1202. In some examples, portions of the ring actuator can be segregated into multiple segmented sections, such that varying mechanical forces can be applied to different portions along the periphery of a waveguide layer. In some examples, different materials or actuator types for each segmented section may be used in any combination in a given application. The various sections of a ring actuator can be actuated simultaneously, alternatively, or in combination, such that portions of the ring actuator can expand outward away from the waveguide layer more or less than other portions of the ring actuator. This can reduce focusing error and account for ring actuator systems with varying component shapes in relation to the shape of the waveguide layer.

Figure 13A:
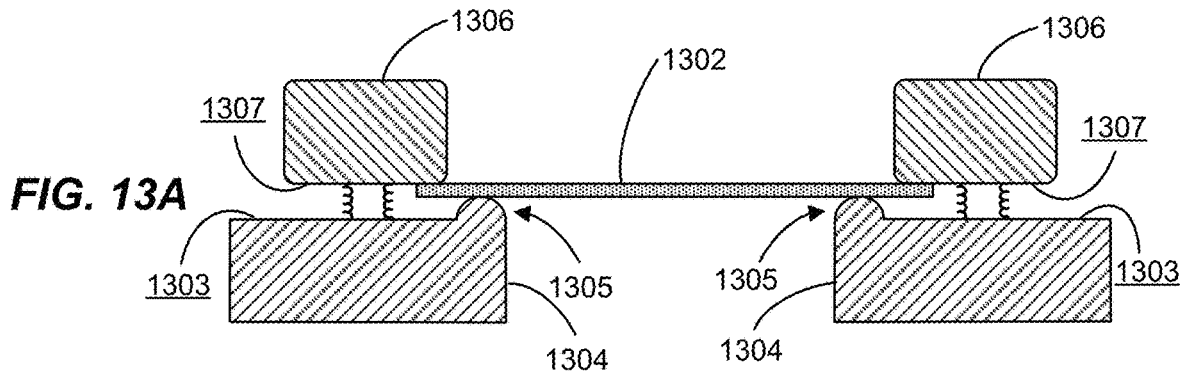
FIG. 13A illustrates a cross-sectional view of a first configuration of a multiple ring system for dynamically adjusting a surface profile of a waveguide layer according to some embodiments.

FIG. 13A illustrates a cross-sectional view of a first configuration of a multiple ring system for dynamically adjusting a surface profile of a waveguide layer according to some embodiments. As illustrated in FIG. 13A, a periphery of a planar or substantially planar waveguide layer 1302 is positioned between an actuator 1304 and a fixed frame 1306. Actuator 1304 and fixed frame 1306 are joined by a mechanical connection as described more fully below. The multiple ring system illustrated in FIGS. 13A and 13B can also be referred to as a ring-on-ring system. An inner periphery of waveguide layer 1302 can be positioned against a surface of an extended portion 1305 of actuator 1304, and an outer periphery of waveguide layer 1302 can be positioned against a surface of fixed frame 1306, for example, the bottom surface 1307 of fixed frame 1306. In the embodiment illustrated in FIG. 13A, waveguide layer 1302 can have a planar or nearly planar surface profile, thereby being characterized by a large radius of curvature (e.g., 2.0 meters), which is typically suitable to provide acceptable accommodation. Actuator 1304 can be coupled to fixed frame 1306 through a positioning mechanism that can be used to position fixed frame 1306 at an adjustable distance from actuator 1304 in response to actuation of actuator 1304.

Figure 13B:
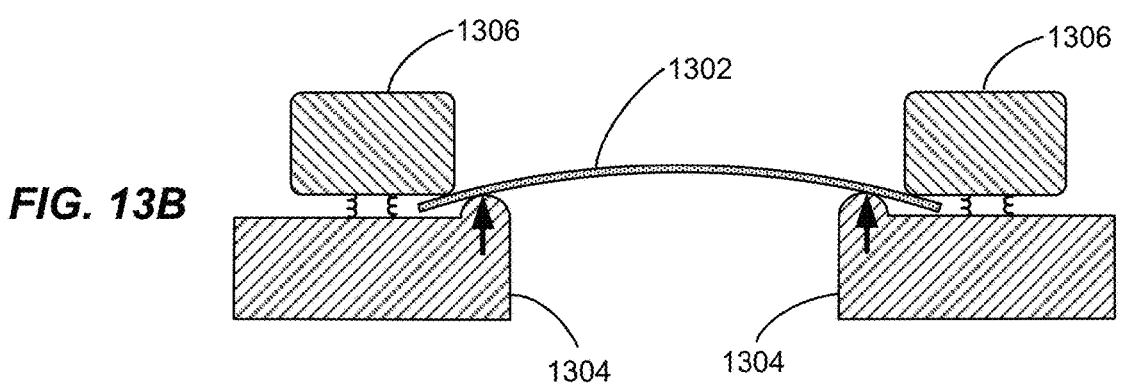
FIG. 13B illustrates a cross-sectional view of a second configuration of the multiple ring system for dynamically adjusting a surface profile of a waveguide layer illustrated in FIG. 13A.

FIG. 13B illustrates a cross-sectional view of a second configuration of the multiple ring system for dynamically adjusting a surface profile of a waveguide layer illustrated in FIG. 13A. In the second configuration illustrated in FIG. 13B, actuator 1304 is actuated to reduce the distance between actuator 1304 and fixed frame 1306 in response to motion of actuator 1304 towards fixed frame 1306. As the distance between fixed frame 1306 and actuator 1304 is reduced, fixed frame 1306 applies mechanical force to the outer periphery of waveguide layer 1302 while the surface of the extended portion 1305 of actuator 1304 applies mechanical force in an opposite direction against the inner periphery of waveguide layer 1302. This causes periphery of waveguide layer 1302 to be angled at an angle defined as a function of one or more of the distance between actuator 1304 and fixed frame 1306, the distance between applied mechanical forces at the outer and inner peripheries of waveguide layer 1302, and the length of the extended portion 1305 of actuator 1304. As actuator 1304 is positioned closer to fixed frame 1306, waveguide layer 1302 is caused to bend at an increased angle resulting in a decreased radius of curvature as illustrated in FIG. 13B. Inversely, actuator 1304 can be actuated to increase the distance between actuator 1304 and fixed frame 1306 to thereby transition waveguide layer 1302 to any configuration between the first configuration illustrated in FIG. 13A and the second configuration illustrated in FIG. 13B. Upon gradually increasing the distance between actuator 1304 and fixed frame 1306, waveguide layer 1302 can gradually return to its original planar or substantially planar state as illustrated in FIG. 13A by releasing its stored strain energy. In some exemplary embodiments, a waveguide can be pre-curved and an actuator and fixed frame can apply mechanical forces to the outer and inner periphery of the waveguide in a similar manner as described in order to reduce the angle at which the waveguide is bent, causing the waveguide to become planar or substantially more planar.

As an example, extended portion 1305 of the actuator 1304, sometimes referred to as a leverage arm, can be 0.8 mm in length extending outward from top surface 1303 of actuator 1304 to contact the inner periphery of waveguide layer 1302. A ~65 μm actuation stoke of the positioning mechanism and 22N actuation force can be used to flatten a 330 μm polymer waveguide from a state characterized by a 0.3 m radius of curvature to a state characterized by a 2.0 m radius of curvature. Actuator 1304 can be any kind of suitable actuator including, but not limited to, air cylinders, piezoelectric actuators, linear electromechanical actuators, magnetic actuators, or the like.

In some exemplary embodiments, the forces applied at the outer and inner periphery of waveguide layer 1302 by actuator 1304 and fixed frame 1306 can be reduced or altered from a maximum applied force, where the maximum applied force induces a minimum radius of curvature. Varying the distance between actuator 1304 and fixed frame 1306 can cause waveguide layer 1302 to be bent into multiple configurations corresponding to varying radius of curvature values, such that each actuator-to-fixed frame distance corresponds to a different resulting radius of curvature value being exhibited by waveguide layer 1302. Varying the actuator-to-fixed frame distance. which affects the forces applied to the inner and outer peripheries of waveguide layer 1302, can thus enable continuous modulation of curvature of waveguide layer 1302. As a result, waveguide layer 1302, through manipulation of actuator 1304, can be continuously altered to project virtual content to a user at multiple depth planes. For example, the natural state of waveguide layer 1302 can have a radius of curvature value appropriate to project virtual content originating at a distance of 2 m from the eyepiece. The distance between actuator 1304 and fixed frame 1306 can be reduced to increase the bending moment at the periphery of waveguide layer 1302 and thereby cause waveguide layer 1302 to increase in curvature. The increased bending moment, which reduces the radius of curvature of waveguide layer 1302, can correspond to virtual content projected to originate at a distance closer to the user than 2 m (e.g., 1 m). The actuator-to-fixed frame distance can be further reduced to cause waveguide layer 1302 to bend further. Further bending of waveguide layer 1302 further reduces the radius of curvature value, which can be used to render virtual content originating at a distance closer to the user than 1 m (e.g., 0.3 m). Releasing the actuator to revert the distance between actuator 1304 and fixed frame 1306 back to a first resting configuration causes the stress energy of waveguide 1302 to revert to its resting configuration. Alternating consecutively between a first resting configuration, a second configuration in which the waveguide is bent, and a third configuration in which the waveguide is even more bent, for example, at a refresh rate of 90 Hz, enables display of virtual content at three depth planes corresponding to the three radii of curvature achieved using the compression of the actuator against the fixed frame to angle the waveguide layer. Of course, these values are only exemplary and other depth planes can be achieved using embodiments of the present invention.

Figure 13C:
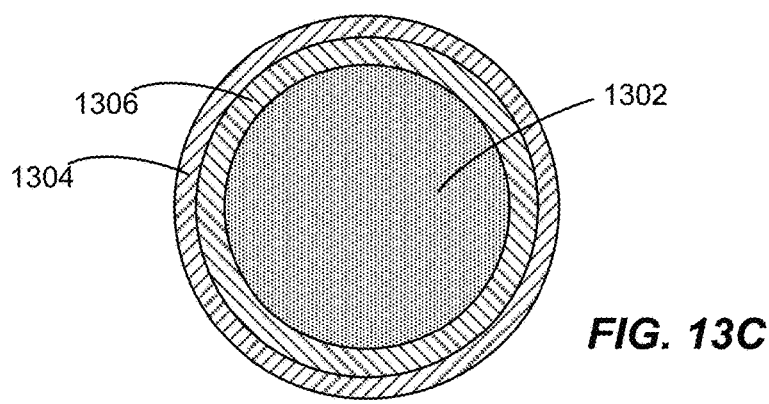
FIG. 13C illustrates a plan view of components of the multiple ring system for dynamically adjusting the surface profile of the waveguide layer illustrated in FIGS. 13A and 13B.

FIG. 13C illustrates a plan view of components of the multiple ring system for dynamically adjusting the surface profile of the waveguide layer illustrated in FIGS. 13A and 13B. As illustrated in FIG. 13C, fixed frame 1306 is positioned around waveguide layer 1302 to contact an outer portion of the periphery of waveguide layer 1302. In FIG. 13C, a portion of actuator 1304 is visible surrounding the periphery of fixed frame 1306, but this is not required by the present invention and laterally compact designs can be utilized in which the outer periphery of actuator 1304 and fixed frame 1306 are aligned vertically. Although the periphery of waveguide layer 1302 is circularly shaped and in contact with annularly-shaped fixed frame 1306, which is coupled to annularly-shaped actuator 1304 in FIG. 13C, embodiments of the present invention are not limited to this implementation. Although not illustrated in FIG. 13C, fixed frame 1306 is coupled to actuator 1304 by a positioning mechanism. Annularly-shaped actuator 1304 and fixed frame 1306 can be ring-shaped and proportional to each other such that at least a portion of actuator 1304 overlaps with a portion of fixed frame 1306.

Figure 13D:
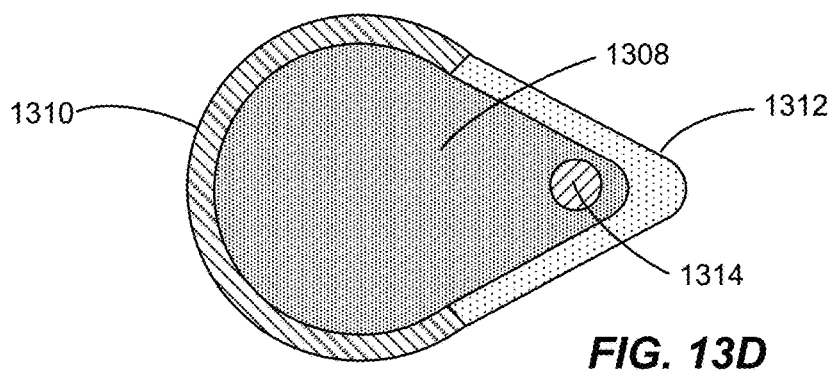
FIG. 13D illustrates a plan view of components of a multiple ring system for dynamically adjusting the surface profile of an alternative waveguide layer according to some embodiments.

FIG. 13D illustrates a plan view of components of a multiple ring system for dynamically adjusting the surface profile of an alternative waveguide layer according to some embodiments. As illustrated in FIG. 13D, an eyepiece can include a waveguide layer 1308 that is characterized by a teardrop shape in plan view. Although a teardrop shape is illustrated in FIG. 13D, embodiments of the present invention are not limited to this particular shape and other shapes are included within the scope of the present invention.

A fixed portion 1312 of the waveguide layer can be affixed to or otherwise hold in place portions of waveguide layer 1308 adjacent the fixed portion 1312. As an example, ICG 1314 can be positioned near the middle of fixed portion 1312. In order to prevent modification of the surface profile of the waveguide layer in the vicinity of ICG 1314, fixed portion 1312 is utilized to maintain the surface profile of this portion of the waveguide layer in a fixed surface profile. In other embodiments, the fixed portion can loosely hold waveguide layer 1308 in place, for instance, by utilizing one or more shims between waveguide layers, to allow portions of waveguide layer 1308 adjacent fixed portion 1312 to bend or remain in an original condition without obstruction by fixed portion 1312. A C-shaped actuator 1310 can then be coupled to fixed portion 1312 to fully surround waveguide layer 1308 along the periphery of the waveguide layer. C-shaped actuator 1310 can adjust the surface profile of a majority of waveguide layer 1308 by pressing the periphery of waveguide layer 1308 against a complementary C-shaped fixed frame (not shown in this plan view) as described in previous examples. Utilization of a C-shaped actuator as illustrated in FIG. 13D enables a sufficient portion of the periphery of the waveguide layer to be oriented at a predetermined angle such that the viewing area of the eyepiece is characterized by a surface profile or curvature that is uniform across the width/length of the viewing area while maintaining portions of the waveguide layer at a fixed surface profile independent of the actuation of the system.

In some exemplary embodiments, portions of the fixed frame/actuator mechanism can be segregated, such that varying mechanical forces can be applied to different portions along the periphery of a waveguide layer. For example, an annularly-shaped actuator and fixed frame mechanisms can be bifurcated, separated into quadrants, or any number of sections having same or different dimensions that define the angle(s) at which a periphery of the waveguide is bent. The various sections of the actuator and fixed frame mechanism(s) can be activated simultaneously, alternatively, or in combination, such that some portions of the periphery of a waveguide can be bent at different angles than other portions of the periphery of the waveguide. This can allow for movement or positioning of light sources across a range at different depths from the perspective of the user.

Figure 14A:
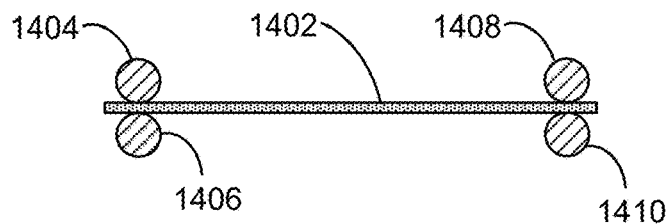
FIG. 14A illustrates a cross-sectional view of a first configuration of a roller system for dynamically adjusting a surface profile of a waveguide layer according to some embodiments.

FIG. 14A illustrates a cross-sectional view of a first configuration of a roller system for dynamically adjusting a surface profile of a waveguide layer according to some embodiments. In some embodiments, a waveguide layer can be positioned between multiple sets of paired roller mechanisms that can operate to flatten or curve the waveguide layer, resulting in an adjustment to the radius of curvature of the waveguide layer. In FIG. 14A, waveguide layer 1402, which can be a planar or relatively planar polymer waveguide layer, is positioned between a number of paired cylindrical rolling mechanisms, i.e., top rolling mechanism 1404 paired with bottom rolling mechanism 1406, and top rolling mechanism 1408 paired with bottom rolling mechanism 1410. In FIG. 14A, top rolling mechanisms 1404/1408 and bottom rolling mechanism 1406/1410 are positioned in an unactuated configuration, thereby allowing waveguide layer 1402 to take on a first surface profile, for example, a planar surface profile or a surface profile with a small inherent curvature. A periphery of the waveguide layer 1402 can be positioned, pinched, or otherwise aligned between top rolling mechanism 1404 and bottom rolling mechanism 1406, and between top rolling mechanism 1408 and bottom rolling mechanism 1410. Additional description of the rolling system is provided in relation to FIG. 14C.

Figure 14B:
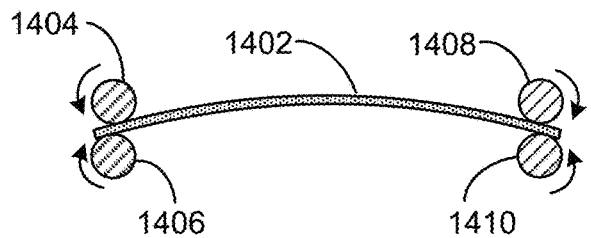
FIG. 14B illustrates a cross-sectional view of a second configuration of the roller system for dynamically adjusting a surface profile of the waveguide layer illustrated in FIG. 14A.

FIG. 14B illustrates a cross-sectional view of a second configuration of the roller system for dynamically adjusting a surface profile of the waveguide layer illustrated in FIG. 14A. As illustrated in FIG. 14B, top rolling mechanisms 1404/1408 and bottom rolling mechanisms 1406/1410 can be actuated to apply lateral mechanical force against the periphery of waveguide layer 1402. Top rolling mechanism 1404 and bottom rolling mechanism 1406 can be operated to turn in a direction opposite to each other, such that the a portion of the periphery of waveguide layer 1402 is passed between or pulled through top rolling mechanism 1404 and bottom rolling mechanism 1406 depending on the rotation of top rolling mechanism 1404 and bottom rolling mechanism 1406. Top rolling mechanism 1408 and bottom rolling mechanism 1410 can be actuated to operate in a similar fashion as top rolling mechanism 1404 and bottom rolling mechanism 1406. Top rolling mechanisms 1404/1408 and bottom rolling mechanisms 1406/1410 can grip or otherwise laterally move the periphery of waveguide 1402 by friction forces and/or "teeth" or grooves that cause the rolling mechanisms to grip waveguide 1402. In some exemplary embodiments, the periphery of waveguide 1402 can have "teeth" or grooves compatible with corresponding "teeth" or groves located on the rolling mechanisms.

As shown in FIG. 14B, actuation of the paired top rolling mechanisms 1404/1408 and bottom rolling mechanisms 1406/1410 rolls a length of the periphery of waveguide layer 1402 inward towards the center of waveguide 1402, which bends in response to the mechanical force shifting the periphery of waveguide 1402 radially inward. Thus, adjusting waveguide layer 1402, for example, from a planar surface profile to a curved surface profile by applying lateral mechanical force at the periphery of the waveguide layer can adjust the radius of curvature of the waveguide layer. The bending of waveguide 1402 and the resulting change in radius of curvature value is a function of the length of the periphery of waveguide 1402 being displaced. Deactuation of the top rolling mechanisms 1404/1408 and bottom rolling mechanisms 1406/1410 removes the mechanical force at the periphery of the waveguide layer, which returns to the original surface profile, for example, planar or substantially planar, illustrated in FIG. 14A.

According to embodiments of the present invention, application of the bending moment caused by the rolling mechanisms at the periphery of the waveguide layer results in modulation of the surface profile or curvature of the waveguide layer uniformly across the width/length of the waveguide layer and the aperture area of the associated eyepiece. In some exemplary embodiments, a portion of the rolling mechanisms can be actuated to flatten or curve a waveguide. For example, top rolling mechanisms 1404/1408 may be actuated while bottom rolling mechanisms 1406/1410 may be allowed to independently and freely move, or be replaced with pins or wheels without an actuating mechanism. Conversely, bottom rolling mechanisms 1406/1410 may be actuated while top rolling mechanisms 1404/1408 may be allowed to independently and freely move, or be replaced with pins or wheels without an actuating mechanism.

In some exemplary embodiments, the mechanical forces applied at the periphery of waveguide layer by rolling mechanisms can be modulated between a fully curved configuration and a fully planar configuration. Varying the length of the periphery that is shifted by the rolling mechanisms can cause a waveguide layer to be bent into multiple configurations corresponding to varying radius of curvature values, such that each shifted length amount corresponds to a different resulting radius of curvature value being exhibited by the waveguide layer. Varying the length of the periphery of the waveguide that is shifted can thus enable continuous modulation of curvature of the waveguide layer. As a result, the waveguide layer, through manipulation of paired rolling mechanisms, can be continuously altered to project virtual content to a user at multiple depth planes.

For example, the natural state of waveguide layer 1402 can have a radius of curvature value appropriate to project virtual content originating at a distance of 2 m from the eyepiece. The periphery of waveguide layer 1402 can be shifted radially inward towards the center of waveguide layer 1402 to cause waveguide layer 1402 to increase in curvature. The increased bending of the waveguide layer, which reduces the radius of curvature of waveguide layer 1402, can correspond to virtual content projected to originate at a distance closer to the user than 2 m (e.g., 1 m). The periphery of waveguide layer 1402 can be further shifted radially inward to cause waveguide layer 1402 to bend further. Further bending of waveguide layer 1402 further reduces the radius of curvature value, which can be used to render virtual content originating at a distance closer to the user than 1 m (e.g., 0.3 m). Releasing the holding force of the rolling mechanisms back to a first resting configuration causes waveguide 1402 to revert to its resting configuration. Alternating consecutively between a first resting configuration, a second configuration in which the waveguide is bent, and a third configuration in which the waveguide is even more bent, for example, at a refresh rate of 90 Hz, enables display of virtual content at three depth planes corresponding to the three radii of curvature achieved using the rolling mechanisms to angle the waveguide layer. Of course, these values are only exemplary and other depth planes can be achieved using embodiments of the present invention.

Figure 14C:
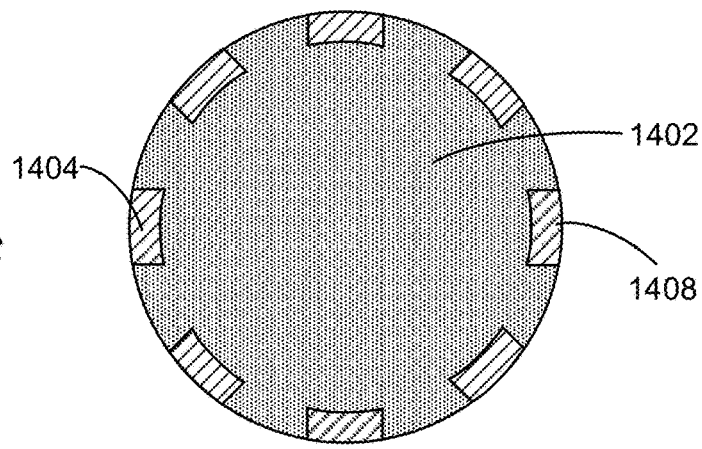
FIG. 14C illustrates a plan view of components of the roller system for dynamically adjusting the surface profile of a waveguide layer illustrated in FIGS. 14A and 14B.

FIG. 14C illustrates a plan view of components of the roller system for dynamically adjusting the surface profile of a waveguide layer illustrated in FIGS. 14A and 14B. As illustrated in FIG. 14C, the periphery of waveguide layer 1402 is in contact with top rolling mechanisms 1404/1408 and bottom rolling mechanisms (not shown). Additional top rolling mechanisms are illustrated as being distributed evenly along the periphery of waveguide 1402. For example, eight top rolling mechanisms are illustrated and paired with eight corresponding bottom rolling mechanisms (not shown) to induce uniform stress on waveguide 1402 when actuated. Additional rolling mechanisms distributed evenly along the periphery of waveguide 1402 can be used to more precisely induce uniform stress on waveguide 1402. In this embodiment, the annular positioning of the rolling mechanism conforms to the shape of waveguide layer 1402. Although a circular shape is illustrated in FIG. 14C, embodiments of the present invention are not limited to this particular shape and other shapes are included within the scope of the present invention. In other embodiments, the rolling mechanisms can be positioned to conform to waveguide layers having shapes other than a circular shape (e.g., teardrop shape).

Still referring to FIG. 14C, due to the segregated nature of the distributed paired rolling mechanisms along the periphery of waveguide 1402, varying mechanical forces can be applied to different portions along the periphery of waveguide layer 1402. The various paired rolling mechanisms can be activated simultaneously, alternatively, partially, or in combination, such that some portions of the periphery of waveguide 1402 can be shifted, some portions can remain unshifted, and other portions can be shifted more or less. This can allow for movement or positioning of light sources across a range at different depths from the perspective of the user.

Figure 14D:
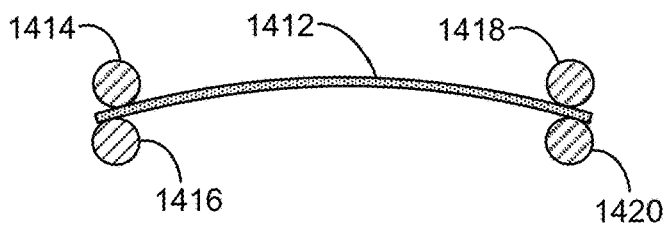
FIG. 14D illustrates a cross-sectional view of a third configuration of a roller system for dynamically adjusting a surface profile of a waveguide layer according to some embodiments.
Figure 14E:
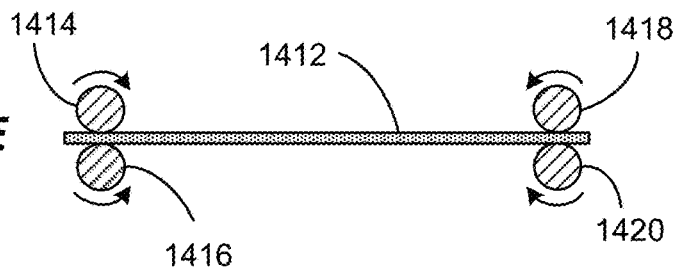
FIG. 14E illustrates a cross-sectional view of a fourth configuration of the roller system for dynamically adjusting a surface profile of the waveguide layer illustrated in FIG. 14D.

In some embodiments, a waveguide can be pre-curved and then bent using the illustrated rolling mechanisms to a less curved or planar state. FIG. 14D illustrates a cross-sectional view of a third configuration of a roller system for dynamically adjusting a surface profile of a waveguide layer according to some embodiments. FIG. 14E illustrates a cross-sectional view of a fourth configuration of the roller system for dynamically adjusting a surface profile of the waveguide layer illustrated in FIG. 14D. As shown in FIGS. 14D and 14E, waveguide layer 1412 can be curved with a predetermined surface profile, for example, a predetermined radius of curvature. The waveguide layer 1412 can then be positioned between top rolling mechanism 1414 and bottom rolling mechanism 1416, and between top rolling mechanism 1418 and bottom rolling mechanism 1420, in a manner similar to the embodiment described in relation to FIGS. 14A and 14B. In FIG. 14D, top rolling mechanisms 1414/1418 and bottom rolling mechanisms 1416/1420 are positioned in an unactuated configuration, thereby allowing waveguide layer 1412 to take on a first surface profile, for example, a curved surface profile associated with display of a first depth plane.

As shown in FIG. 14E, actuation of the top rolling mechanisms 1414/1418 and bottom rolling mechanisms 1416/1420 applies a mechanical force to the periphery of waveguide layer 1412, which flattens in response to the mechanical force shifting the periphery of waveguide 1412 radially outward. Thus, adjusting waveguide layer 1412, for example, from a curved surface profile to a planar or substantially planar surface profile by applying lateral mechanical force at the periphery of the waveguide layer can adjust the radius of curvature of the waveguide layer. The bending of waveguide 1412 and the resulting radius of curvature value is a function of the length of the periphery of waveguide 1412 being displaced. Deactuation of the top rolling mechanisms 1414/1418 and bottom rolling mechanisms 1416/1420 removes the mechanical force at the periphery of the waveguide layer, which returns to the original surface profile, for example, curved, illustrated in FIG. 14D.

A variety of methods can be utilized to form curved waveguide layers, i.e., a waveguide layer defined by a predetermined curvature in a resting position. As described below, these methods include use of a curved mold, utilizing a post-fabrication annealing step to curve an initially flat waveguide layer, or the like.

Figure 15:
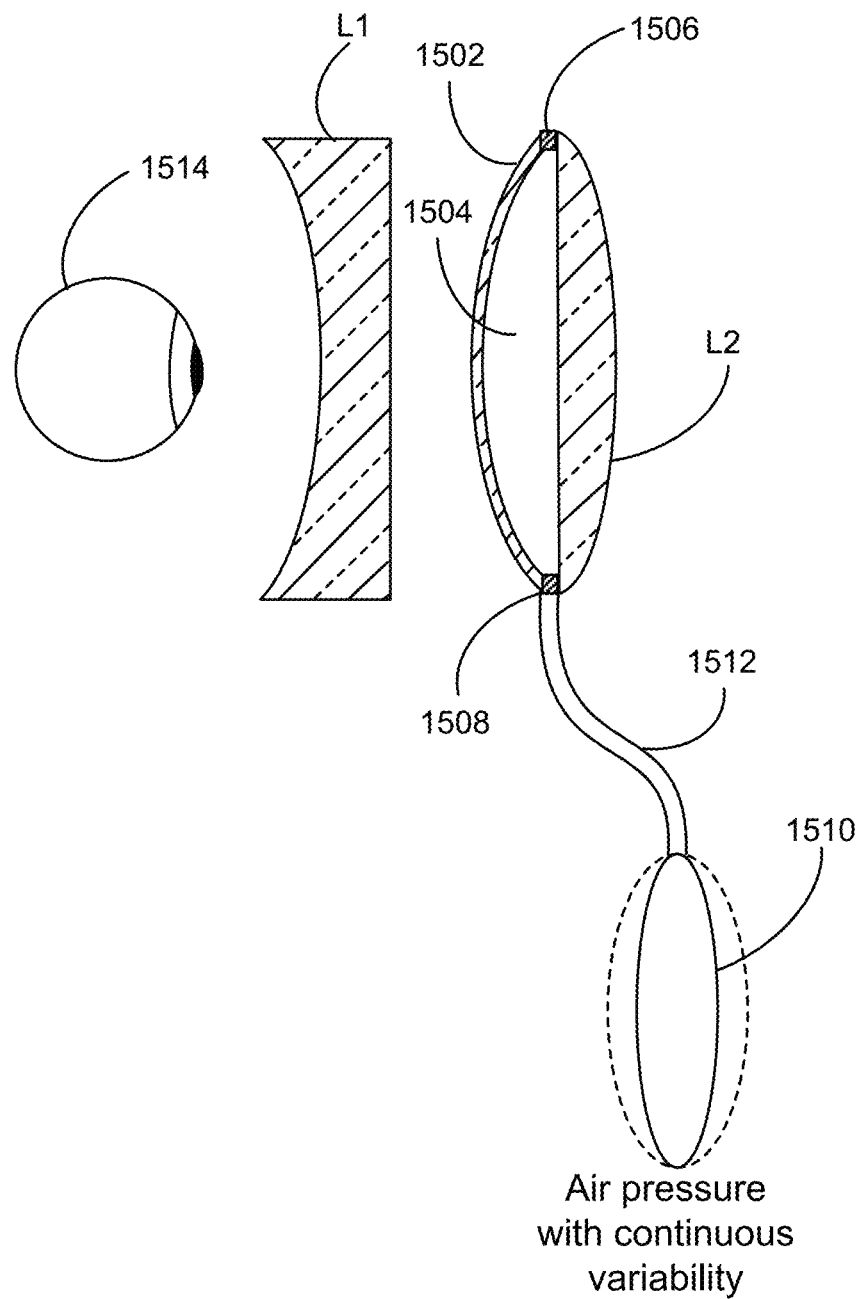
FIG. 15 illustrates a cross-sectional view of a pneumatic system for dynamically adjusting a surface profile of a waveguide layer according to some embodiments.

FIG. 15 illustrates a cross-sectional view of a pneumatic system for dynamically adjusting a surface profile of a waveguide layer according to some embodiments. As illustrated in FIG. 15, a pneumatic system includes waveguide layer 1502 (e.g., a pre-curved polymer waveguide layer with a radius of curvature of 2.0 m), continuous pressure regulator 1510, and lenses L1, L2. Waveguide layer 1502 can be positioned against or otherwise bonded to a flat, transparent, rigid base of lens L2, creating an airtight seal 1506 along the periphery of waveguide layer 1502, such that a pressurized cavity 1504 is enclosed between waveguide layer 1502 and lens L2. In some exemplary embodiments, the flat, transparent, rigid base can be a component distinct from and bonded to lens L2. At a section of the airtight seal 1506, continuous pressure regulator 1510 can be coupled to airtight seal 1506 via entry point 1508. Continuous pressure regulator 1510 can operate to communicate pressure changes within pressurized cavity 1504 via pathway 1512 coupled to entry point 1508. As continuous pressure regulator 1510 is operated to communicate a change in pressure within pressurized cavity 1504, pressure changes are induced upon waveguide layer 1502. The pressure changes in pressurized cavity 1504 can induce a change in the curvature of waveguide layer 1502. Although one pressure inducing device, pressure regulator 1510, is illustrated, exemplary embodiments allow for the use of one or more pressure regulating devices. As discussed in relation to FIG. 6C, the shape of the waveguide layer can be circular, although this is not required by embodiments of the present invention.

In exemplary embodiments, waveguide layer 1502 can be planar or substantially planar in a first default configuration, with little or no pressure exerting force against waveguide layer 1502 in pressurized cavity 1504. Continuous pressure regulator 1510 can operate to increase the pressure within pressurized cavity 1504, causing a uniform load to be distributed upon waveguide layer 1502, thereby modifying the surface profile. The pressure within pressurized cavity 1504 can be increased to cause waveguide layer 1502 modify its configuration to increase the curvature of the waveguide layer. Decreasing or releasing the pressure in pressurized cavity 1504 can cause waveguide layer 1502 to release stored strain energy, thereby causing waveguide layer 1502 to revert to the first default configuration having a planar or substantially planar shape.

In other embodiments, waveguide layer 1502 can be in a second default configuration having a substantially curved shape. Continuous pressure regulator 1510 can operate to decrease the pressure (i.e. either creating a vacuum with a negative pressure value or reducing a positive preexisting pressure value) within pressurized cavity 1504, thereby causing the surface profile of waveguide layer 1502 to be uniformly inverted inward towards lens L2. The pressure within pressurized cavity 1504 can be decreased to cause waveguide layer 1502 to transition to a configuration characterized by reduced curvature. Increasing the pressure in pressurized cavity 1504 can cause waveguide layer 1502 to revert to the second default configuration having substantially curved shape.

In further embodiments, waveguide layer 1502 can be in a third default configuration having a preexisting curvature between being planar and substantially curved (i.e. between the first default configuration and the second default configuration described above). Continuous pressure regulator 1510 can operate to decrease the pressure (i.e. either creating a vacuum with a negative pressure value or reducing a positive preexisting pressure value) within pressurized cavity 1504, thereby causing the surface profile of waveguide layer 1502 to be uniformly inverted inward towards lens L2. The pressure within pressurized cavity 1504 can be decreased to cause waveguide layer 1502 to be in a configuration in which waveguide layer 1502 exhibits a reduced curvature. Increasing the pressure in pressurized cavity 1504 can cause waveguide layer 1502 to revert to the third default configuration. Alternatively, continuous pressure regulator 1510 can also operate to increase the pressure within pressurized cavity 1504, causing a uniform load to be distributed upon waveguide layer 1502 and modify the surface profile. The pressure within pressurized cavity 1504 can be increased to cause waveguide layer 1502 to be in a configuration in which waveguide layer 1502 exhibits an increased curvature. Decreasing or releasing the pressure in pressurized cavity 1504 can cause waveguide layer 1502 to release stored strain energy, causing waveguide layer 1502 to revert to the third default configuration.

In exemplary embodiments, similar to those discussed in FIGS. 8A and 8B, lenses L1, L2 have complementary lens functions that are used to achieve two depth planes without affecting real-world light as perceived by eye 1514 of a user. Accordingly, the combination of lens L2, waveguide layer 1502, and lens L1 enables world light to be viewed by the user with no optical power. As discussed above, world light is presented to the user with no optical power applied to the world light since world light in any waveguide layer 1502 configuration passes through the curved surface of waveguide layer 1502 with little or no disturbance as discussed in relation to FIG. 5.

In some exemplary embodiments, the pressure forces induced in pressurized cavity 1504 by pressure regulator 1510 can be modulated to induce waveguide 1502 to be in a fully curved configuration and a fully planar configuration. Varying the pressure value can cause waveguide layer 1502 to be curved or flattened into multiple configurations corresponding to varying radius of curvature values, such that each pressure value corresponds to a different resulting radius of curvature value being exhibited by waveguide layer 1502. Varying the pressure value in pressurized cavity 1504 can thus enable continuous modulation of curvature of the waveguide layer. As a result, waveguide layer 1502, through modulation of the pressure value via pressure regulator 1510, can be continuously altered to project virtual content to a user at multiple depth planes. For example, the natural state of waveguide layer 1502 can have a radius of curvature value appropriate to project virtual content originating at a distance of 2 m from the eyepiece. The pressure value inside pressurized cavity 1504 can be increased to cause waveguide layer 1502 to exhibit an increase in curvature. The increased bending of waveguide layer 1502, which reduces the radius of curvature of waveguide layer 1502, can correspond to virtual content projected to originate at a distance closer to the user than 2 m (e.g., 1 m). The pressure value inside pressurized cavity 1504 can be further increased to cause waveguide layer 1502 to bend further. Further bending of waveguide layer 1502 further reduces the radius of curvature value, which can be used to render virtual content originating at a distance closer to the user than 1 m (e.g., 0.3 m). Releasing the pressure causes waveguide 1502 to revert to its resting configuration. Alternatively, instead of releasing the pressure completely, pressure can be reduced or increased to achieve any other radius of curvature value determined by the configuration of waveguide 1502. Alternating consecutively between a first resting configuration, a second configuration in which the waveguide is bent, and a third configuration in which the waveguide is even more bent, for example, at a refresh rate of 90 Hz, enables display of virtual content at three depth planes corresponding to the three radii of curvature achieved using pressure regulator 1510 frame to adjust a curve of waveguide layer 1502. Of course, these values are only exemplary and other depth planes can be achieved using embodiments of the present invention.

The inventors have determined that during modifications of the curvature of a multi-layer eyepiece stack including multiple waveguide layers, the mechanical relationship between adjacent waveguide layers in the multi-layer stack can impact performance. In particular, if the peripheries of the adjacent waveguide layers are bonded using a stiff interlayer adhesive, it is possible to introduces significant error in curvature between layers.

Figure 16:
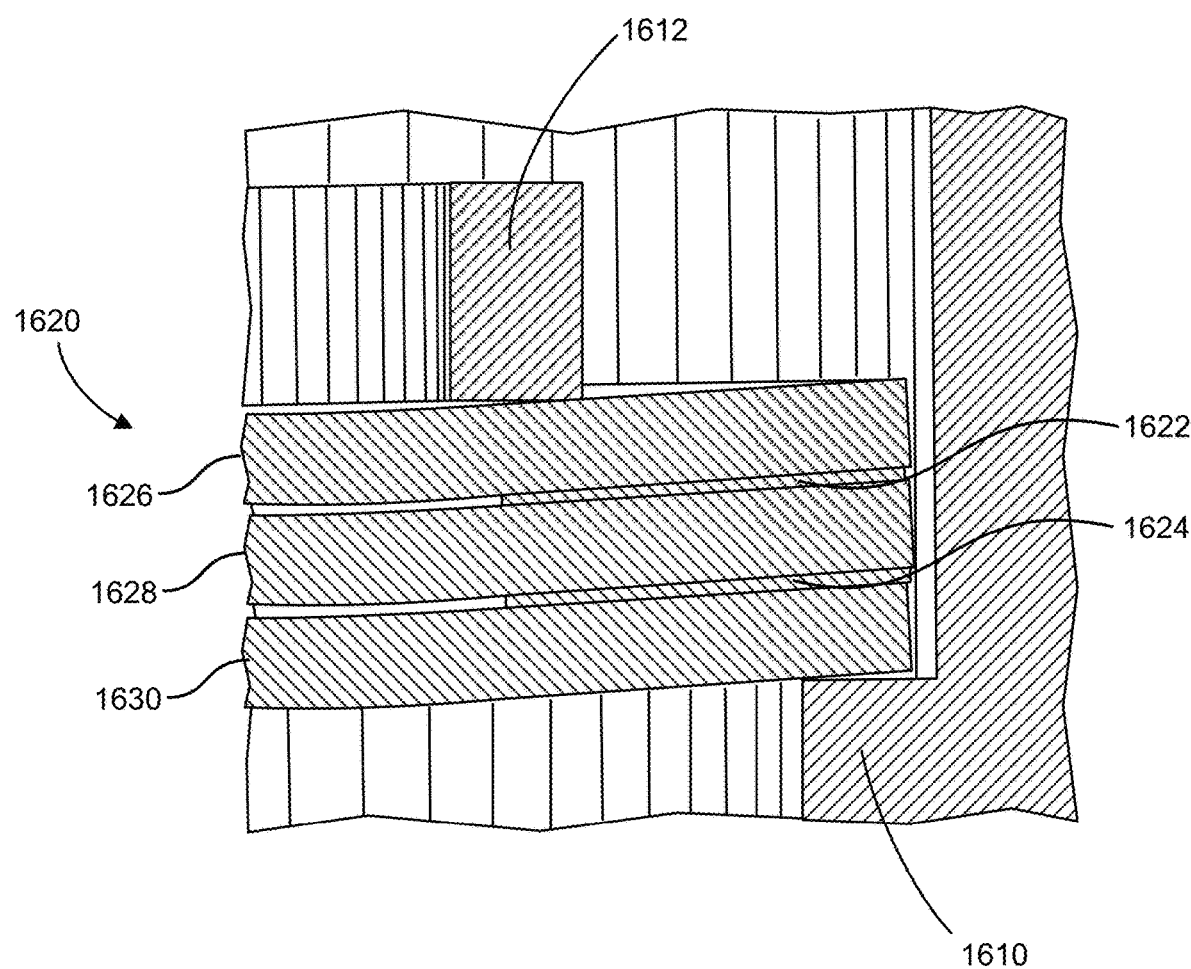
FIG. 16 is a simplified schematic diagram illustrating a cross-sectional view of a peripheral portion of three waveguide layers in a multi-layer eyepiece stack according to some embodiments.

FIG. 16 is a simplified schematic diagram illustrating a cross-sectional view of a peripheral portion of three waveguide layers in a multi-layer eyepiece stack according to some embodiments. As illustrated in FIG. 16, fixed frame 1610 supports the outer periphery of multi-layer eyepiece stack 1620 and actuator 1612 contacts the inner periphery of multi-layer eyepiece stack 1620. Although fixed frame 1610 and actuator 1612 are illustrated in FIG. 16 to apply a mechanical force to the inner/outer periphery of multi-layer eyepiece stack 1620, thereby causing the periphery of multi-layer eyepiece stack 1620 to be angled, the discussion provided in relation to FIG. 16 is applicable to various embodiments of the present invention as described herein in which angling of the periphery results in modification in the surface profile or curvature of a waveguide layer or a multi-layer eyepiece stack.

Referring to FIG. 16, a first mechanically mobile joint 1622 and a second mechanically mobile joint 1624 are positioned between waveguide layers 1626 and 1628 and waveguide layers 1628 and 1630, respectively. The presence of mechanically mobile joints 1622 and 1624, which can also be referred to as shims or shim layers, enable each of waveguide layers 1626, 1628, and 1630 to rotate independently from each other, which can result in production of a more uniform curvature between waveguide layers. Mechanically mobile joints 1622 and 1624 enable the waveguide layers to slide with respect to each other within a predetermined range, preventing compression in the top waveguide layer and tension in the bottom waveguide layer that could result from a solid or stiff interlayer bond between adjacent layers. The mechanically mobile joints can be fabricated to match some or all of the outer periphery of the waveguide layers and assembled in a manner similar to a gasket between adjacent waveguide layers. As illustrated in FIG. 6D, a portion of the periphery (e.g., C-shaped clamping mechanism 608) can utilize shims while another portion of the periphery (e.g., fixed portion 612) can utilize a solid or stiff bond between adjacent waveguide layers.

Utilizing the mechanically mobile joints illustrated in FIG. 16, it is possible to fabricate an eyepiece that includes both one or more dynamic waveguide layers and one or more static waveguide layers since the curvature of the individual eyepieces can be controlled independently.

Figure 17A:
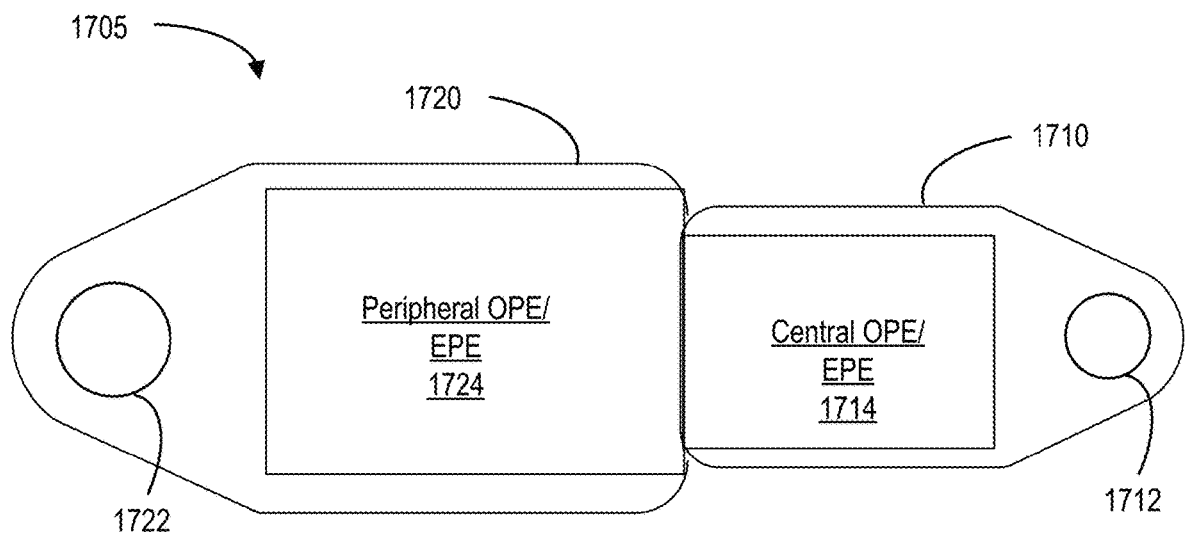
FIG. 17A is a simplified schematic diagram illustrating a foveated display system according to an embodiment of the present invention.

FIG. 17A is a simplified schematic diagram illustrating a foveated display system according to an embodiment of the present invention. Referring to FIG. 17A, foveated display system 1705 includes a central eyepiece 1710 and a peripheral eyepiece 1720. Central eyepiece 1710 includes an incoupling diffractive optical element 1712 and a central combined OPE/EPE 1714. Central eyepiece 1710 receives a display signal from a first projector (not shown). In the illustrated embodiment, central eyepiece 1710 is utilized to provide content for the central portion of the viewer's visual field of view, for example, a 40°×40° field of view in the center of the viewer's visual field of view. As discussed in relation to FIGS. 17B and 17C, the waveguide layers utilized in central eyepiece 1710 can be operated to implement variable curvatures that will provide a dynamic depth plane eyepiece.

In addition to central eyepiece 1710, foveated display system 1705 includes peripheral eyepiece 1720, which includes an incoupling diffractive optical element 1722 and a peripheral combined OPE/EPE 1724. Peripheral eyepiece 1720 receives a display signal from a second projector (not shown). In the illustrated embodiment, peripheral eyepiece 1720 is utilized to provide content for the peripheral portion of the viewer's visual field of view, for example, a 50°×50° field of view at the periphery of the viewer's visual field of view. As discussed in relation to FIGS. 17B and 17C, the waveguide layers utilized in peripheral eyepiece 1720 can be operated with a fixed planar geometry, thereby providing a fixed depth plane eyepiece.

Although peripheral eyepiece 1720 is illustrated to the left side of central eyepiece 1710, this is not required by the present invention and other geometric arrangements are included within the scope of the present invention, including multiple peripheral eyepieces, peripheral eyepieces that abut central eyepiece 1710 on more than one side, thereby at least partially surrounding central eyepiece 1710 on more than one side, and the like. Moreover, the field of view associated with the central and peripheral eyepieces is not limited to the specific field of views provided above and can vary according to the particular application. One of ordinary skill in the art would recognize many variations, modifications, and alternatives.

Figure 17B:
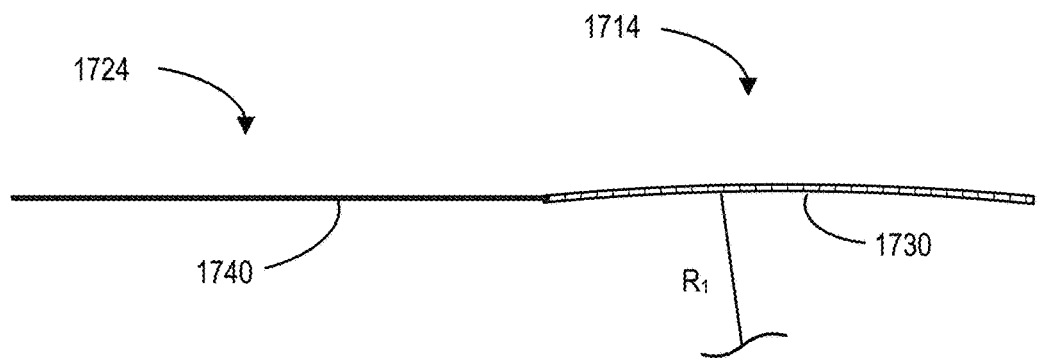
FIG. 17B is a simplified cross-sectional diagram illustrating waveguide layers of the foveated display system illustrated in FIG. 17A in a first configuration.

FIG. 17B is a simplified cross-sectional diagram illustrating waveguide layers of the foveated display system illustrated in FIG. 17A in a first configuration. For purposes of clarity, only a single waveguide layer of each of the respective eyepieces is illustrated in FIG. 17B, but it will be appreciated that, for example, three waveguide layers, each associated with a primary color, can be utilized to implement a multi-color display. Accordingly, implementations in which multiple waveguide layers implementing the illustrated curvatures are included within the scope of the present invention.

As illustrated in FIG. 17B, waveguide layer 1730 of central eyepiece 1714 is characterized by a first curvature ($R_1$). Similarly, waveguide layer 1740 of peripheral eyepiece 1724 is also illustrated, with a planar profile, i.e., an infinite radius of curvature. Because of the differing radii of curvature, the content for the central portion of the viewer's visual field of view is displayed at a predetermined depth plane, for example, 3 m while the content for the peripheral portion of the viewer's visual field of view is displayed at a greater distance, for example, infinity.

Figure 17C:
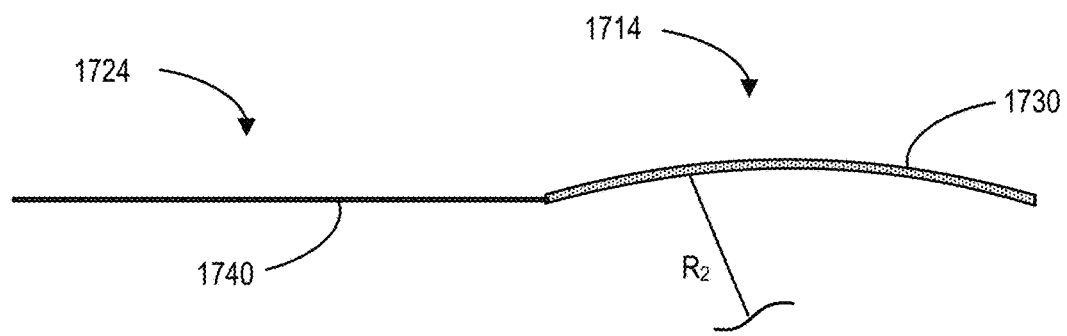
FIG. 17C is a simplified cross-sectional diagram illustrating waveguide layers of the foveated display system illustrated in FIG. 17A in a second configuration.

FIG. 17C is a simplified cross-sectional diagram illustrating waveguide layers of the foveated display system illustrated in FIG. 17A in a second configuration. Referring to FIG. 17C, waveguide layer 1730 of central eyepiece 1714 is characterized by a second curvature ($R_2$). As in FIG. 17B, waveguide layer 1740 of peripheral eyepiece 1724 is also illustrated, with a planar profile, i.e., an infinite radius of curvature. Because of the differing radii of curvature, the content for the central portion of the viewer's visual field of view is displayed at a predetermined depth plane, for example, 1 m while the content for the peripheral portion of the viewer's visual field of view is displayed at a greater distance, for example, infinity. In addition to the two radii of curvature $R_1$ and $R_2$ illustrated in FIGS. 17B and 17C, respectively, other radii of curvature can be produced using the various systems described herein to achieve a continuously varying radii of curvature as described throughout the present specification. Thus, in some embodiments, as virtual content associated with varying depth planes is produced by the first projector, the virtual content can be displayed at the appropriate depth plane by modification of the radius of curvature of the one or more waveguide layers of central eyepiece 1714.

Accordingly, embodiments of the present invention provide a foveated display system in which a first projector provides content to a dynamic depth plane eyepiece that is optically coupled to the first projector. The dynamic depth plane eyepiece includes a waveguide layer that can be operated to have differing radii of curvature, i.e., variable curvature. In some embodiments, the dynamic depth plane eyepiece is a central eyepiece of the foveated display, providing variable depth plane content in the central portion of the user or viewer's field of view. A second projector is utilized in conjunction with a fixed depth plane eyepiece that is optically coupled to the second projector. Thus, the foveated display includes a second region of the field of view that is characterized by a fixed depth plane. In some embodiments, the fixed depth plane eyepiece is utilized for content in the peripheral portion of the user or viewer's field of view. Accordingly, embodiments of the present invention provide a foveated display that is characterized by a field of view and includes a dynamic depth plane eyepiece that overlaps with a central portion of the field of view and a fixed depth plane eyepiece that overlaps with a peripheral portion of the field of view. In addition to the eyepieces differing in terms of the variable or fixed depth plane, other characteristics of the eyepieces can vary, for example, the resolution, with a lower resolution eyepiece utilized for the peripheral eyepiece 1724.

Figure 18:
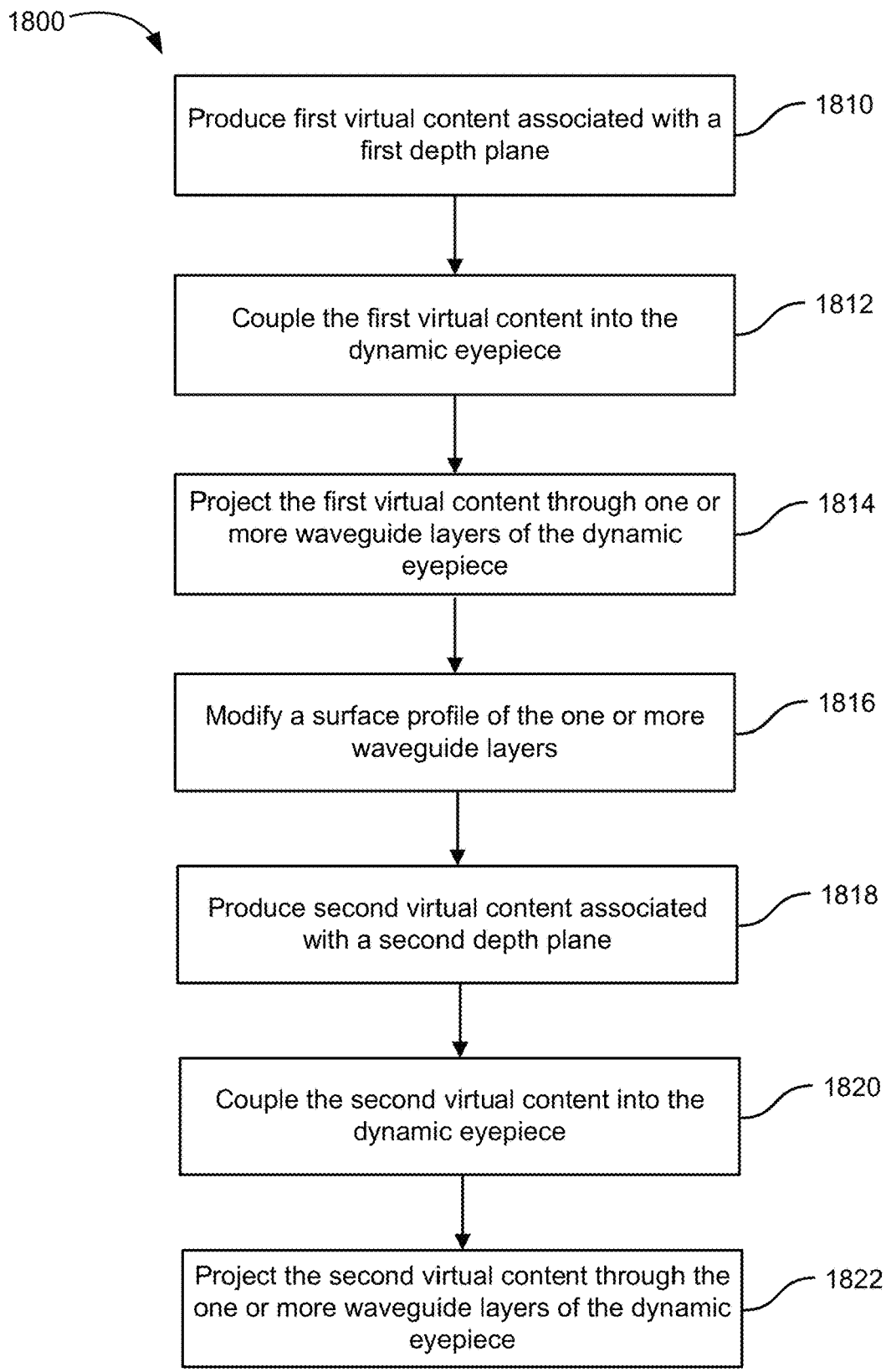
FIG. 18 is a flowchart illustrating a method of operating a dynamic eyepiece in an augmented reality headset according to an embodiment of the present invention.

FIG. 18 is a flowchart illustrating a method of operating a dynamic eyepiece in an augmented reality headset according to an embodiment of the present invention. The method includes producing first virtual content associated with a first depth plane (1810). The virtual content can include three colors and the one or more waveguide layers can include three waveguide layers, each associated with one of the three colors. Additionally, the method includes coupling the first virtual content into the dynamic eyepiece (1812), and projecting the first virtual content through one or more waveguide layers of the dynamic eyepiece to an eye of a viewer (1814). The one or more waveguide layers are characterized by a first surface profile.

The method also includes modifying the one or more waveguide layers to be characterized by a second surface profile different from the first surface profile (1816). Modifying the one or more waveguide layers can include applying a shear strain to a peripheral portion of the waveguide layer. Additionally, modifying the one or more waveguide layers can include applying a stretching and or compressive force to a peripheral portion of the waveguide layer. Moreover, modifying the one or more waveguide layers can include moving an actuator toward a fixed frame.

The method further includes producing second virtual content associated with a second depth plane (1818), coupling the second virtual content into the dynamic eyepiece (1820), and projecting the second virtual content through the one or more waveguide layers of the dynamic eyepiece to the eye of the viewer (1822).

In another embodiment, the method includes producing third virtual content associated with the first depth plane, modifying the waveguide layer to be characterized by the first surface profile, coupling the third virtual content into the dynamic eyepiece, and projecting the third virtual content through the one or more waveguide layers to the eye of the viewer.

It should be appreciated that the specific steps illustrated in FIG. 18 provide a particular method of operating a dynamic eyepiece according to an embodiment of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 19:
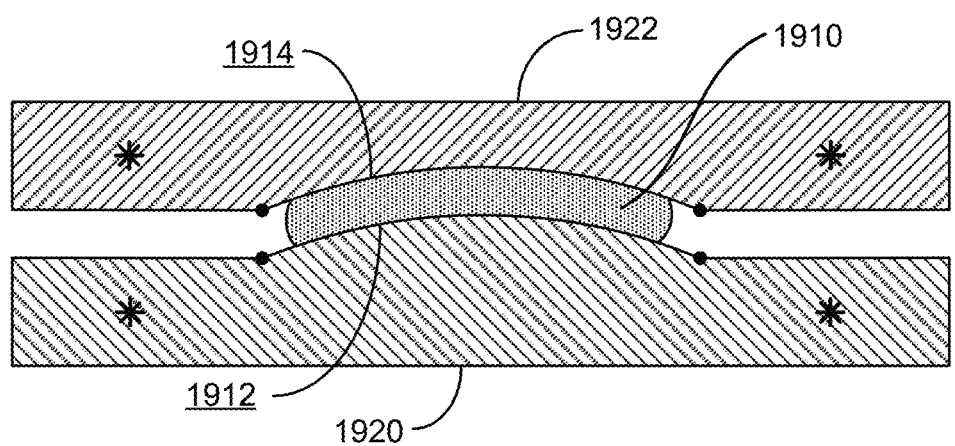
FIG. 19 is a simplified schematic diagram illustrating an apparatus for molding a curved waveguide layer according to an embodiment of the present invention.

FIG. 19 is a simplified schematic diagram illustrating an apparatus for molding a curved waveguide layer according to an embodiment of the present invention. Referring to FIG. 19, waveguide layer 1910, which may be a molded, curved polymer layer, or multiple waveguide layers, each of which may be a molded, curved polymer layer, is positioned between two molds 1920 and 1922. Molds 1920 and 1922, which can be made of glass, are characterized by a predetermined curvature, for example, a spherical curvature (e.g., radii >0.1 m), and are used to mold the waveguide layer 1910 such that the waveguide layer has a predetermined curvature, for example, spherical curvature on each of the surfaces of waveguide layer 1910. In some embodiments, surface 1912 has a first predetermined curvature and surface 1914 has a second predetermined curvature. The first predetermined curvature and the second predetermined curvature can be a same curvature or be different curvatures.

In order to form molds 1920 and 1922, patterning, imprinting, or other techniques can be used, for example, patterning on a curved template. For the example of patterning on a curved template, the curvature of the template corresponds to the final desired or predetermined curvature of the waveguide layer. In some implementations, molds 1920 and 1922, which can be referred to as a bottom mold and a top mold, are aligned with high accuracy to obtain a desired total thickness variation (TTV). As an example, either the edge of the curved surface of the molds or an additional mark such as a fiducial on flat portions of the molds can be utilized to align the molds. One of ordinary skill in the art would recognize many variations, modifications, and alternatives.

Figure 20A:
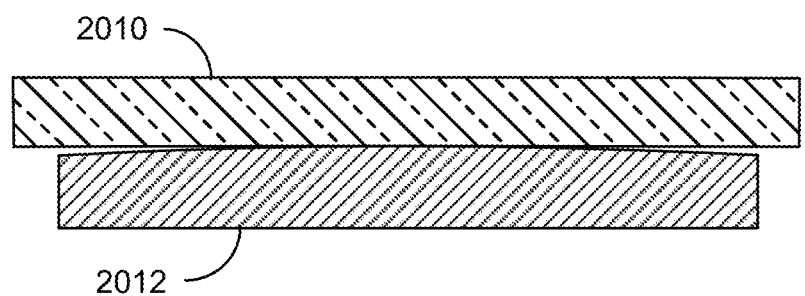
FIG. 20A is a simplified schematic diagram illustrating a pre-annealed planar waveguide layer according to an embodiment of the present invention.
Figure 20B:
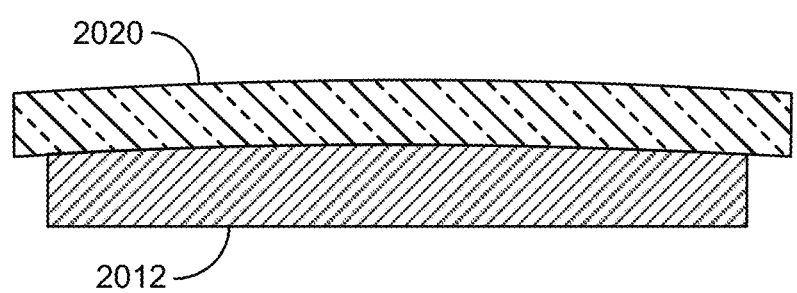
FIG. 20B is a simplified schematic diagram illustrating a pre-annealed curved waveguide layer according to an embodiment of the present invention.
Figure 20C:
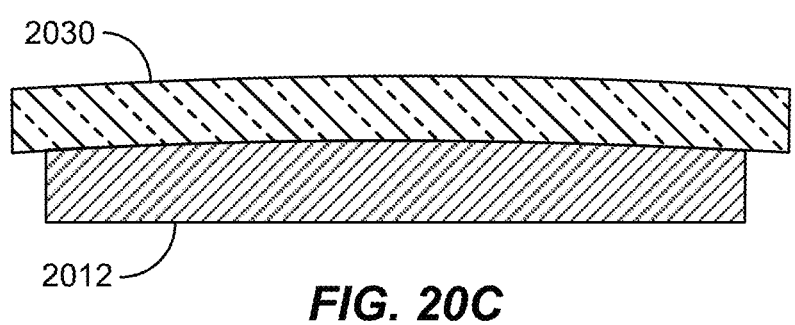
FIG. 20C is a simplified schematic diagram illustrating a post-annealed curved waveguide layer according to an embodiment of the present invention.

FIG. 20A is a simplified schematic diagram illustrating a pre-annealed planar waveguide layer according to an embodiment of the present invention. FIG. 20B is a simplified schematic diagram illustrating a pre-annealed curved waveguide layer according to an embodiment of the present invention. FIG. 20C is a simplified schematic diagram illustrating a post-annealed curved waveguide layer according to an embodiment of the present invention.

In FIGS. 20A-20C, a process in which post fabrication annealing (referred to as post-annealing) of the waveguide layer on a curved substrate is utilized to form a curved waveguide layer. In addition to the nomenclature of post-annealing, the process may be referred to as "under the action of heat" as this process does not have to performed as a post-annealing process step. Referring to FIG. 20A, the process can utilize planar waveguide layer 2010 that is positioned on curved substrate 2012. As discussed in relation to FIG. 19, curved surface 1912 (as well as curved surface 1922 discussed below) has a predetermined curvature and can be utilized as curved substrate 2012.

Additionally, as illustrated in FIG. 20B, the process can utilize pre-curved waveguide layer 2020 that is positioned on curved substrate 2012. Thus, after initial molding of the waveguide layer to form a planar waveguide layer or a curved waveguide layer, for example, using the molding process illustrated in FIG. 19, the waveguide layer is positioned or otherwise placed on a curved substrate in preparation for the post-annealing process.

In an embodiment, the waveguide layer (e.g., planar waveguide layer 2010 or pre-curved waveguide layer 2020) and the curved substrate 2012 are heated at annealing temperature ($T_{ann}$) above the glass transition temperature ($T_g$) of the material making up the waveguide layer. As an example, for a polymer waveguide layer, the annealing temper can be $T_{ann}$=120° C. for LPB-1102). The waveguide layer and the curved substrate are held at or above the annealing temperature for a given period of time (typically 10-20 minutes) and then cooled down, for example at a slow rate such as <2° C./min). As the waveguide layer (e.g., the polymer material) is softened at temperatures above $T_g$, the waveguide layer 2030 forms to the shape of the curved substrate 2012 during the annealing process, including the cool down phase as illustrated in FIG. 20C. In some implementations, curved templates with a size smaller than the waveguide layer are utilized in order to reduce or minimize undesired bow/warp in the final waveguide layer. Moreover, in some embodiments, the surface of the curved substrate is prevented from sticking or otherwise adhering to the waveguide layer material so that the waveguide layer material (e.g., the polymer) can stretch and contract freely during the thermal cycling. In order to prevent adherence, one of several techniques can be utilized including utilization of a curved substrate having a predetermined roughness (e.g., 10 nm~1000 nm or roughness) or coating of the curved substrate with materials that provide hydrophobic and/or superhydrophobic properties. An example hydrophobic material is Teflon. As discussed above, the process illustrated in FIG. 20B can be utilized in conjunction with the process illustrated in FIG. 19. One of ordinary skill in the art would recognize many variations, modifications, and alternatives.

Figure 21:
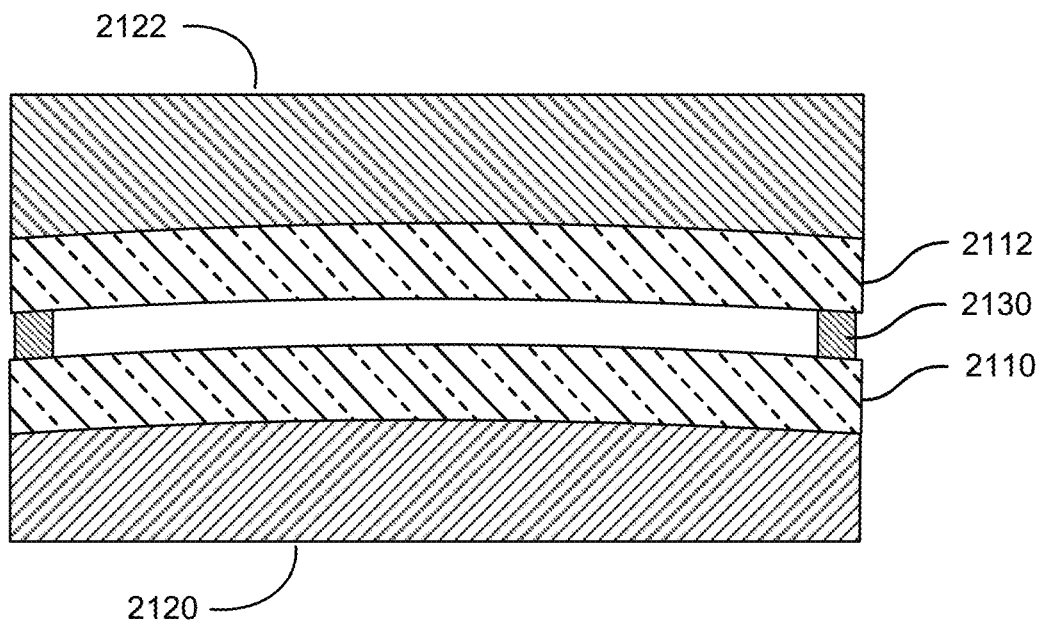
FIG. 21 is a simplified schematic diagram illustrating an apparatus for forming a set of curved waveguide layers according to an embodiment of the present invention.

FIG. 21 is a simplified schematic diagram illustrating an apparatus for forming a set of curved waveguide layers according to an embodiment of the present invention. Referring to FIG. 21, a method of curving a set of waveguide layers, which may form elements of an eyepiece, during stacking of the set of waveguide layers. As illustrated in FIG. 21, the waveguide layers (e.g., polymer waveguide layers) can be either flat or curved after either a casting/molding process and/or a post-annealing process has been performed.

Referring to FIG. 21, the curvature of first waveguide layer 2110 and second waveguide layer 2112 is determined by using curved vacuum chuck 2120 to hold first eyepiece layer 2110 and curved vacuum nozzle 2122 to place or position second waveguide layer 2112 adjacent first waveguide layer 2110. An air gap may be formed between first waveguide layer 2110 and second waveguide layer 2112 by the use of a glue material 2130 at peripheral portions of first waveguide layer 2110 and second waveguide layer 2112. Glue material 2130 imparts stress in first waveguide layer 2110 and second waveguide layer 2112 to maintain the curved shape resulting from the fabrication process. Typically, glue material 2130 is characterized by strong adhesion to the waveguide layer material (e.g., to polymer layers). In an implementation, glue material 2130 is either a UV curable adhesive or a pressure sensitive adhesive. In embodiments in which a UV curable adhesive is utilized, curved nozzle 2122 can be transparent to allow UV light to impinge on the UV curable adhesive.

Figure 22:
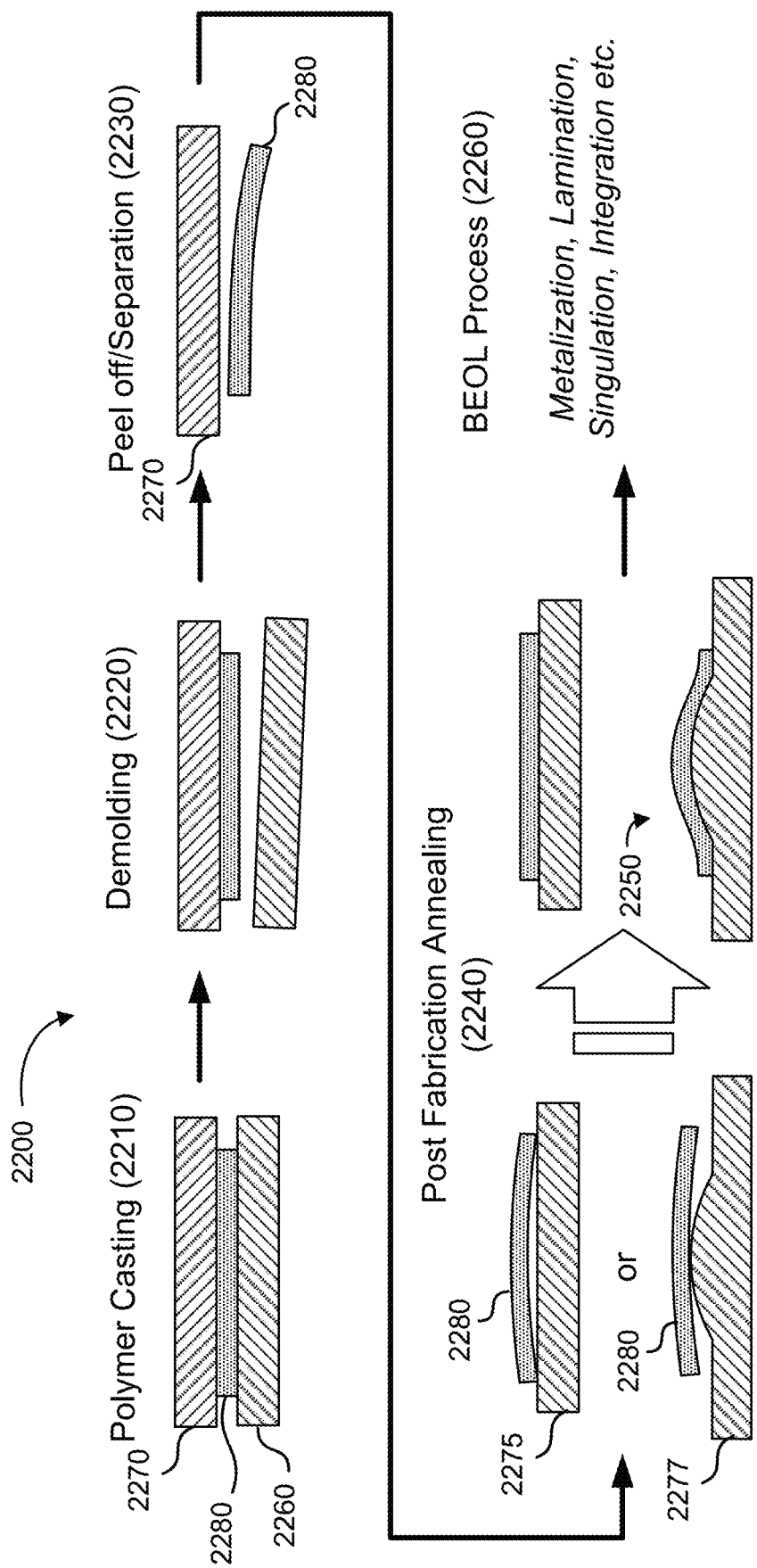
FIG. 22 shows a simplified method of a fabrication process flow for a polymer waveguide, according to certain embodiments.

FIG. 22 shows a simplified method 2200 of a fabrication process flow for a polymer waveguide according to certain embodiments. At operation 2210, method 2200 can include casting a polymer waveguide, according to certain embodiments. Polymer casting can include utilizing a top mold 2270 and bottom mold 2260 to form a polymer waveguide 2280. Polymer waveguide 2280 is shown as a single linear eyepiece for ease of explanation, however such waveguides, as further described herein, are typically three-dimensional structures, as shown for instance in FIG. 10A-10C. During casting, top mold 2270 and bottom mold 2260 provide heat and pressure to form and shape polymer waveguide 2280. Generally casting temperature typically range from room temperature (e.g., 20° C.-22° C.) to 120° C. and casting time can range from 5 s-10 min depending on composition and UV power. In typical processes, casting is done at room temperature to 40° C. for 25 s-1 min.

At operation 2220, method 2200 can include a demolding process, according to certain embodiments. Demolding may occur when one of the molds is released from the polymer waveguide. Demolding process typically takes place at room temperature, although other temperatures are possible and may include a variety of different mechanisms (e.g., mechanical force, pressure differential, adhesion modulation, etc.) to separate the first mold from the casted polymer, as would be appreciated by one of ordinary skill in the art with the benefit of this disclosure.

At operation 2230 (step 3 in FIG. 22), method 2200 can include a separation process, according to certain embodiments. The "peeling off" or separation process occurs when the top mold 2270 is removed from the polymer waveguide 2280.

At operation 2240, method 2200 can include a post-fabrication annealing process, according to certain embodiments. Annealing is typically a process where a material undergoes a heat treatment to a certain temperature where it is kept for a certain time, and is then cooled to room temperature in order to alter the material properties. The annealing process is typically time and temperature dependent. With respect to polymers (e.g., waveguide polymers), the annealing process includes a heating of a polymeric part to above its glass transition temperature in order to relieve internal stresses that may have been introduced during its fabrication process (e.g., molding, cooling after molding, machining, welding, etc.). In some cases, annealing may include the process of heating a plastic part below its glass transition temperature for a moderate period of time before letting the plastic cool down, which can operate to "relax" the material and reduce molding stresses. Typically, these stresses may typically include tension or compression (e.g., built-in stress or molded stress). Annealed polymer/plastics can have better mechanical and thermal properties because there will likely be fewer sites in the polymer (due to the annealing process) that could propagate a crack or alter the shape of the device (e.g., waveguide).

Referring back to operation 2240, a polymer waveguide is configured on a flat template 2275 or a curved template 2277 to cause the polymer waveguide 2280 to adopt the form of the template. Post-fabrication annealing ("post-annealing") of the waveguide layer on a curved substrate or template 2277 may be utilized to form a curved waveguide layer. In addition to the nomenclature of post-annealing, the process may be referred to as "under the action of heat" as this process does not have to performed as a post-annealing process step. It should be noted that the templates described herein may be referred to as molds with the understanding that casting molds and post-anneal molds are different tools and perform different operations, as described herein.

Figure 24A:
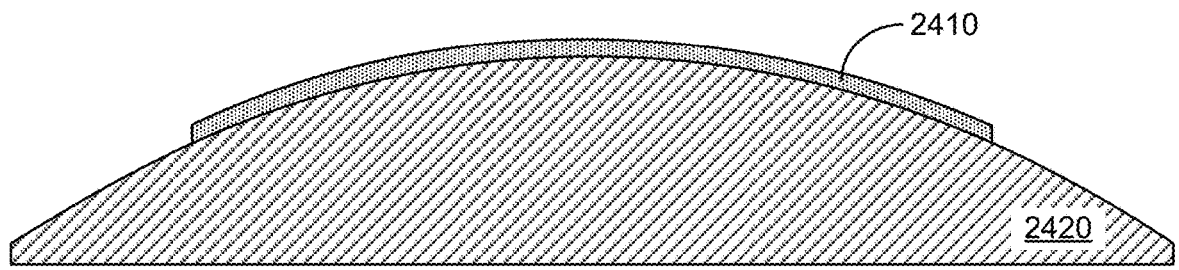
FIGS. 24A-24C shows a cross-section of various custom molds with freeform surfaces for curving a polymer waveguide according to certain embodiments.
Figure 24B:
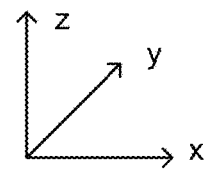
Figure 24B:
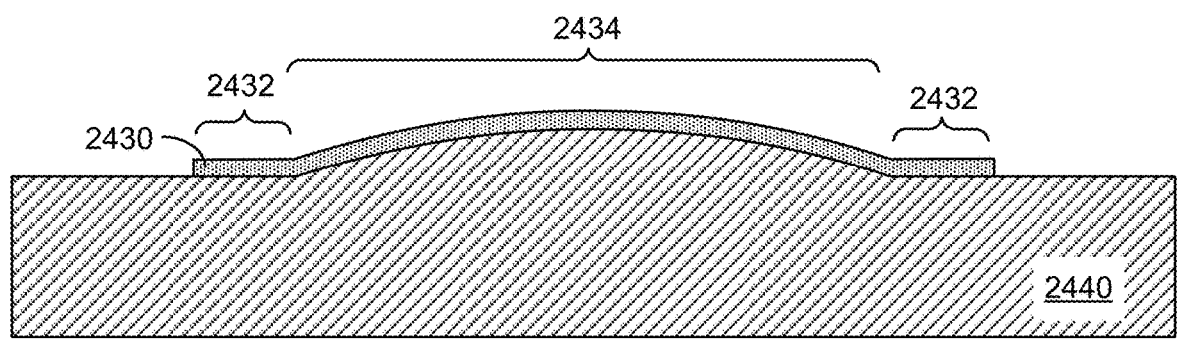
Figure 24C:
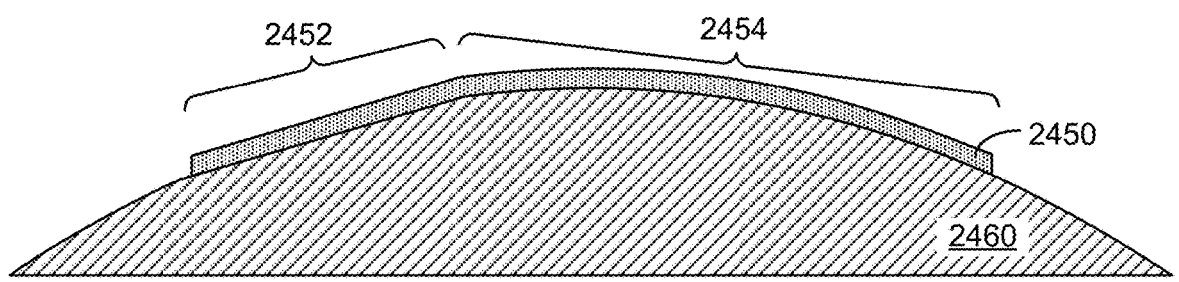

By way of example, the waveguide layer (e.g., a planar waveguide layer or pre-curved waveguide layer) and the curved substrate (e.g., curved substrate 2420, 2440, 2460 as illustrated in FIGS. 24A-24C) can be heated at annealing temperature ($T_{ann}$) above the glass transition temperature ($T_g$) of the material making up the waveguide layer. As an example, for a polymer waveguide layer, the annealing temperature can be $T_{ann}$=120° C. for 1.72 polymer). The waveguide layer and the curved substrate are held at or above the annealing temperature for a given period of time (typically 10-20 minutes) and then cooled down, for example at a slow rate such as <2° C./min). As the waveguide layer (e.g., the polymer material) is softened at temperatures above $T_g$, the waveguide layer forms to the shape of the curved substrate during the annealing process (operation 2250), including a cool down phase. Moreover, in some embodiments, the surface of the curved substrate is prevented from sticking or otherwise adhering to the waveguide layer material so that the waveguide layer material (e.g., the polymer) can stretch and contract freely during the thermal cycling. In order to prevent adherence, one of several techniques can be utilized including utilization of a curved substrate having a predetermined roughness (e.g., 10 nm~1000 nm or roughness) or coating of the curved substrate with materials that provide hydrophobic and/or super-hydrophobic properties. An example hydrophobic material is Teflon. One of ordinary skill in the art would recognize many variations, modifications, and alternatives.

At operation 2260, method 2200 can include a back-end-of-line (BEOL) process, according to certain embodiments. Some examples of BEOL processes can include metallization, stacking, lamination, singulation, integration, and more, as would be appreciated by one of ordinary skill in the art with the benefit of this disclosure.

It should be appreciated that the specific steps illustrated in FIG. 22 provide a particular method for a fabrication process flow for a polymer waveguide, according to certain embodiments. Other sequences of steps may also be performed according to alternative embodiments. Furthermore, additional steps may be added or removed depending on the particular applications. For instance, method shows a fabrication process for a single polymer waveguide. Some embodiments may employ a multi-template vertical "stack" that incorporates multiple templates (post-anneal molds) that can be used to simultaneously form multiple polymer waveguides in a particular shape (e.g., a combination of curved and flat regions). Any combination can be used and one of ordinary skill in the art with the benefit of this disclosure would understand the many variations, modifications, and alternative embodiments thereof.

Figure 23:
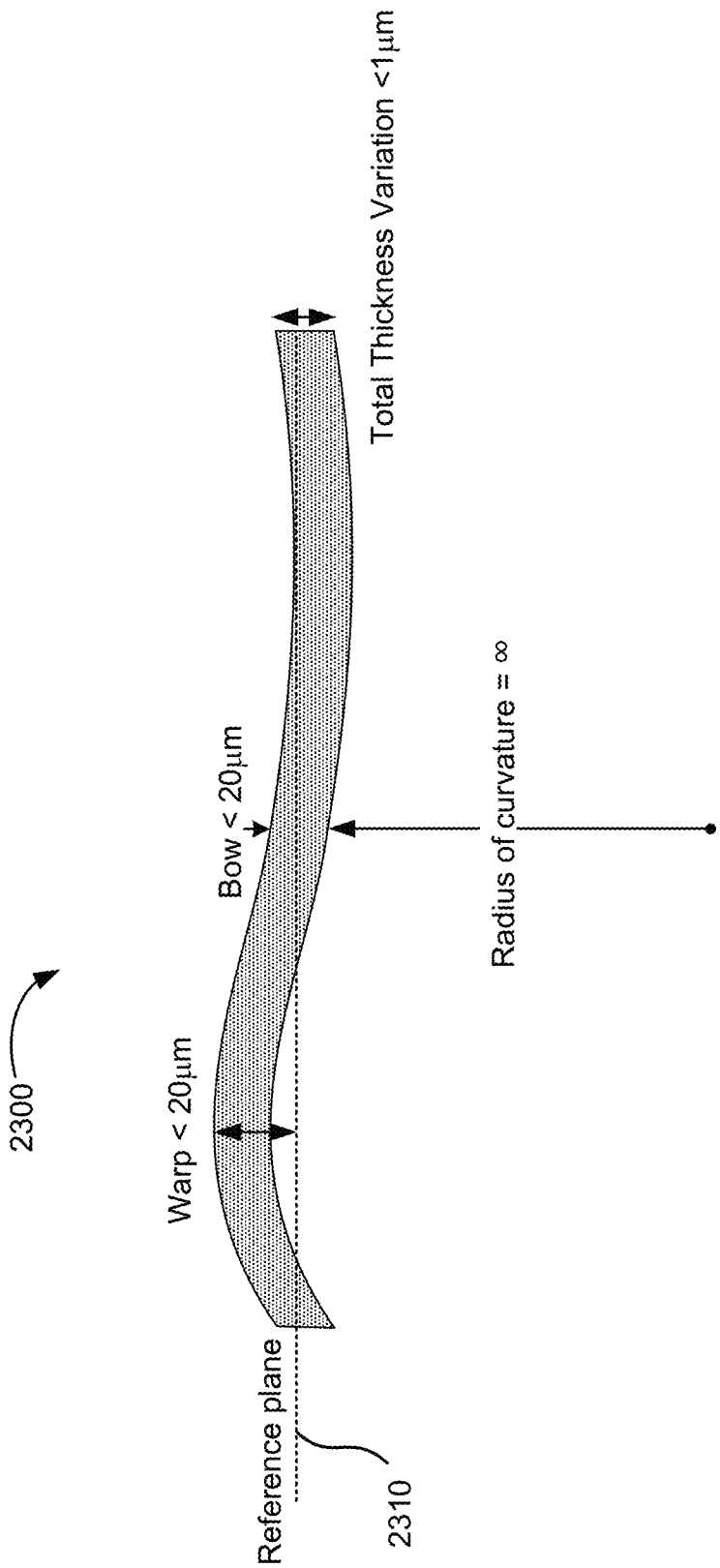
FIG. 23 shows a simplified diagram illustrating aspects of a flat substrate according to certain embodiments.

FIG. 23 shows a simplified diagram illustrating aspects of a flat substrate 2300 according to certain embodiments. The present application frequently refers to a "flat" substrate, or flat features of the polymer waveguide (or a wafer that is cut to form polymer waveguides) during the manufacturing process. However, "flat" can be more aptly defined by certain parameters that are frequently associated with the fabrication process. For instance, the terms "bow" and "warp" typically represent the shape of the wafer when resting in a natural state without any vacuum suctioning (from a chuck) or other forces that could deform the wafer. Bow is typically the distance between the surface and a best fit plate at the center of the unclamped wafer. Warp is typically the sum of the maximum positive and negative deviations from the best fit plane, which is usually with the wafer unclamped (no external forces to deform the wafer at rest). Global Back Ideal Range (GBIR) and Total Thickness Value (TTV) are the difference between the maximum and minimum values of the wafer thickness (typically with the wafer clamped in place). GBIR (TTV) can also be measured at the front and back surface of wafer when in its natural state (not clamped).

Referring back to FIG. 23, for the purposes of this disclosure, a "flat" substrate will typically refer to a wafer 2300 that has less than 20 μm of warp from a reference place 2310, less than 20 μm of bow, a total thickness variation of less than 1 μm. Ideally, the radius of curvature in a flat substrate is infinity. For the purposes of presenting the novel concepts described herein, a wafer (and corresponding polymer waveguides) may be considered to have a radius of curvature equal to infinity (i.e., a radius of ∞) with tolerances equal to or better than the limits defined here. This should not be considered limiting and one of ordinary skill in the art with the benefit of this disclosure would appreciate the many modifications, variations, and alternative embodiments thereof that would generally be considered "flat" by industry standards.

FIGS. 24A-24C show a cross-section of various custom molds with freeform surfaces for curving a polymer waveguide according to certain embodiments. These three examples show various topologies that produce specific shapes in different regions of a polymer waveguide. The freeform surfaces can be a combination of flat, spherical, and aspherical surfaces or more complex shapes depending on the desired optical functions and applications, and are not limited to the examples presented here, as would be appreciated by one of ordinary skill in the art with the benefit of this disclosure.

FIG. 24A shows an example of a freeform surface 2420 that operates to introduce a universal curving along a polymer waveguide, according to certain embodiments. The polymer waveguide can be referred to as having a universal curve because the entire length (also referred to as the lateral extent) of the polymer waveguide is characterized by a constant curvature as a function of lateral position (i.e., in the x-y plane). Polymer waveguide 2410 may be raised to an annealing temperature (e.g., 120° C.) for a period of time (e.g., 10-20 minutes), followed by a cool down period (e.g., <2° C./min). In some embodiments, a polymer waveguide can be comprised of 1.72 polymer (e.g., annealing temperature range of 90° C. to 120° C.) or 1.75 polymer (e.g., annealing temperature range of 80° C. to 100° C.). During a post anneal process, the waveguide deforms to the shape of the underlying surface of mold 2420. Referring to FIG. 24A, a spherical curvature is formed along the length of polymer waveguide 2410 (universal curving) or a portion thereof. Although curved regions may be well-suited for an OPE, EPE, or CPE region, they may be problematic for ICG regions and may be prone to deleterious imaging effects such as image swimming and distortion during dynamic modulation of the curvature of the polymer waveguide, and flat regions help to better align image projectors to the ICG, as would be appreciated by one of ordinary skill in the art with the benefit of this disclosure. Note that the terms "free form surface," "template," and "mold" may be used to refer to same fabrication tooling structure. For instance, free form surface 2420 may be referred to as a mold 2420 or template 2420, as done in the embodiments that follow. However, the use of the term "mold" in the post-anneal process should not be confused with the types of molds that are used when initially casting the waveguide.

FIG. 24B shows a local curving of a polymer waveguide 2430 over a spherical region 2434 of underlying surface mold 2440, and flat portions of the waveguide over flat regions 2432 of underlying surface 2440, according to certain embodiments. The locally curved portion may correspond to a CPE region of polymer waveguide 2430, while flat regions may be well-suited for placing the ICG, as indicated above.

FIG. 24C shows a local curving of a polymer waveguide 2450 over a spherical region 2454 of underlying surface 2460, and flat portions of the waveguide over flat regions 2452 of underlying surface 2460, according to certain embodiments. The locally curved portion may correspond to a CPE region of polymer waveguide 2430, while the flat region 2452 may be a preferred site for projector integration (e.g., ICG) or areas that are more easily handled in BEOL processes (including metallization, stacking, and singulation). In each of the examples, the curved regions can either be spherical (e.g., R0.1 m-R20.0 m) or aspherical, as would be appreciated by one of ordinary skill in the art with the benefit of this disclosure. Moreover, although a constant radius of curvature is illustrated in the local curvature areas of FIGS. 24B and 24C, this is not required and different curvatures can be utilized at different lateral positions of the local curvature area.

In some embodiments, the underlying custom molds (e.g., illustrated in FIGS. 24A-24C) may have an anti-stiction property such that the polymer waveguide does not stick to its surface and is free to move during thermal cycling of the curving process. There are a number of ways to employ the anti-sticking property. For example, a uniform surface coating of an anti-stick compound such as polytetrafluoroethylene (PTFE), fluorinated ethylene propylene (FEP), or other suitable non-stick coating, as would be appreciated by one of ordinary skill in the art with the benefit of this disclosure. In some cases, freeform surfaces can be directly machined on a non-stick block (e.g., PTFE).

The surface of the freeform custom mold may be particle-free to maintain the cleanliness of the polymer waveguide after the curving process. In some aspects, the surface can have a moderate roughness (e.g., 10 nm to 10 μm RMS) such that the waveguide polymer does not stick to the surface (e.g., via optical bonding) and is free to move during the thermal cycling of the curving process. This can be accomplished by machining (e.g., diamond turning, molding, casting) raw materials (e.g., glass, fused silica, metal, etc.), followed by surface grinding or etching to achieve the desired roughness, while still maintaining a particle-free surface. In instances where a threshold for roughness or cleanliness is not met, a clean and compliable textile (e.g., cleanroom wipe made of synthetic polyester) can be placed between a polymer sample and a freeform surface during the curving process to improve non-stick properties.

Figure 25A:
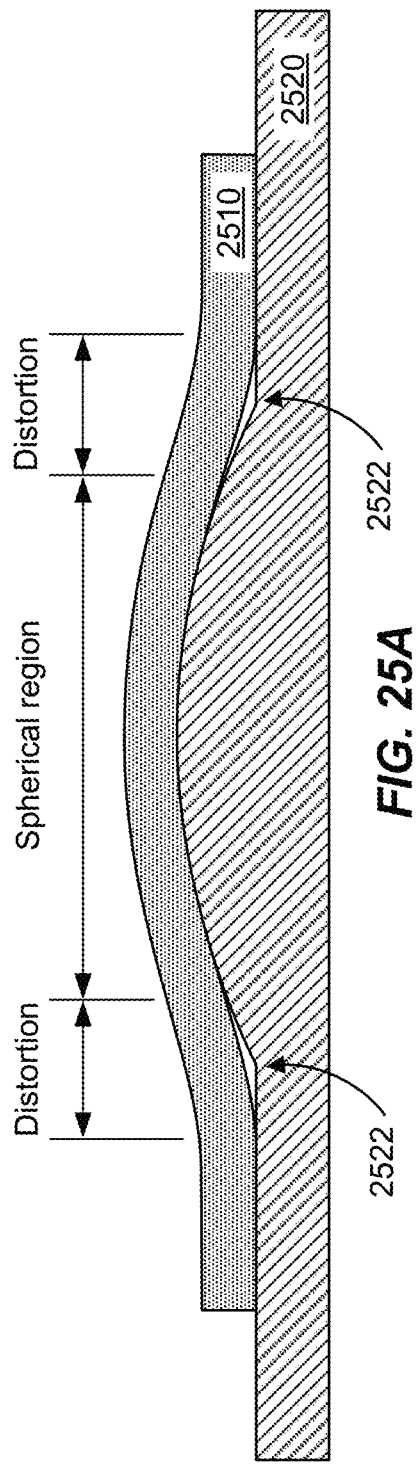
FIGS. 25A and 25B show aspects of certain polymer curving methods and corresponding issues that can arise.
Figure 25B:
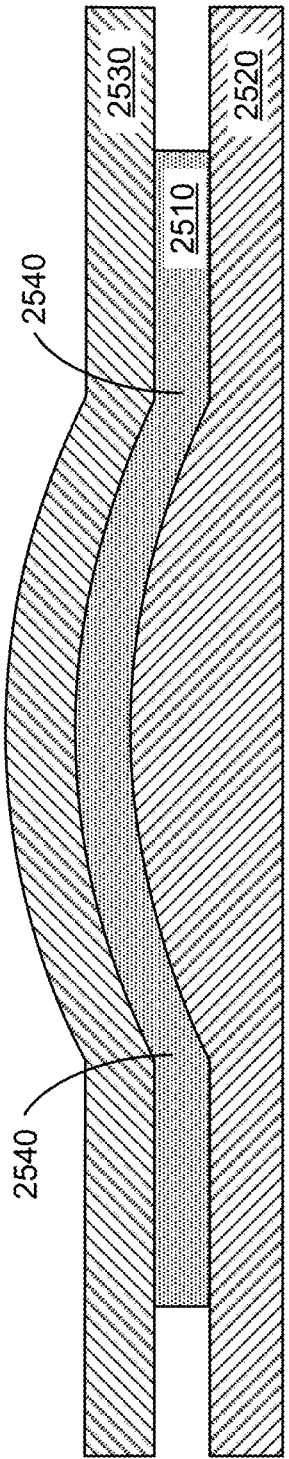

FIGS. 25A and 25B show aspects of certain polymer curving methods and corresponding issues that may arise. In some instances, the polymer waveguide may not strictly conform to the underlying surface contour of the freeform custom mold during the post-anneal thermo-cycling process when no additional forces other than gravity applied other than gravity. This can result in a long curve-to-flat transition length, such as when a spherical portion of the polymer waveguide (e.g., CPE) transitions to a flat portion where the ICG may be configured. Depending on the polymer thickness and the curving area, the transition length may increase and include image distortion at the edges of the eye box. Referring to FIG. 25A, extended curved-to-flat transitions of polymer waveguide 2510 over freeform custom mold 2520 can occur, causing image distortion over the areas of the polymer waveguide at or near the transition 2522, and particularly longer extensions may enter or encroach flat areas where the ICG may be located, which can further introduce deleterious image effects in the waveguide. Note that polymer waveguide 2510 does not make contact with the transition 2522, leaving a gap and thereby contributing to the extension of the curve-to-flat transition.

FIG. 25B shows a simplified diagram of a "sandwiched" polymer curving method and corresponding issues that may arise therefrom. A polymer waveguide 2510 rests on freeform surface mold 2520 ("bottom mold") and a second mold 2530 ("top mold") placed on top that "sandwiches" polymer waveguide 2510 and applies additional force to cause polymer waveguide 2510 to better conform to the contours of underlying bottom mold. Such methods may operate to incorporate sharper curved-to-flat transitions, however they are prone to causing damage to the polymer waveguide such as scratches, indentions, and the like, at points of sharp transitions due, for instance, to the misalignment of top and bottom molds. Referring to FIG. 25B, polymer waveguide 2510 may incur damage at locations 2540 due to improper misalignment, which can be difficult to reliably control. In some cases, damage can also affect the active gratings (e.g., ICG) when subjected to hard contact with the top and/or bottom molds.

In the embodiments that follow, various high-fidelity curving techniques are introduced that produce improved polymer waveguides. These embodiments and methods can help mitigate the extended curved-to-flat transitions described above while avoiding damage to the polymer waveguide, allow for improved top and bottom mold alignment during the post annealing/curving process, and prevent active gratings (e.g., ICG) from incurring damage during the curving process, as further described below.

Figure 26A:
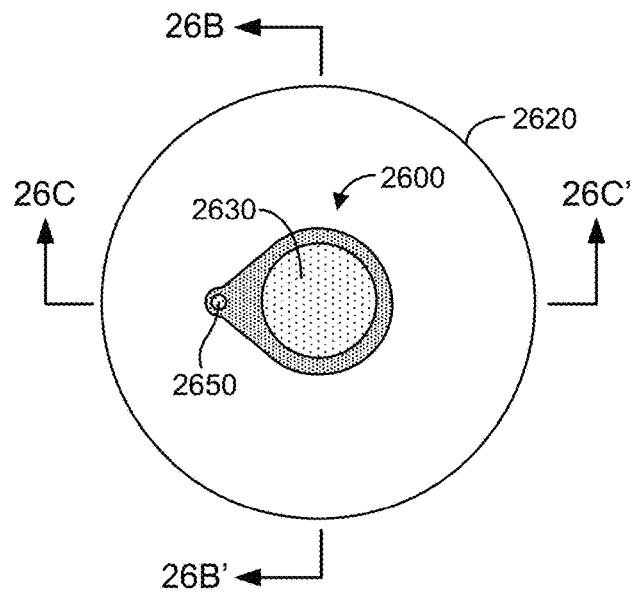
FIG. 26A-26C are simplified diagrams showing aspects of a high-fidelity curving process for a polymer waveguide according to certain embodiments.
Figure 26B:
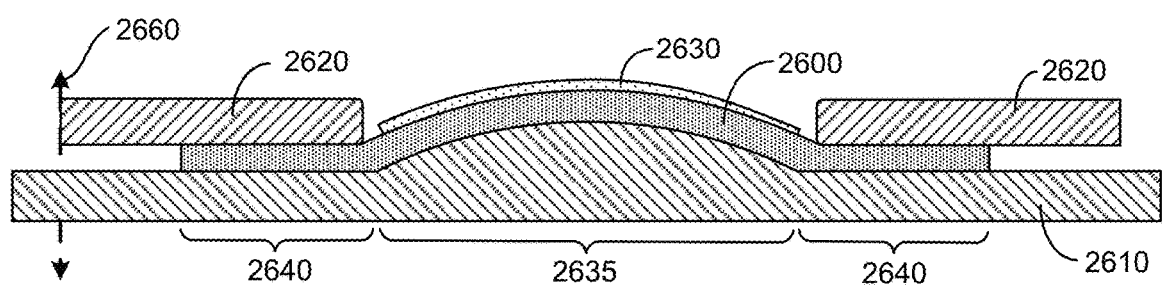
Figure 26C:
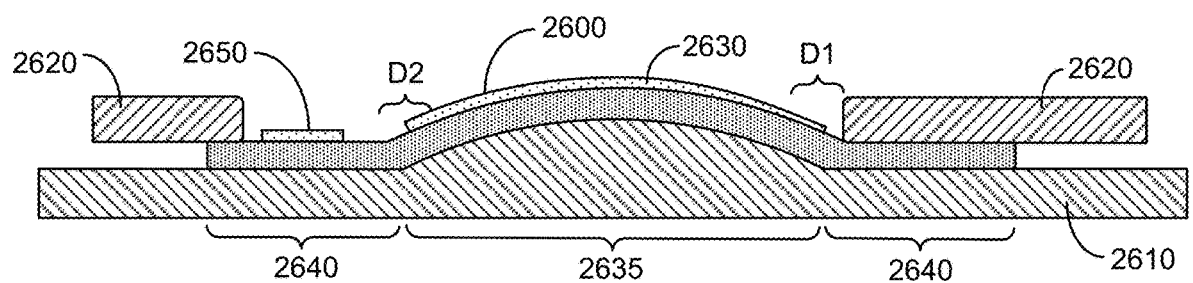

FIGS. 26A-26C are simplified diagrams showing aspects of a high-fidelity curving process for a polymer waveguide 2600 according to certain embodiments. FIG. 26A shows a plan view of a polymer waveguide 2600 including a circular and spherical CPE region 2630 and an ICG region 2650. As illustrated in FIG. 26A, an eyepiece can include a waveguide layer that is characterized by a teardrop shape in plan view. Although a teardrop shape is illustrated in FIG. 26A, embodiments of the present invention are not limited to this particular shape and other shapes are included within the scope of the present invention.

Polymer waveguide 2600 is sandwiched between a bottom mold 2610 (not visible from this view) and top mold 2620. Top mold 2620 can have a predefined cutout area that can operate to define a desired transition length without inducing damages on sensitive light propagation areas (e.g., transition between curved and flat areas), allows for top and bottom mold alignment during the post-annealing/curving process, and prevents active gratings (e.g., ICG 2650) from being damaged during the curving process. FIG. 26B shows a side cutaway view from 26B-26B' (see FIG. 26A) of polymer waveguide 2600 during the curving process. The relationship between bottom mold 2610, top mold 2620, and polymer waveguide 2600 sandwiched there between is more readily visible from this perspective view. From the 26B-26B' perspective view, top mold 2620 is positioned and aligned (2660) at or near the curved-to-flat transition of bottom mold 2610 (e.g., where locally curved portion 2635 transitions to flat portion 2640) on both the 26B and 26B' sides, thereby causing a short corresponding transition for polymer waveguide 2600, while still avoiding any damage which could affect TIR or other optical parameters. That is, the curved-to-flat transition along the 26B-26B' cross-section can be abrupt (e.g., ideally as small as a transition length of 0 mm or as small as practicable) as light does not propagate along this direction and therefore this region is not subject to deleterious light coupling effects (e.g., distortion).

FIG. 26C shows a side cutaway view from 26C-26C' of FIG. 26A during the curving process. On the 26C' side, top mold 2620 is positioned and aligned at or near to the curved-to-flat transition of bottom mold 2610, thereby causing a short corresponding transition length D1 for polymer waveguide 2600. On the 26C side, top mold 2620 is positioned outside of ICG 2650. In this configuration, the desired transition length D2 can be defined without inducing damage to ICG 2650 (for instance, if top mold 2620 was positioned on top of ICG 2650), but still defines a desired transition length such that polymer waveguide 2600 is flat at the ICG 2650 site to maintain good optical performance. That is, the curved-to-flat transition along the 26C-26C' cross-section has a transition that is short enough to ensure that ICG 2650 is flat (e.g., the curved-to-flat transition does not overlap or too closely encroach ICG 2650) and also long enough to avoid damage at the curved-to-flat transition, as described above. For a point of reference, some embodiments may have a transition length D2 of approximately 9 mm without top mold 2620, which would not encroach into the ICG area; with top mold 2620, D2 can be reduced to approximately 6 mm with top mold 2620 configured approximately 5 mm from ICG 2650. Top mold 2620 can be configured as close as possible to ICG 2650 (e.g., up to the edge of ICG 2650) without touching, and the closer top mold 2620 is to ICG 2650, generally the shorter transition length D2 can be.

Although FIGS. 26A-26C illustrate formation of a single polymer waveguide using templates, it will be appreciated that multiple polymer waveguides can be fabricated using stacked implementations. Thus, the techniques described herein are applicable to multiple waveguide fabrication processes. One of ordinary skill in the art would recognize many variations, modifications, and alternatives. In typical embodiments, CPE may have a diameter of 35-40 mm, ICG may have a diameter of 1-3 mm, and the distance between CPE and ICG (e.g., denoted D) can be 10-15 mm. Other dimensions and scales are possible, as would be appreciated by one of ordinary skill in the art with the benefit of this disclosure.

Figure 27A:
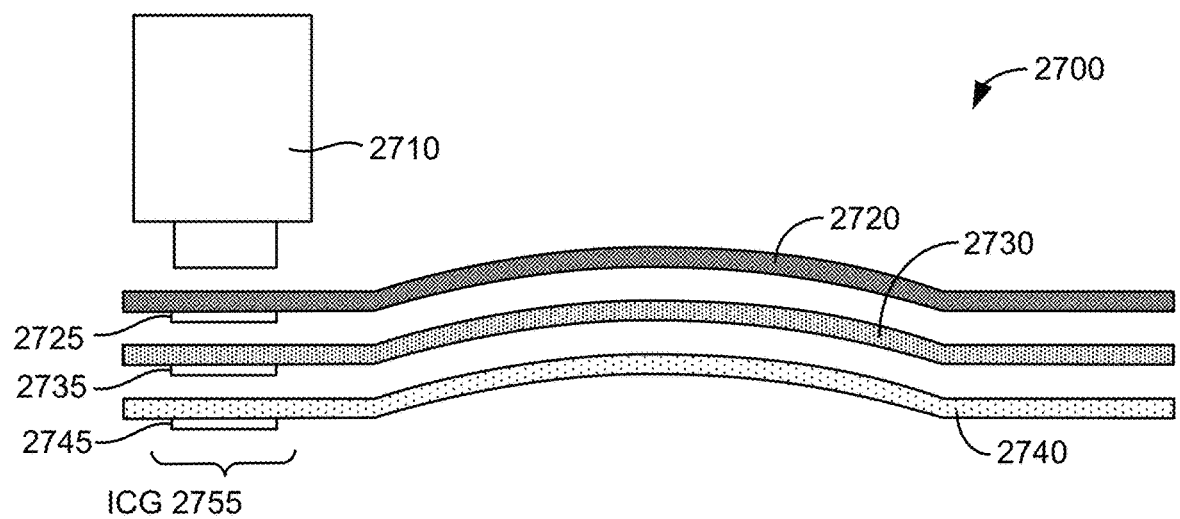
FIG. 27A is a simplified cross-sectional diagram showing an example of a universally flat, multi-layer eyepiece stack with locally curved CPEs according to certain embodiments.

FIG. 27A is a simplified cross-sectional diagram showing an example of a universally flat, multi-layer eyepiece stack ("eyepiece," "eyepiece stack," "polymer waveguide stack") 2700 with locally curved CPEs according to certain embodiments. In some embodiments, eyepiece stack 2700 may include three or more polymer waveguides for RGB color imaging, such as polymer waveguides 2720 (e.g., green), 2730 (e.g., blue), and 2740 (e.g., red). Projector 2710 may be a split-pupil projector and can be configured cover a flat region of each polymer waveguide to allow the optical injection of the RGB colors at the same angle for proper mixing of RGB images for each polymer waveguide (ICG 2755). Flat ICGs are typically preferred for in-line ICGs, which can result in an increased field of view via inter-layer crosstalk. In some aspects, coatings 2725, 2735, and 2745 can be added to ICGs, as would be appreciated by one of ordinary skill in the art with the benefit of this disclosure.

Figure 27B:
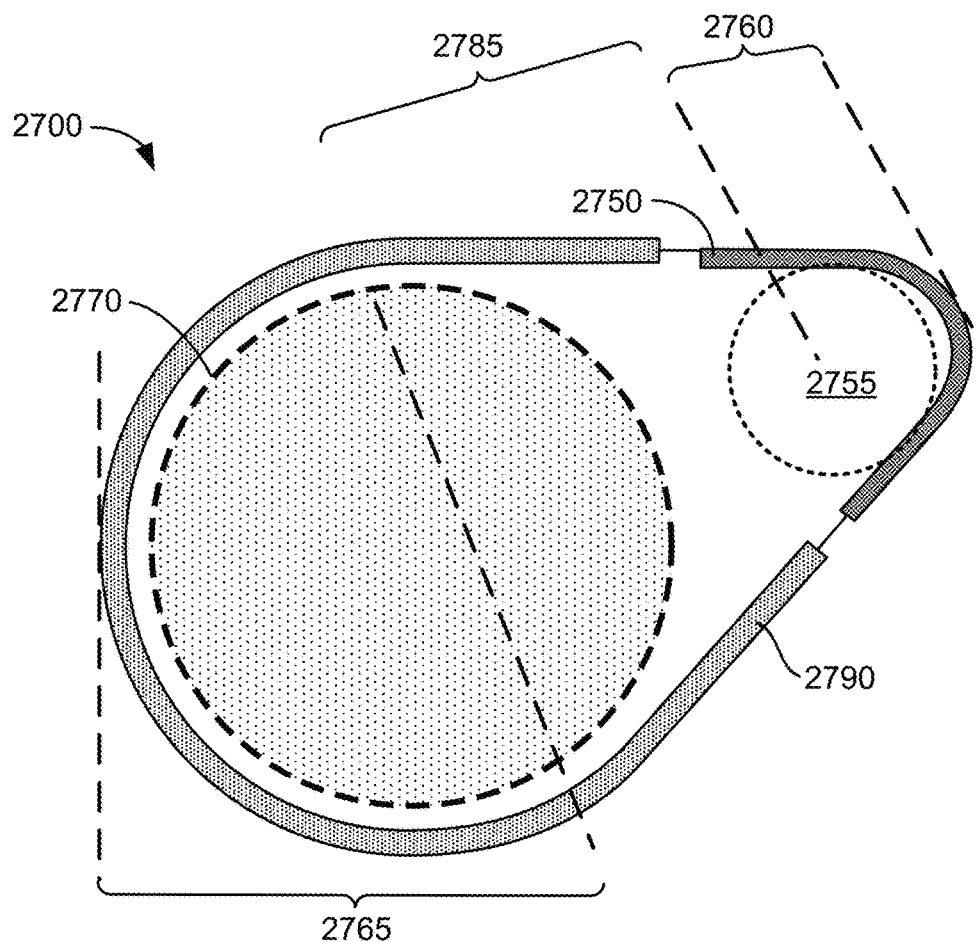
FIG. 27B is plan view illustrating an example of a universally flat eye piece with a locally curved CPE in a dynamic curved eyepiece according to certain embodiments.

Shims can be configured under each polymer waveguide 2720, 2730, 2740, respectively (see FIG. 27B). Typically, each shim is bonded to one waveguide layer which can operate to separate each waveguide layer by a distance and allow each layer to rotate independently from one another to accommodate a uniform curvature deformation in each waveguide layer during dynamic curving. Shims may be comprised of a low friction (<0.5) carrier film (e.g., PTFE, PET+ hard coating, etc.) with adhesive typically on one side. The low friction surface can allow for a uniform deformation of all layers. Shim thickness can range from about 20 µm to 500 µm, although other uniform or non-uniform thicknesses are possible.

FIG. 27B is plan view illustrating an example of a universally flat eye piece 2700 with a locally curved CPE in a dynamic curved eyepiece according to certain embodiments. For a dynamic curved eyepiece, a stationary and flat ICG may be used to minimize image swimming and distortion during dynamic modulation of the curvature of the eyepiece (e.g., polymer waveguide 2720, 2730, 2740). With a locally curved CPE on an otherwise universally flat eyepiece, as better seen in FIG. 27A, the position and flatness of ICG 2755 can be well-maintained via an increased bending stiffness inherent in the shape of eyepiece 2700. In some implementations, rigid adhesives 2750 can be coupled around the ICG for bonding different layers together and/or to the frame and projector to further minimize movement of ICG 2755 to create a fixed (non-moving) portion 2760 of the eyepiece stack 2700. Rigid adhesives 2750 may be configured around (e.g., bonded to) eyepiece 2700 in areas that do not interfere with the light path from projector 2710 or light propagating through eyepiece 2700. Typically, a bonding length of the rigid adhesive can be configured to maintain flatness of the ICG area and minimize aberration of the spherical curvature of the eyepiece during dynamic modulation. By way of example, the bonding length, as shown in FIG. 27B, is typically about 10-30 mm, which may result in good optical performance characteristics. In some aspects, region 2765 around the local spherical area (e.g., CPE) may be configured with shims placed between vertically adjacent layers of eyepiece 2700 to allow for each layer to rotate independently for uniform curvature deformation in each eyepiece layer during dynamic curving.

A ring actuator 2770 may be coupled to the local spherical area and configured in any suitable shape, but typically circular or C-shaped to minimize any interference with light propagating through eyepiece 2700, as further described below.

According to embodiments of the present invention, application of a bending moment at the periphery of the waveguide layer (e.g., via a ring actuator) can result in modulation of the surface profile or curvature of the waveguide layer uniformly across the width/length of the waveguide layer and the aperture area of the associated eyepiece to achieve the various depth planes described above.

A waveguide structure with a variable surface profile structure, as presented herein, provides a dynamic eyepiece in which the depth plane of the eyepiece can be varied to display virtual content at different depth planes. Accordingly, using a single eyepiece, for example, containing three waveguide layers (e.g., eyepiece stack 2700), each associated with a primary color, time division multiplexing techniques can be utilized to display virtual content appearing to originate from different depth planes. Although the embodiment illustrated herein generally provide for two different depth planes, other implementations enable a continuous variation in surface profile, thereby providing for dynamic eyepieces with continuous depth plane variation. In addition, virtual content can be shifted to a different depth plane as a function of user motion, when a user blinks, or the like. Since the current depth plane associated with the eyepiece can be correlated with the virtual content to be displayed, the depth plane can be adjusted as a function of the virtual content. One of ordinary skill in the art would recognize many variations, modifications, and alternatives.

In some aspects, a fixed portion 2760 of the waveguide layer can be affixed to or otherwise hold in place portions of the waveguide layer adjacent the fixed portion. As an example, ICG 2755 can be positioned near the middle of fixed portion 2760. In order to prevent modification of the surface profile of the waveguide layer in the vicinity of ICG 2755, fixed portion 2760 is utilized to maintain the surface profile of this portion of the waveguide layer in a fixed surface profile. In other embodiments, the fixed portion can loosely hold the multiple waveguide layers (e.g., 2720, 2730, 2740) in place, for instance, by utilizing one or more shims between waveguide layers, to allow portions of the waveguide layers adjacent to fixed portion 2760 to bend or remain in an original condition without obstruction by fixed portion 2760 as discussed in additional detail in relation to FIG. 16.

As described above, a periphery of eyepiece stack 2700 can be positioned against, bonded to, or otherwise affixed to an inner portion of ring actuator 2770. An outer portion of ring actuator 2770 may be affixed to fixed frame structure, as further described herein. Ring actuator 2770 can be expanded or contracted radially and repeatedly for continuous modulation of the surface profile of a waveguide layer (e.g., 2720) of eyepiece 2700. Examples of ring actuators include, but are not limited to, piezoelectric actuators, electrothermal actuators, magnetostrictive actuators, and the like. Voltage sources utilized to drive the ring actuator are not shown for prevent obfuscation of the novel concepts described herein. The waveguide layer(s) and the ring actuator(s) can be fabricated separately and then bonded together or fabricated as a single unit depending on the particular fabrication processes utilized.

Referring to FIG. 27B, the outer portion of ring actuator 2770 can be affixed or pinned to a fixed frame structure via a rotational mechanism (e.g., a hinge) acting as a support collar. Ring actuator 2770 can expand laterally, where the boundary conditions of the ring actuator can cause waveguide layer 2700 to flatten into a planar or substantially planar configuration. Conversely, ring actuator 2770 can contract laterally, where the boundary conditions of the ring actuator can cause the waveguide layers (e.g., 2720) to curve more substantially than when the ring actuator is less contracted. In other words, ring actuator 2770 can expand towards the center of the waveguide layer to cause the waveguide layer to decrease the radius of curvature and can contract outward from the center of the waveguide layer to cause waveguide layer to flatten, increasing the radius of curvature. Thus, the waveguide layer (e.g., waveguides 2720, 2730, 2740) can be flattened continuously to a planar or substantially planar position or induced to curve at various radius of curvature values by lateral or radial movement of ring actuator 2770, thereby achieving multiple waveguide configurations in continuous operation. Varying the contraction/extension of the ring actuator along its range of motion can cause the waveguide layer to be stretched into multiple states corresponding to varying surface profile or radius of curvature values. As a result, the surface profile of each waveguide layer in eyepiece stack 2700 can be continuously altered to project virtual content to a user at multiple depth planes.

Ring actuator 2770 can be a ring or loop that surrounds a portion of the periphery of CPE, as shown for example in FIG. 27B. In some examples, portions of the ring actuator can be segregated into multiple segmented sections, such that varying mechanical forces can be applied to different portions along the periphery of a waveguide layer. In some examples, different materials or actuator types for each segmented section may be used in any combination in a given application. The various sections of a ring actuator can be actuated simultaneously, alternatively, or in combination, such that portions of the ring actuator can expand outward away from the waveguide layer more or less than other portions of the ring actuator. This can reduce focusing error and account for ring actuator systems with varying component shapes in relation to the shape of the waveguide layer.

Figure 28A:
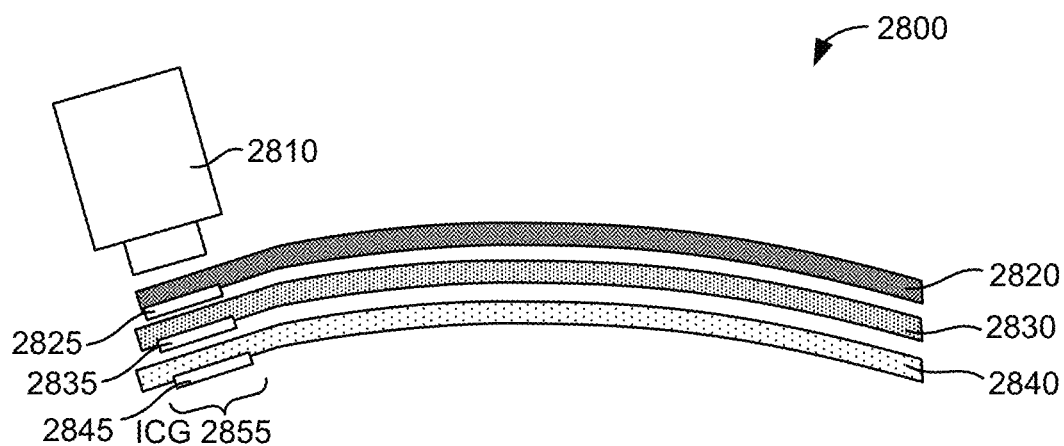
FIG. 28A is a simplified cross-sectional diagram showing an example of a locally flat ICG in a universally curved eyepiece stack according to certain embodiments.

FIG. 28A is a simplified cross-sectional diagram showing an example of a locally flat ICG in a universally curved eyepiece stack 2800 according to certain embodiments. In some embodiments, eyepiece stack 2800 may include three or more polymer waveguides for RGB color imaging, such as polymer waveguides 2820 (e.g., green), 2830 (e.g., blue), and 2840 (e.g., red). Projector 2810 may be a split-pupil projector and can be configured over a flat region of each polymer waveguide to allow the optical injection of the RGB colors at the same angle for proper mixing of RGB images for each polymer waveguide (ICG 2855). Shims can be configured under each polymer waveguide 2820, 2830, 2840, respectively. Typically, each shim is bonded to one waveguide layer which can operate to separate each waveguide layer by a distance and allow each layer to rotate independently from one another to accommodate a uniform curvature deformation in each waveguide layer during dynamic curving, as further described above and with respect to FIG. 16. The integration of locally flat ICGs in a curved eyepiece stack enables a smoother flat-to-curved transition region from the locally flat ICGs to the curved eyepiece waveguide region, thereby reducing damage to the polymer waveguide and improving the light coupling efficiency between the ICGs and the curved eyepiece waveguide region.

Figure 28B:
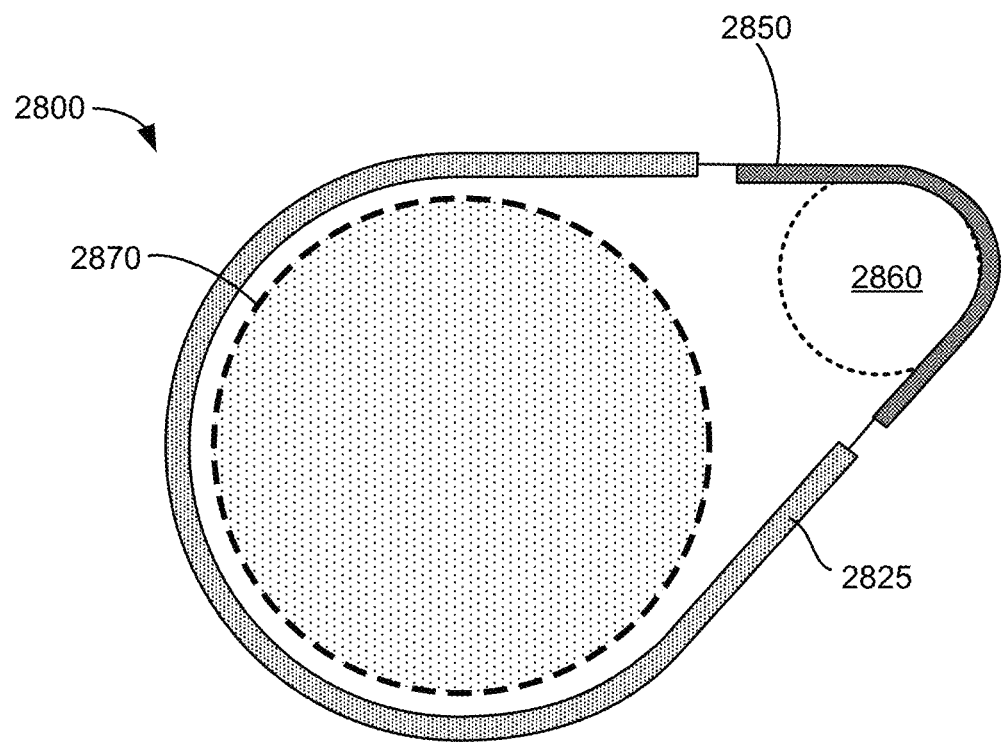
FIG. 28B is a plan view illustrating an example of a locally flat ICG in a universally curved dynamic eyepiece according to certain embodiments.

FIG. 28B is a plan view illustrating an example of a locally flat ICG in a universally curved dynamic eyepiece 2800 according to certain embodiments. For a dynamic curved eyepiece, a stationary and flat ICG may be used to minimize image swimming and distortion during dynamic modulation of the curvature of the eyepiece (e.g., polymer waveguide 2820, 2830, 2840). With a locally flat ICG on a universally spherical eyepiece, as better seen in FIG. 28A, the position and flatness of ICG 2855 can be well-maintained via an increased bending stiffness inherent in the shape of eyepiece 2800. In some implementations, rigid adhesives 2850 can be coupled around the ICG for bonding different layers together and/or to the frame and projector to further minimize movement of ICG 2855 to create a fixed (non-moving) portion 2860 of the eyepiece stack 2800, as further described above with respect to FIGS. 27A-27B. In some aspects, region 2860 around the spherical area (e.g., CPE) (or in some cases near the at the rigid area near ICG 2855) may be configured with shims placed between vertically adjacent layers of eyepiece 2800 to allow for each layer to rotate independently for uniform curvature deformation in each eyepiece layer during dynamic curving. Shims are typically configured around the area of the CPE, as this area is subject to movement due to polymer waveguide deformation etc., as further described above. Shims are typically not configured in the fixed areas (e.g., ICG) as these areas are typically configured to be rigid with little to no movement of layers (polymer waveguides) individually or relative to one another. A ring actuator 2870 may be coupled to the local spherical area and configured in any suitable shape, but typically circular or C-shaped to minimize any interference with light propagating through eyepiece 2800, as further described above.

It will be appreciated by one of skill in the art that the designs illustrated in FIGS. 27A-27B and 28A-28B can be utilized in conjunctions with the systems for dynamically adjusting the surface profile of waveguide layers illustrated in FIGS. 6A-16 as appropriate. Merely by way of example, considering FIGS. 6E-6F, waveguide layers that are fabricated with a predetermined, curved surface profile, for example, a predetermined radius of curvature as illustrated in FIGS. 27A and 28A, can be operated using the two ring-shaped clamping mechanisms shown in FIGS. 6E and 6F in order to apply a mechanical force to the periphery of the waveguide layers, which will then bend in response to the mechanical force, resulting in the radius of curvature of the waveguide layers being modified, for example, to a planar surface profile or a larger radius of curvature. Thus, the variety of devices fabricated using the fabrication methods described herein can be integrated with the various dynamic adjustment systems described herein. Although FIGS. 6E-6F are discussed as an example, the other systems illustrated in FIGS. 6A-16 can also be utilized as appropriate. One of ordinary skill in the art would recognize many variations, modifications, and alternatives.

Figure 29:
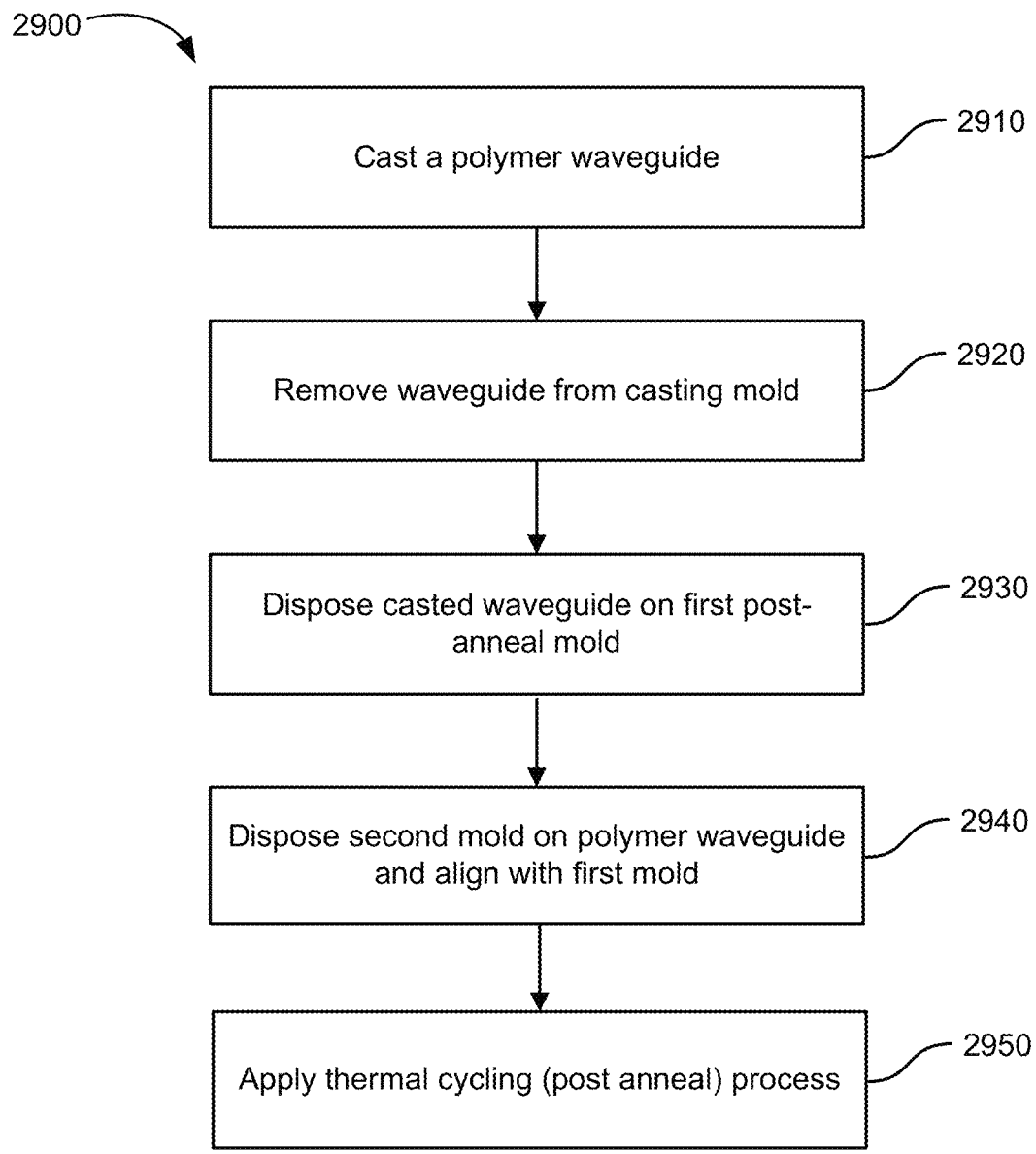
FIG. 29 is a simplified flow chart showing aspects of a method for forming a polymer waveguide for use in an augmented reality headset according to certain embodiments.

FIG. 29 is a simplified flow chart showing aspects of a method 2900 for forming a polymer waveguide for use in an augmented reality headset according to certain embodiments. In certain embodiments, aspects of method 2900 can be performed utilizing casting and molding processes and equipment. Although method 2900 describes a method of forming a single layer, high fidelity polymer waveguide, it should be understood that the polymer waveguide described herein may be part of a multi-layer eyepiece, and that multiple layers may be fabricated in a multi-stack process (e.g., multiple molds stacked in a manner to create multiple waveguides simultaneously), as would be appreciated by one of ordinary skill in the art with the benefit of this disclosure.

At operation 2910, method 2900 can casting a polymer waveguide 2600 as illustrated in FIG. 26A-26C that is configured to propagate light therein, according to certain embodiments. In some aspects, the polymer waveguide is a single layer of a multi-layer (e.g., multi-polymer waveguide) eyepiece. The polymer waveguide may have a substantially uniform topology. For instance, after casting, the polymer waveguide may be partially or universally flat or curved. Polymer waveguide 2600 can include a light input surface (e.g., ICG 2650) at a first region, and a light output surface (e.g., CPE 2630) at a second region, where the light input surface and the light output surface are separated by a predetermined distance. Casting may be performed with multiple molds, typically a top mold and a bottom mold with the polymer waveguide sandwiched there between, with casting temperatures further described above. The casting molds described herein should not be confused with the post-anneal molds (also referred to as templates, freeform surfaces, etc.) described above.

At operation 2920, method 2900 can include removing the polymer waveguide from the mold, as shown for example in FIG. 22. Removing the polymer waveguide may include a demolding process where the bottom mold is separated from the polymer waveguide, followed by a separation process (e.g., peel off process) that separates the polymer waveguide from the top mold. Alternatively, the demolding process may start with removing the top mold first, followed by the bottom mold. One of ordinary skill in the art with the benefit of this disclosure would appreciate the many modifications, variations, and alternative embodiments thereof.

At operation 2930, method 2900 can include disposing the casted polymer waveguide on a first mold (e.g., bottom mold 2610) that can include a uniformly spherical portion 2635 having a circular base and a flat portion 2640. The polymer waveguide can be configured on the first mold such that the first region is in vertical alignment 2660 with the flat portion and the second region is in vertical alignment with the uniformly spherical portion of the first mold.

At operation 2940, method 2900 can include disposing a second mold (top mold 2620) on the polymer waveguide, according to certain embodiments. The second mold can be vertically aligned 2660 with polymer waveguide 2600 and first mold 2610. Second mold 2620 can include an opening configured over polymer waveguide 2600 that is defined by a first section of the opening that circumscribes at least half of the circular base of the uniformly spherical portion of the first mold and the light output surface, and a second section of the opening that circumscribes at least half of the flat portion and the light input surface. For example, referring to FIG. 27B, the second mold can have an opening (also referred to as a "cutout area" or "cavity") that is tear drop shaped (or wedge shaped) where area 2765 circumscribes at least half of the CPE section, area 2760 circumscribes at least half of the ICG section, and area 2785 couples (e.g., linearly or with any suitable curved topology) both of the circumscribed areas. Second mold (top mold 2620) can operate to define a desired transition length (e.g., reduce the transition length) without inducing damage on sensitive light propagation areas (e.g., affecting TIR or other optical parameters), allow for top and bottom mold alignment during the post-annealing/curving process, and prevent active gratings (e.g., ICG 2650) from being damaged during the curving process because the top mold is configured around the outside edge of the ICG without contacting the ICG, yet close enough to the curved-to-flat transition to still reduce the transition length to a desired amount, as further described above in the cross-sections of A-A' and B-B' in FIGS. 26A-26C.

At operation 2950, method 2900 can include applying a thermal cycling process (e.g., post-anneal process) to heat the first and second molds to a threshold temperature that causes the polymer waveguide to deform to a shape defined by the first and second molds such that the polymer waveguide is flat at the first region, the polymer waveguide is uniformly spherical at the second region, and a curved-to-flat transition between the first and second regions is shorter than a predetermined distance, such that no active gratings are in contact with the second mold, resulting in a high fidelity polymer waveguide, as shown in FIG. 26C. In some aspects, the threshold temperature (e.g., for 1.72 polymer) can be 120° C., although lower or higher threshold temperatures are possible depending on the type of polymer used. For instance, 1.75 polymer can have a threshold temperature that can range from 80° C. to 100° C.

In some embodiments, method 2900 may further include processes to prevent the polymer waveguide from sticking during the thermal cycling process. For instance, method 2900 may include applying a uniform surface coating of an anti-stick compound to the polymer waveguide post-casting that operates to prevent the polymer waveguide from sticking to the first and second molds during the thermal cycling process. Alternatively or additionally, method 2900 can include applying raw material particulates to the surface of the polymer waveguide and surface grinding or etching the polymer waveguide to achieve a surface roughness of 10 nm to 10 µm RMS that operates to prevent the polymer waveguide from sticking to the first and second molds during the thermal cycling process. In some implementations, method 2900 can include inserting one or more textiles between the polymer waveguide and the first and/or second molds, the one or more textiles configured to prevent the polymer waveguide from sticking to the first and second molds during the thermal cycling process. One of ordinary skill in the art with the benefit of this disclosure would appreciate the many modifications, variations, and alternative embodiments thereof.

In some embodiments, method 2900 can include applying a rigid bonding material around at least a portion of the second section and circumscribing the light input surface, the rigid bonding material bonding the second section to one or more structures adjacent to the polymer waveguide including one or more of an adjacent polymer waveguide of multi-layer eyepiece stack or a projector, according to certain embodiments. In some aspects, the rigid bonding material may prevent or reduce movement of the light input surface as the polymer waveguide is dynamically deflected.

It should be appreciated that the specific steps illustrated in FIG. 29 provide a particular method for forming a polymer waveguide for use in an augmented reality headset, according to certain embodiments. Other sequences of steps may also be performed according to alternative embodiments. Furthermore, additional steps may be added or removed depending on the particular applications. For instance, method may further include the fabrication, installation, and/or implementation of shims, a ring actuator, or other elements, as further described above with respect to FIGS. 27A-28B. Any combination of changes can be used and one of ordinary skill in the art with the benefit of this disclosure would understand the many variations, modifications, and alternative embodiments thereof.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a dynamic eyepiece in an augmented reality headset, the method comprising:
   producing first virtual content associated with a first depth plane;
   coupling the first virtual content into the dynamic eyepiece;
   projecting the first virtual content through one or more waveguide layers of the dynamic eyepiece to an eye of a viewer, wherein the one or more waveguide layers are characterized by a first surface profile;
   coupling a mechanical structure to the one or more waveguide layers, wherein the mechanical structure contacts a periphery of the one or more waveguide layers;
   applying, using the mechanical structure, a mechanical force to the periphery of the one or more waveguide layers to modify the one or more waveguide layers to be characterized by a second surface profile different from the first surface profile;
   producing second virtual content associated with a second depth plane;
   coupling the second virtual content into the dynamic eyepiece; and
   projecting the second virtual content through the one or more waveguide layers of the dynamic eyepiece to the eye of the viewer.

2. The method of claim 1 further comprising producing third virtual content associated with the first depth plane;
   modifying the one or more waveguide layers to be characterized by the first surface profile;
   coupling the third virtual content into the dynamic eyepiece; and
   projecting the third virtual content through the one or more waveguide layers to the eye of the viewer.

3. The method of claim 1 wherein the first virtual content comprises three colors, the one or more waveguide layers comprise three waveguide layers, each associated with one of the three colors.

4. The method of claim 1 wherein applying the mechanical force to modify the one or more waveguide layers comprises applying a shear strain to the periphery of the one or more waveguide layers.

5. The method of claim 1 wherein applying the mechanical force to modify the one or more waveguide layers comprises applying a stretching and or compressive force to the periphery of the one or more waveguide layers.

6. The method of claim 1 wherein applying the mechanical force to modify the one or more waveguide layers comprises moving an actuator toward a fixed frame.

7. The method of claim 1 wherein the first surface profile is planar and a second curvature of the second surface profile is negative or positive.

8. The method of claim 1 wherein a first curvature of the first surface profile is positive and a second curvature of the second surface profile is negative.

9. The method of claim 1 wherein applying the mechanical force to modify the one or more waveguide layers is performed continuously.

10. The method of claim 9 wherein the one or more waveguide layers are characterized by a range of surface profiles between the first surface profile and the second surface profile.

* * * * *